United States Patent
McGahee et al.

(10) Patent No.: US 10,537,867 B2
(45) Date of Patent: *Jan. 21, 2020

(54) OPTIMIZED REACTOR CONFIGURATION FOR OPTIMAL PERFORMANCE OF THE AROMAX CATALYST FOR AROMATICS SYNTHESIS

(71) Applicant: Chevron Phillips Chemical Company LP, The Woodlands, TX (US)

(72) Inventors: Vincent D. McGahee, Kemah, TX (US); Daniel M. Hasenberg, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/862,273

(22) Filed: Jan. 4, 2018

(65) Prior Publication Data

US 2019/0201861 A1 Jul. 4, 2019

(51) Int. Cl.
*B01J 8/00* (2006.01)
*B01J 8/02* (2006.01)
(Continued)

(52) U.S. Cl.
CPC .............. *B01J 8/062* (2013.01); *B01J 8/0085* (2013.01); *B01J 8/065* (2013.01); *B01J 8/087* (2013.01);
(Continued)

(58) Field of Classification Search
CPC ... B01J 8/00; B01J 8/008; B01J 8/0085; B01J 8/02; B01J 8/06; B01J 8/062; B01J 8/065;
(Continued)

(56) References Cited

U.S. PATENT DOCUMENTS 2,915,458 A 12/1959 Slyngstad et al.
2,925,377 A 2/1960 Mayer
(Continued)

FOREIGN PATENT DOCUMENTS

EP 0403976 B1 12/1990
EP 1403215 A1 3/2004
WO WO-2015128042 A1 * 9/2015 ............. C10G 35/04

OTHER PUBLICATIONS

Filing Receipt and specification for patent application entitled "Methods of Regenerating Aromatization Catalysts with a Decoking Step Between Chlorine and Fluorine Addition," by Gabriela D. Alvez-Manoli, filed May 17, 2017 as U.S. Appl. No. 15/597,189.
(Continued)

*Primary Examiner* — Natasha E Young
(74) *Attorney, Agent, or Firm* — Conley Rose, P.C.; Rodney B. Carroll; Monte R. Rhodes

(57) ABSTRACT

A naphtha reforming reactor system comprising a first reactor comprising a first inlet and a first outlet, wherein the first reactor is configured to operate as an adiabatic reactor, and wherein the first reactor comprises a first naphtha reforming catalyst; and a second reactor comprising a second inlet and a second outlet, wherein the second inlet is in fluid communication with the first outlet of the first reactor, wherein the second reactor is configured to operate as an isothermal reactor, and wherein the second reactor comprises a plurality of tubes disposed within a reactor furnace, a heat source configured to heat the interior of the reactor furnace; and a second naphtha reforming catalyst disposed within the plurality of tubes, wherein the first naphtha reforming catalyst and the second naphtha reforming catalyst are the same or different.

23 Claims, 9 Drawing Sheets

(51) Int. Cl.
  *B01J 8/06* (2006.01)
  *B01J 8/08* (2006.01)
  *B01J 19/00* (2006.01)
  *B01J 19/24* (2006.01)
  *C10G 35/04* (2006.01)

(52) U.S. Cl.
  CPC .......... *B01J 19/2445* (2013.01); *C10G 35/04* (2013.01); *B01J 2219/00038* (2013.01); *B01J 2219/2419* (2013.01)

(58) Field of Classification Search
  CPC ..... B01J 8/08; B01J 8/087; B01J 19/00; B01J 2219/00; B01J 19/00002; B01J 19/00027; B01J 19/00038; B01J 19/24–2402; B01J 19/2418; B01J 19/2419; B01J 19/2445; C10G 35/00; C10G 35/04
  See application file for complete search history.

(56) References Cited

U.S. PATENT DOCUMENTS

| | | | |
|---|---|---|---|
| 2,943,998 | A | 7/1960 | Decker |
| 3,128,242 | A | 4/1964 | Bergstron |
| 3,198,727 | A | 8/1965 | Lifland |
| 3,700,140 | A * | 10/1972 | Harvey ............... B01F 15/0412 222/1 |
| 4,810,683 | A | 3/1989 | Cohn et al. |
| 4,851,380 | A | 7/1989 | Van Leirsburg et al. |
| 4,855,269 | A | 8/1989 | Mohr |
| 4,925,819 | A | 5/1990 | Fung et al. |
| 4,937,215 | A | 6/1990 | Murakawa et al. |
| 4,985,231 | A | 1/1991 | Lywood |
| 5,106,798 | A | 4/1992 | Fung |
| 5,155,075 | A | 10/1992 | Innes et al. |
| RE34,250 | E | 5/1993 | Van Leirsburg et al. |
| 5,260,238 | A | 11/1993 | Murakawa et al. |
| 5,676,821 | A | 10/1997 | Heyse et al. |
| 5,776,849 | A | 7/1998 | Fung et al. |
| 5,837,128 | A | 11/1998 | Huff, Jr. et al. |
| 5,879,538 | A | 3/1999 | Haritatos |
| 6,063,264 | A | 5/2000 | Haritatos |
| 6,190,539 | B1 | 2/2001 | Holtermann et al. |
| 6,224,789 | B1 | 5/2001 | Dybkjaer |
| 6,551,660 | B2 | 4/2003 | Holtermann et al. |
| 6,656,342 | B2 | 12/2003 | Smith et al. |
| 6,773,580 | B2 * | 8/2004 | Boger ................... B01J 19/2485 208/134 |
| 6,803,029 | B2 | 10/2004 | Dieckmann |
| 6,812,180 | B2 | 11/2004 | Fukunaga |
| 7,153,801 | B2 | 12/2006 | Wu |
| 7,449,167 | B2 | 11/2008 | Garg et al. |
| 7,504,048 | B2 | 3/2009 | Licht |
| 7,645,906 | B2 | 1/2010 | Hasenberg et al. |
| 7,868,217 | B2 | 1/2011 | Brown et al. |
| 7,932,425 | B2 | 4/2011 | Blessing et al. |
| 8,263,518 | B2 | 9/2012 | Khare |
| 8,362,310 | B2 | 1/2013 | Blessing et al. |
| 8,569,555 | B2 | 10/2013 | Blessing et al. |
| 8,664,144 | B2 | 3/2014 | Wu |
| 8,716,161 | B2 | 5/2014 | Wu |
| 8,912,108 | B2 | 12/2014 | Wu |
| 9,174,895 | B2 | 11/2015 | Wu |
| 9,421,530 | B2 | 8/2016 | Wu |
| 2002/0165417 | A1 | 11/2002 | Numaguchi et al. |
| 2013/0158318 | A1 | 6/2013 | Mosier et al. |
| 2013/0158319 | A1 | 6/2013 | Mosier et al. |
| 2014/0066676 | A1 | 3/2014 | Cheung |
| 2014/0213839 | A1 | 7/2014 | Wu |
| 2014/0374312 | A1 * | 12/2014 | Wegerer ................ C10G 59/02 208/63 |

OTHER PUBLICATIONS

Receipt and specification for patent application entitled "Optimized Reactor Configuration for Optimal Performance of the Aromax Catalyst for Aromatics Synthesis," by Vincent McGahee, et al., filed Jan. 4, 2018 as U.S. Appl. No. 15/862,266.
International Search Report & Written Opinion PCT/US2019/012038, dated Mar. 13, 2019, 11 pages.
International Search Report & Written Opinion PCT/US2019/012041, dated Apr. 17, 2019, 18 pages.
Office Action (Restriction Requirement) dated Dec. 16, 2019, (7 pages), U.S. Appl. No. 15/862,266, filed Jan. 4, 2018.
Luo, Nianjun, et al., "Glycerol aqueous phase reforming for hydrogen generation over Pt catalyst—Effect of catalyst composition and reaction conditions," Fuel, 2008, pp. 3483-3489, vol. 87, Elsevier Ltd.

* cited by examiner

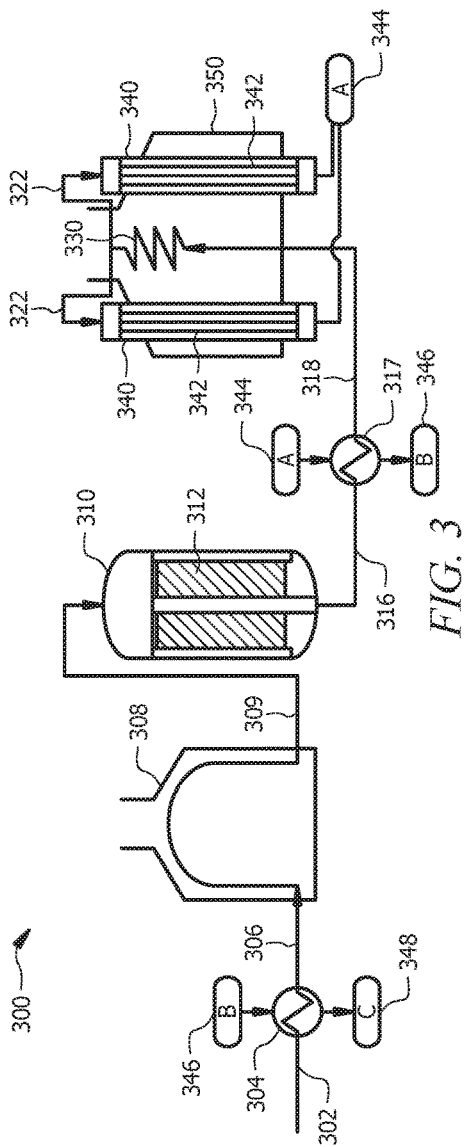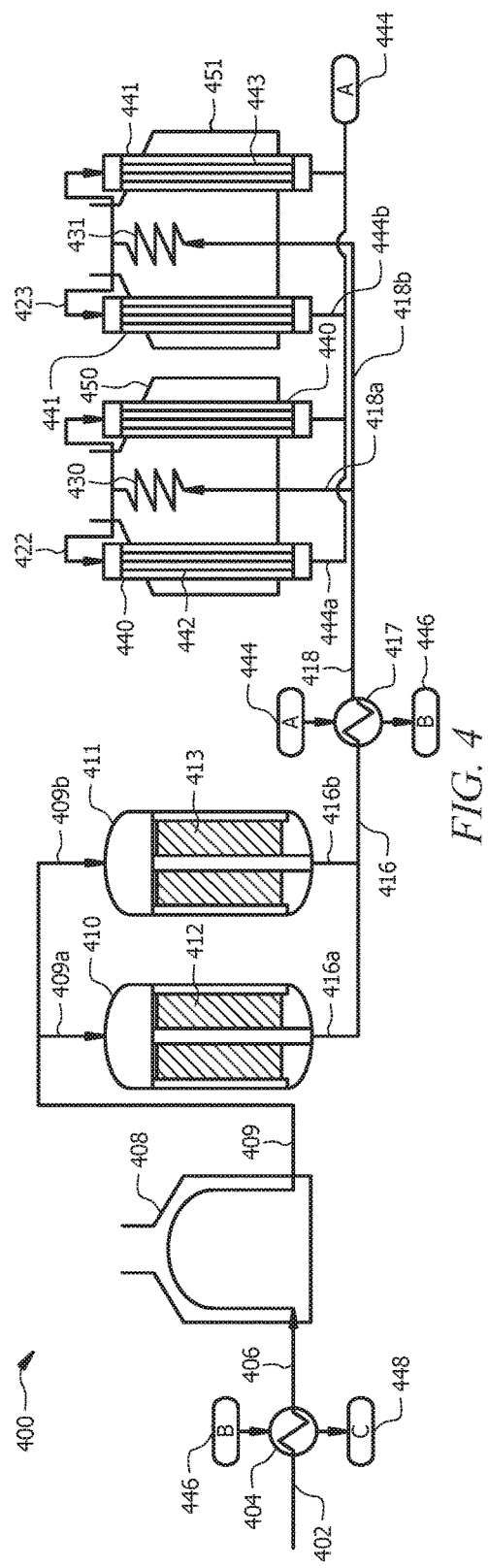

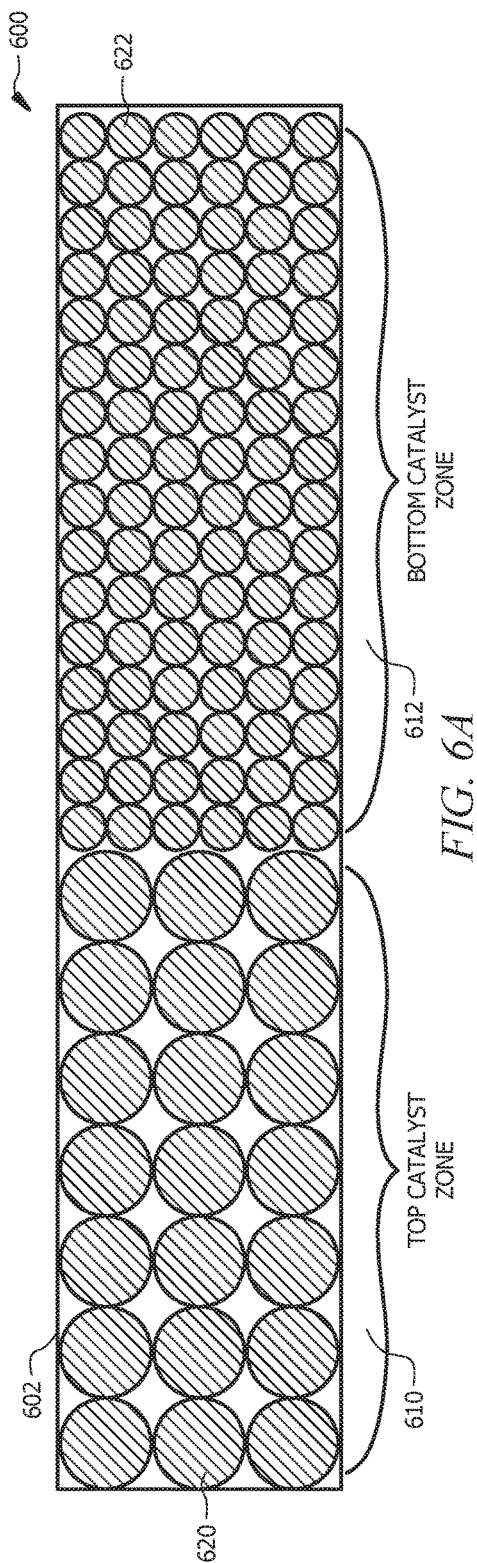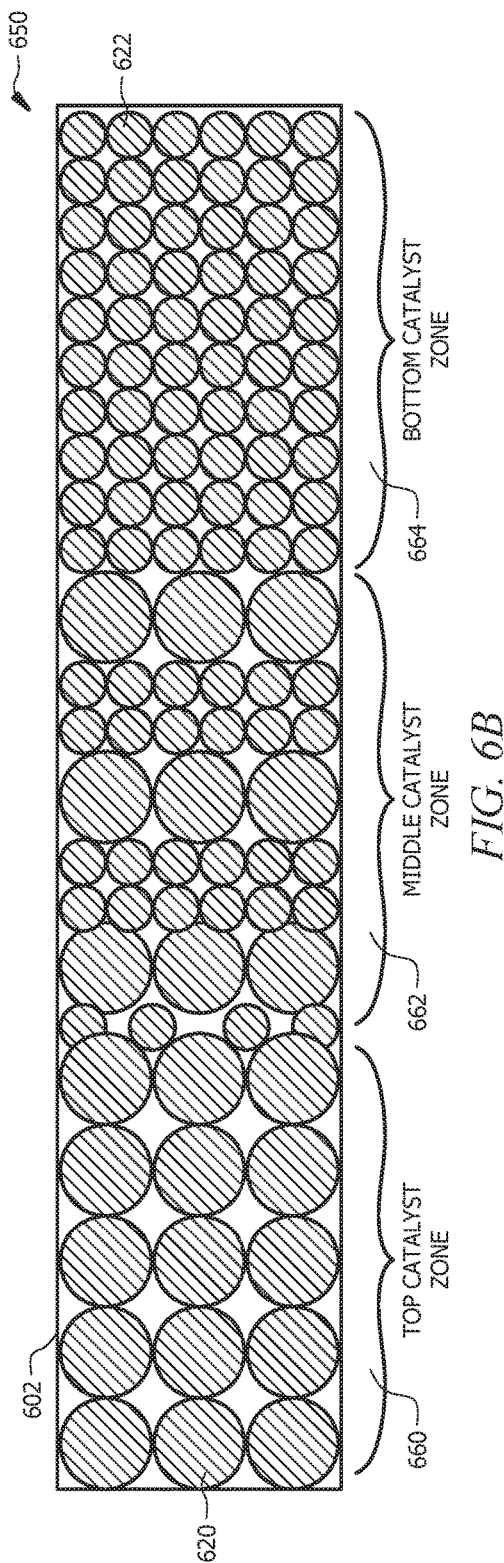

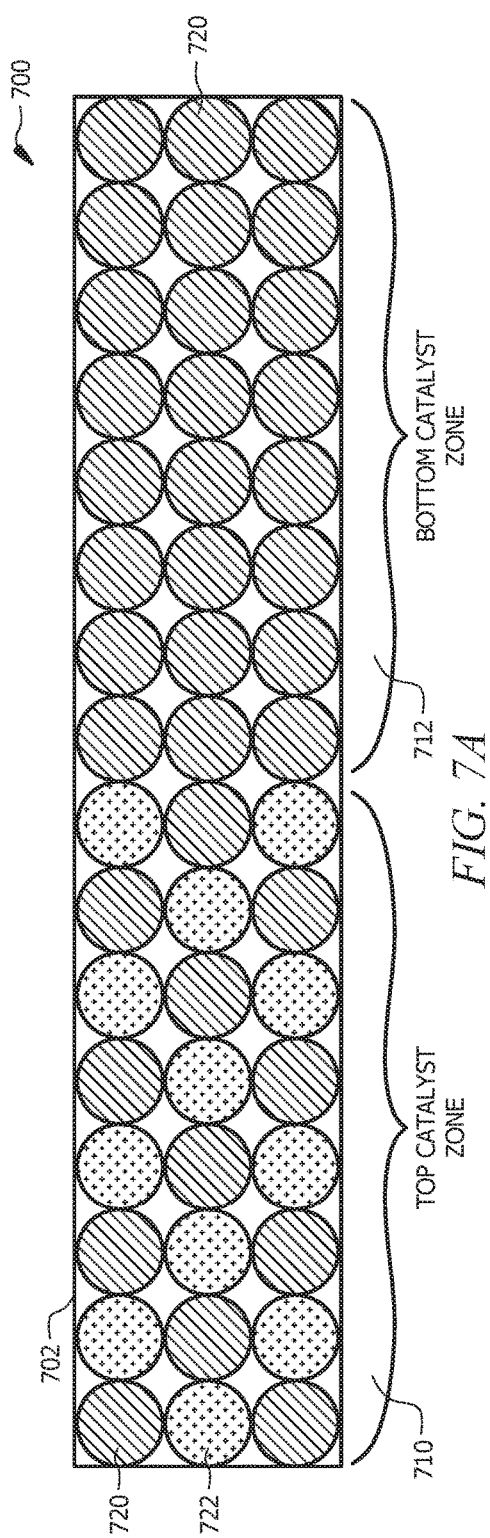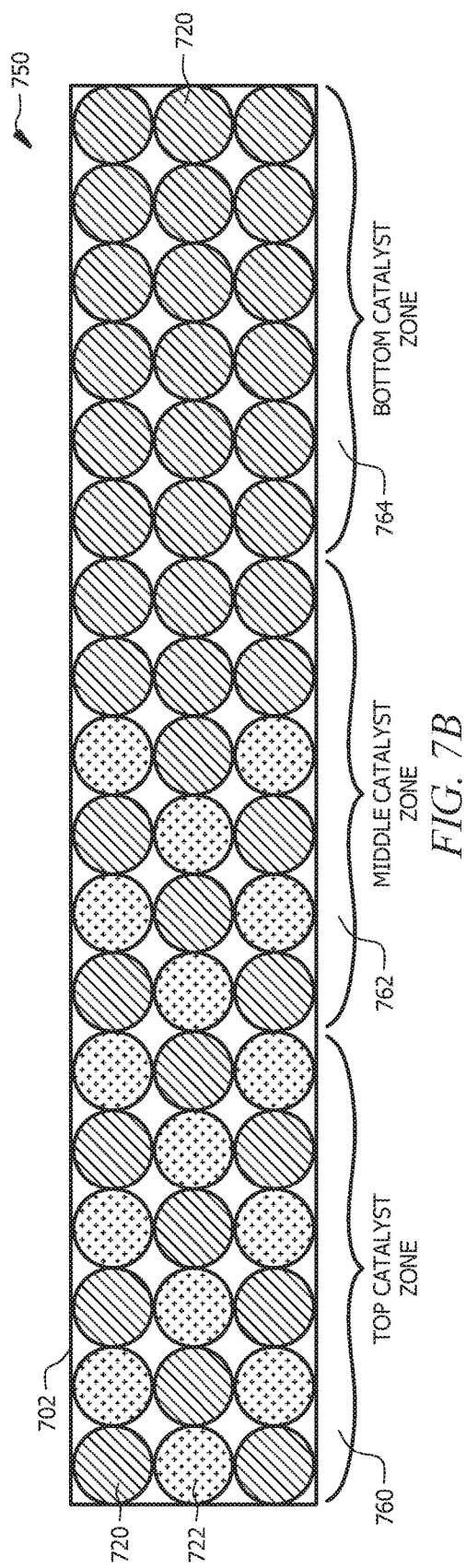

OPTIMIZED REACTOR CONFIGURATION FOR OPTIMAL PERFORMANCE OF THE AROMAX CATALYST FOR AROMATICS SYNTHESIS

CROSS-REFERENCE TO RELATED APPLICATIONS

None.

FIELD

This disclosure relates generally to a system and method for operating a catalytic naphtha reforming process. More particularly, the disclosure relates to operating a reactor under isothermal naphtha reforming conditions in a catalytic naphtha reforming process.

BACKGROUND

Typical catalytic naphtha reforming processes can be carried out using a variety of reactors containing naphtha reforming catalysts. The naphtha reforming process encompasses a number of reactions, which are typically carried out in the presence of a catalyst, such as dehydrocyclization, hydrodecyclization, isomerization, hydrogenation, dehydrogenation, hydrocracking, cracking, etc. Naphtha reforming reactions are intended to convert the paraffins, naphthenes, and olefins present in naphtha to aromatics and hydrogen. Generally, adiabatic reactors are preferred for naphtha reforming processes, although several adiabatic reactors operated in series are usually necessary to achieve a desired conversion and selectivity for the naphtha reforming process.

SUMMARY

Disclosed herein is a method comprising introducing a hydrocarbon feed stream to a first reactor operating under adiabatic naphtha reforming conditions, wherein the first reactor comprises a first naphtha reforming catalyst and wherein the hydrocarbon feed stream comprises a convertible hydrocarbon; converting at least a portion of the convertible hydrocarbon in the hydrocarbon feed stream to an aromatic hydrocarbon in the first reactor to form a first reactor effluent; passing the first reactor effluent from the first reactor to a second reactor operating under isothermal naphtha reforming conditions, wherein the second reactor comprises a second naphtha reforming catalyst and wherein the first naphtha reforming catalyst and the second naphtha reforming catalyst are the same or different; converting at least an additional portion of the convertible hydrocarbon in the first reactor effluent to an additional amount of the aromatic hydrocarbon in the second reactor to form a second reactor effluent; and recovering the second reactor effluent from the second reactor.

Also disclosed herein is a reactor system comprising a first reactor comprising a first inlet and a first outlet, wherein the first reactor is configured to operate as an adiabatic reactor, and wherein the first reactor comprises a first naphtha reforming catalyst; and a second reactor comprising a second inlet and a second outlet, wherein the second inlet is in fluid communication with the first outlet of the first reactor, wherein the second reactor is configured to operate as an isothermal reactor, wherein the second reactor comprises a second naphtha reforming catalyst, and wherein the first naphtha reforming catalyst and the second naphtha reforming catalyst are the same or different.

Further disclosed herein is a reactor system comprising a plurality of adiabatic reactors, wherein each adiabatic reactor of the plurality of adiabatic reactors comprises a first naphtha reforming catalyst; a feed header fluidly coupled to at least one of the plurality of adiabatic reactors by one or more feed lines; an intermediate product header fluidly coupled to at least one of the plurality of adiabatic reactors by one or more product lines; one or more isothermal reactors fluidly coupled to the intermediate product header by one or more inlet lines, wherein the one or more isothermal reactors comprise a second naphtha reforming catalyst and wherein the first naphtha reforming catalyst and the second naphtha reforming catalyst are the same or different; and an effluent header fluidly coupled to the one or more isothermal reactors by one or more effluent lines, wherein a serial flow path is formed from the feed header, through one or more of the plurality of adiabatic reactors, through the intermediate product header, through at least one of the one or more isothermal reactors, and to the effluent header.

Further disclosed herein is a method comprising introducing a hydrocarbon feed stream to a first reactor operating under adiabatic naphtha reforming conditions, wherein the first reactor comprises a first naphtha reforming catalyst, and wherein the hydrocarbon feed stream comprises a convertible hydrocarbon; converting at least a portion of the convertible hydrocarbon in the hydrocarbon feed stream to an aromatic hydrocarbon in the first reactor to form a first reactor effluent; passing the first reactor effluent from the first reactor to a second reactor operating under isothermal naphtha reforming conditions, wherein the second reactor comprises a second naphtha reforming catalyst, and wherein the first naphtha reforming catalyst and the second naphtha reforming catalyst are the same or different; converting at least an additional portion of the convertible hydrocarbon in the first reactor effluent to an additional amount of the aromatic hydrocarbon in the second reactor to form a second reactor effluent; and recovering the second reactor effluent from the second reactor, wherein an amount of the first naphtha reforming catalyst in the first reactor is less than an amount of the second naphtha reforming catalyst in the second reactor.

Further disclosed herein is a naphtha reforming reactor system comprising a first reactor comprising a first inlet and a first outlet, wherein the first reactor is configured to operate as an adiabatic reactor, and wherein the first reactor comprises a first naphtha reforming catalyst; and a second reactor comprising a second inlet and a second outlet, wherein the second inlet is in fluid communication with the first outlet of the first reactor, wherein the second reactor is configured to operate as an isothermal reactor, and wherein the second reactor comprises a plurality of tubes disposed within a reactor furnace, a heat source configured to heat the interior of the reactor furnace; and a second naphtha reforming catalyst disposed within the plurality of tubes, wherein the first naphtha reforming catalyst and the second naphtha reforming catalyst are the same or different.

Further disclosed herein is a method comprising introducing a hydrocarbon feed stream to a radial flow reactor operating under adiabatic naphtha reforming conditions, wherein the radial flow reactor comprises a first naphtha reforming catalyst, and wherein the hydrocarbon feed stream comprises a convertible hydrocarbon; converting at least a portion of the convertible hydrocarbon in the hydrocarbon feed stream to an aromatic hydrocarbon in the radial flow reactor to form a first reactor effluent; passing the first reactor effluent from the radial flow reactor to a second reactor operating under isothermal naphtha reforming conditions, wherein the second reactor comprises a plurality of tubes disposed within a reactor furnace, and a second naphtha reforming catalyst disposed within the plurality of tubes, and wherein the plurality of tubes are arranged in parallel between an inlet and an outlet of the reactor furnace; passing the first reactor effluent through the plurality of tubes within the second reactor; converting at least an additional portion of the convertible hydrocarbon in the first reactor effluent to an addition amount of the aromatic hydrocarbon in the second reactor to form a second reactor effluent, wherein the plurality of tubes is heated within the reactor furnace during the converting; and recovering the second reactor effluent from the second reactor.

BRIEF DESCRIPTION OF THE DRAWINGS

FIG. 3 is a flow diagram of yet another embodiment of a naphtha reforming process of the present disclosure.

FIG. 4 is a flow diagram of still yet another embodiment of a naphtha reforming process of the present disclosure.

FIG. 6A is a diagram of an embodiment of a graded catalyst bed of the present disclosure.

FIG. 6B is a diagram of another embodiment of a graded catalyst bed of the present disclosure.

FIG. 7A is a diagram of yet another embodiment of a graded catalyst bed of the present disclosure.

FIG. 7B is a diagram of still yet another embodiment of a graded catalyst bed of the present disclosure.

DETAILED DESCRIPTION OF EMBODIMENTS

Figure 1:
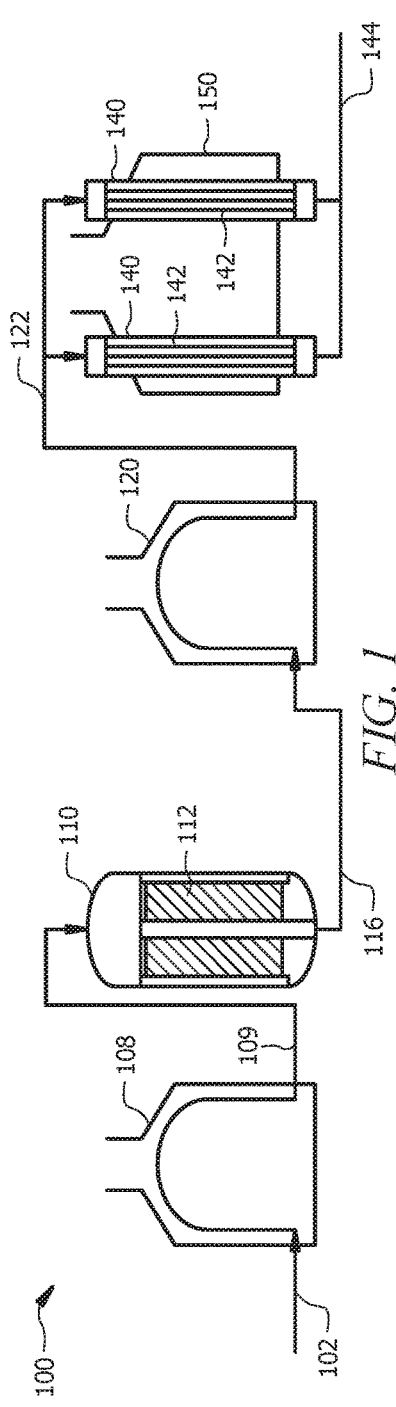
FIG. 1 is a flow diagram of an embodiment of a naphtha reforming process of the present disclosure.

Reforming reactors operating under isothermal naphtha reforming conditions could allow for enhanced naphtha reforming selectivity and conversion, while presenting lower rates of catalyst deactivation than found in adiabatic reactors. However, the highly endothermic naphtha reforming process complicates the maintenance of isothermal conditions throughout the reactor (e.g. the temperature profile) under isothermal naphtha reforming conditions. Process designs for the maintenance of the reactor temperature profile in isothermal reactors operating at catalytic naphtha reforming conditions often include additional burners at the feed entrance to the plurality of tubes that comprise the isothermal reactor. This is to compensate for the strong endotherm as the initial reforming reactions consume the more easily converted species in the hydrocarbon feed stream. However, this high tube wall heat flux at the upstream end of the plurality of tubes that comprise the isothermal reactor leads to higher capital cost designs through higher cost tube metal alloys. Additionally, the high tube wall heat flux will magnify any operational issues associated with process unit upsets. These issues may be addressed with a reactor system with a high number of tubes. However, the additional cost and complexity of this solution is not optimal for a problem that principally effects the upstream end of the plurality of tubes that comprise the isothermal reactor. Isothermal reactors also present concerns of increased pressure drop across the catalyst bed. Thus, there is an ongoing need for integrating isothermal reactors in naphtha reforming processes to increase conversion and selectivity, while maintaining lower reactor tube wall temperatures and lower overall pressure drop.

Disclosed herein are systems, apparatuses, and methods related to carrying out a naphtha reforming process by employing both adiabatic reactors and isothermal reactors. In an embodiment, a plurality of reactors can be used to carry out the naphtha reforming reactions, where the reactors can comprise at least one reactor operating under adiabatic naphtha reforming conditions in series with at least one reactor operating under isothermal naphtha reforming conditions. As is generally understood, naphtha reforming, or simply, a reforming "reaction" typically takes place within a naphtha reforming "reactor." For purposes of the disclosure herein, the term "reforming reaction" can take place in any suitable naphtha reforming reactor disclosed herein, such as for example a first reactor, a second reactor, an adiabatic reactor, an isothermal reactor, etc. The naphtha reforming described herein is the process for the conversion of aliphatic hydrocarbons found in a naphtha stream to aromatic hydrocarbons. Naphtha reforming refers not to one, but to several reactions that take place simultaneously. These naphtha reforming reactions include removal of hydrogen from cycloalkanes and alkyl-cycloalkanes, removal of hydrogen from and isomerization of alkyl-cycloalkanes, and removal of hydrogen from and cyclization of aliphatic hydrocarbons. Outside of these reactions, side reactions can occur, including dealkylation of alkylbenzenes, isomerization of aliphatic hydrocarbons, and hydrocracking reactions which produce light gaseous hydrocarbons such as methane, ethane, propane, and butane.

In an embodiment, a method of carrying out a naphtha reforming process as disclosed herein can comprise (i) introducing a hydrocarbon feed stream to a first reactor to form a first reactor effluent, where the first reactor operates under adiabatic naphtha reforming conditions, and where the first reactor comprises a first naphtha reforming catalyst; (ii) passing the first reactor effluent from the first reactor to a second reactor to form a second reactor effluent, where the second reactor operates under isothermal naphtha reforming conditions, and where the second reactor comprises a second naphtha reforming catalyst; and (iii) recovering the second reactor effluent from the second reactor.

In an embodiment, the hydrocarbon feed stream comprises a convertible hydrocarbon. As used herein, a "hydrocarbon feed stream" or "hydrocarbon stream" comprises hydrocarbons, though components other than molecules comprising hydrogen and carbon may be present in the stream (e.g., hydrogen gas). For purposes of the disclosure herein, the terms hydrocarbon feed stream" and "hydrocarbon stream" can be used interchangeably and refer to the hydrocarbon introduced (e.g., fed) to a reactor, such as the first reactor. In some embodiments, a "hydrocarbon" may comprise individual molecules that comprise one or more atoms other than hydrogen and carbon (e.g., nitrogen, oxygen, etc.).

Various feedstocks may be suitable for use with naphtha reforming processes and generally comprise non-aromatic hydrocarbons. The feed (e.g., hydrocarbon feed stream) to the naphtha reforming system comprising an aromatization system can be a mixture of hydrocarbons comprising $C_6$ to $C_8$ hydrocarbons containing up to about 10 wt. %, or alternatively up to about 15 wt. % of $C_5$ and lighter hydrocarbons ($C_5^-$); and containing up to about 10 wt. % of $C_9$ and heavier hydrocarbons ($C_9^+$). Suitable feedstocks include hydrocarbon feed streams boiling within a temperature range of from about 70° F. (21° C.) to about 450° F. (232° C.), or alternatively from about 120° F. (49° C.) to about 400° F. (204.5° C.). In an embodiment, the hydrocarbon feed stream can have a sulfur content of less than about 200 parts per billion by weight (ppbw), alternatively less than about 100 ppbw, alternatively less than about 50 ppbw, or alternatively from about 10 ppbw to about 100 ppbw. Examples of suitable feedstocks include straight-run naphthas from petroleum refining or fractions thereof which have been hydrotreated to remove sulfur and other catalyst poisons. Also suitable are synthetic naphthas or naphtha fractions derived from other sources such as coal, natural gas, bio-derived hydrocarbons or from processes such as Fischer-Tropsch processes, fluid catalytic crackers, and hydrocrackers.

A convertible hydrocarbon may comprise hydrocarbons having six or seven carbon atoms without an internal quaternary carbon or hydrocarbons having six carbon atoms without two adjacent internal tertiary carbons, or mixtures thereof. The convertible hydrocarbons may comprise methylpentanes, methylhexanes, dimethylpentanes or mixtures thereof, and/or the convertible components may comprise at least one of 2-methylpentane, 3-methylpentane, 2,4-dimethylpentane, 2,3-dimethylpentane, n-hexane, 2-methylhexane, 3-methylhexane, n-heptane, or mixtures thereof. The feed stream may comprise between about 0.1 wt. % and about 100 wt. % highly branched hydrocarbons. The convertible hydrocarbons readily convert to aromatic products without production of light hydrocarbons.

The hydrocarbon feed stream may comprise highly branched hydrocarbons having six or seven carbon atoms with an internal quaternary carbon or hydrocarbons having six carbons atoms and two adjacent internal tertiary carbons or mixtures thereof. The highly branched hydrocarbons may comprise dimethylbutanes, trimethylbutanes, dimethylpentanes, or mixtures thereof. The highly branched hydrocarbons with six or seven carbon atoms with an internal quaternary carbon may comprise, for example, 2,2-dimethylbutane, 2,2-dimethylpentane, 3,3-dimethylpentane, 2,2,3-trimethylbutane, or mixtures thereof. The highly branched hydrocarbons with six carbon atoms and an adjacent internal tertiary carbon may comprise 2,3-dimethylbutane. The highly branched hydrocarbons do not selectively convert to aromatic products and instead tend to convert to light hydrocarbons.

An "aromatic hydrocarbon" is a compound containing a cyclically conjugated double bond system that follows the Hückel (4n+2) rule and contains (4n+2) pi-electrons, where n is an integer from 1 to 5. Aromatic hydrocarbons include "arenes" (e.g., benzene, toluene, and xylenes) and "heteroarenes" (heteroaromatic compounds formally derived from arenes by replacement of one or more methine (—C=) carbon atoms of the cyclically conjugated double bond system with a trivalent or divalent heteroatoms, in such a way as to maintain the continuous pi-electron system characteristic of an aromatic system and a number of out-of-plane pi-electrons corresponding to the Hückel rule (4n+2)).

As disclosed herein, the term "substituted" may be used to describe an aromatic hydrocarbon, arene, or heteroarene, wherein a non-hydrogen moiety formally replaces a hydrogen atom in the compound, and is intended to be non-limiting, unless specified otherwise.

As used herein, the term "alkane" refers to a saturated hydrocarbon compound. Other identifiers may be utilized to indicate the presence of particular groups, if any, in the alkane (e.g., halogenated alkane indicates the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. The alkane or alkyl group may be linear or branched unless otherwise specified.

A "cycloalkane" is a saturated cyclic hydrocarbon, with or without side chains, for example, cyclobutane, cyclopentane, cyclohexane, methyl cyclopentane, and methyl cyclohexane. Other identifiers may be utilized to indicate the presence of particular groups, if any, in the cycloalkane (e.g., halogenated cycloalkane indicates the presence of one or more halogen atoms replacing an equivalent number of hydrogen atoms in the cycloalkane).

In some embodiments, the hydrocarbon feed stream can further comprise hydrogen, as the naphtha reforming process generally employs additional hydrogen introduced to the reforming reactors (although hydrogen is produced during the reforming process). The hydrogen can be introduced as fresh hydrogen to the hydrocarbon feed streams entering a reforming reactor, or it can be recovered from reactor effluents and recycled back to the reforming reactor(s).

In some embodiments, the hydrocarbon feed stream can further comprise oxygenates and/or nitrogenates. In an aspect, the hydrocarbon feed stream is initially substantially free of oxygenates and nitrogenates. In such aspects, an oxygenate, a nitrogenate, or both can be added to one or more process streams and/or components in the naphtha reforming system disclosed herein.

As used herein, the term "oxygenate" refers to water or any chemical compound that forms water under naphtha reforming conditions, such as oxygen, oxygen-containing compounds, hydrogen peroxide, alcohols, ketones, esters, ethers, carbon dioxide, aldehydes, carboxylic acids, lactones, ozone, carbon monoxide, or combinations thereof. In an embodiment, water and/or steam is used as the oxygenate. In another embodiment, oxygen may be used as the oxygenate, wherein such oxygen converts to water in situ within one or more naphtha reforming reactors under typical naphtha reforming conditions. Furthermore, the oxygenate can be any alcohol-containing compound. Nonlimiting examples of alcohol-containing compounds suitable for use in the present disclosure include methanol, ethanol, propanol, isopropanol, butanol, t-butanol, pentanol, amyl alcohol, hexanol, cyclohexanol, phenol, or combinations thereof. As will be appreciated by one of skill in the art, and with the help of this disclosure, the presence of an oxygenate causes a specific amount of water to be present in one or more naphtha reforming reactors during the naphtha reforming process. The presence of a specific amount of water in a naphtha reforming reactor can activate or enhance performance of the naphtha reforming catalyst.

In an embodiment, the water (e.g., added water and/or produced water) can be introduced to a naphtha reforming reactor in an amount of less than about 1,000 ppm, alternatively less than about 100 ppm, alternatively less than about 50 ppm, alternatively from about 0.1 ppm to about 50 ppm, alternatively from about 0.5 ppm to about 25 ppm, alternatively from about 1 ppm to about 20 ppm, alternatively from about 2 ppm to about 15 ppm, or alternatively from about 3 ppm to about 10 ppm water, based on the volume of the hydrocarbon feed stream.

As used herein, the term "nitrogenate" refers to ammonia or any chemical compound that forms ammonia under naphtha reforming conditions such as nitrogen, nitrogen-containing compounds, alkyl amines, aromatic amines, pyridines, pyridazines, pyrimidines, pyrazines, triazines, heterocyclic N-oxides, pyrroles, pyrazoles, imadazoles, triazoles, nitriles, amides, ureas, imides, nitro compounds, nitroso compounds, or combinations thereof. Without wishing to be limited by theory, it is believed that the ammonia will improve catalyst activity in much the same way as the water.

In an embodiment, the ammonia (e.g., added ammonia and/or produced ammonia) can be introduced to a naphtha reforming reactor in an amount of less than about 1,000 ppm, alternatively less than about 100 ppm, alternatively less than about 50 ppm, alternatively from about 0.1 ppm to about 50 ppm, alternatively from about 0.5 ppm to about 25 ppm, alternatively from about 1 ppm to about 20 ppm, alternatively from about 2 ppm to about 15 ppm, or alternatively from about 3 ppm to about 10 ppm ammonia, based on the volume of the hydrocarbon feed stream.

As will be appreciated by one of skill in the art, and with the help of this disclosure, any of the oxygenates, nitrogenates, or mixtures thereof disclosed herein can be used alone, in combination, or further combined to produce other suitable oxygenates or nitrogenates. In some embodiments, the oxygenate and nitrogenate may be contained within the same bifunctional compound. The use of oxygenates and/or nitrogenates for enhancing the performance of reforming catalysts is described in more detail in U.S. Pat. Nos. 7,932,425; 8,569,555; and 8,362,310; each of which is incorporated by reference herein in its entirety.

Various upstream hydrocarbon pretreatment steps can be used to prepare the hydrocarbon for the naphtha reforming process. For example, hydrotreating may be used to remove catalyst poisons such as sulfur. Further, contacting the hydrocarbons with a massive nickel catalyst, for example, prior to hydrotreating and reforming can also protect against failure of the hydrotreating system (e.g., against hydrotreating catalyst failure).

In some embodiments, the hydrocarbon feed stream can be processed in a preliminary reactor prior to introducing the hydrocarbon feed stream to the first reactor, where the preliminary reactor can comprise a bed with a sulfur adsorbing material, as will be described in more detail later herein.

In an embodiment, the first reactor can comprise a first inlet and a first outlet, where the hydrocarbon feed stream can be introduced to the first reactor via the first inlet, and where the first reactor effluent can be recovered from the first reactor via the first outlet.

In an embodiment, the first reactor can comprise an adiabatic reactor, where the first reactor can comprise a first naphtha reforming catalyst, and where at least a portion of the convertible hydrocarbons in the hydrocarbon feed stream are converted to aromatic hydrocarbons in the first reactor to form the first reactor effluent. As used herein, an adiabatic reactor is any reactor operated under adiabatic naphtha reforming conditions. Under adiabatic naphtha reforming conditions there is no transfer of heat through the external reactor walls or through internal heat transfer surfaces. Under adiabatic naphtha reforming conditions all the heat necessary for the reactor comes into the reactor with the reactants, specifically the hydrocarbon feed stream. Adiabatic naphtha reforming conditions are naphtha reforming reaction conditions that exclude heat exchange between the reactor (e.g., reforming reactor) and a heat exchange system. As will be appreciated by one of skill in the art and with the help of this disclosure, an adiabatic reactor can have some amount of heat exchange with its surroundings, and such exchange does not constitute "heat exchange" as disclosed herein.

In an embodiment, the adiabatic reactor employed in the processes described herein can be any conventional type of reactor that maintains a catalyst within the reactor and can accommodate a continuous flow of hydrocarbon. An adiabatic reactor system described herein can comprise a fixed catalyst bed system, a moving catalyst bed system, a fluidized catalyst bed system, or combinations thereof. Suitable adiabatic reactors can include, but are not limited to, fixed bed reactors including radial flow reactors, bubble bed reactors, or ebullient bed reactors. The flow of the hydrocarbon feed can be upward, downward, or radially through the adiabatic reactor.

In an embodiment, the first reactor can comprise a radial flow reactor (e.g., an adiabatic radial flow reactor). In an embodiment, the adiabatic reactor can comprise a fixed bed radial flow reactor. Generally, a radial flow reactor is a cylindrical vessel comprising an external reactor shell and a catalyst bed disposed inside the reactor shell. The radial flow reactor usually comprises a center-pipe in the center of the reactor and an outer annulus formed by scallops, the two forming an annular or radial bed, causing the gas to flow between a center-pipe and the outer annulus separated from the external reactor shell by the scallops. Radial flow reactors can be centrifugal (CF) flow type reactors, where a gas is fed to the center-pipe and it flows from the center-pipe outwards, through the annular catalyst bed to the outer annulus; or centripetal (CP) flow type reactors, where a gas is fed to the outer annulus and it flows from the outer annulus inwards, through the annular catalyst bed to the center-pipe. Radial flow reactors have a high flow cross-sectional area per catalyst bed volume, and as such can achieve high throughput without increased gas velocity. In some embodiments, the catalyst bed can be relatively thin, and thus can display a low pressure drop.

In an embodiment, the first reactor can comprise a naphtha reforming catalyst (e.g., a first naphtha reforming catalyst). For purposes of the disclosure herein, a naphtha reforming catalyst refers to any catalyst suitable for carrying out a naphtha reforming process. As will be appreciated by one of skill in the art, and with the help of this disclosure, a suitable naphtha reforming catalyst is capable of converting at least a portion of the convertible hydrocarbons such as aliphatic, alicyclic, and/or naphthenic hydrocarbons (e.g., non-aromatic hydrocarbons) in a hydrocarbon feed stream to aromatic hydrocarbons. Any catalyst capable of carrying out naphtha reforming reactions may be used alone or in combination with additional catalytic materials in the reactors. Suitable naphtha reforming catalysts may include alumina based naphtha reforming catalysts or zeolitic naphtha reforming catalysts. In an aspect, the alumina based naphtha reforming catalysts can comprise a bifunctional catalyst, such as a $Pt/Al_2O_3$ catalyst. In another aspect, the zeolitic naphtha reforming catalysts can comprise a zeolitic reforming catalyst, such as a bound Pt/K L-Zeolite.

In an embodiment, the naphtha reforming catalyst is a zeolitic naphtha reforming catalyst. A suitable zeolitic naphtha reforming catalyst may comprise a bound zeolite support (e.g., silica bound zeolite), at least one group VIII metal, IB metal, or combinations thereof, and one or more halides. Suitable halides include chloride, fluoride, bromide, iodide, or combinations thereof. Suitable Group VIII metals include iron, cobalt, nickel, ruthenium, rhodium, palladium, osmium, iridium, platinum, or combinations thereof. Suitable Group IB metals include copper, silver, gold, or combinations thereof. Examples of naphtha reforming catalysts suitable for use with the catalytic reactor systems described herein are AROMAX® Catalysts available from the Chevron Phillips Chemical Company LP of The Woodlands, Tex., and those discussed in U.S. Pat. Nos. 6,190,539, 6,812,180, 7,153,801, and 8,263,518 each of which is incorporated by reference herein in its entirety.

In an embodiment, the naphtha reforming catalyst can comprise a zeolitic naphtha reforming catalyst, e.g., a naphtha reforming catalyst comprising a group VIII metal on a zeolitic support. Zeolitic reforming catalysts can generally include any inorganic oxide as the binder for the zeolite. The zeolite of the zeolitic reforming catalyst may include bound large pore aluminosilicates (zeolites); and/or large pore aluminosilicates such as a zeolite having an effective pore diameter of about 7 angstroms or larger, which can include, but are not limited to, L-zeolite (LTL), Y-zeolite, mordenite, omega zeolite, beta zeolite, Mazzite (MAZ), and the like. Suitable binders are inorganic oxides which can include, but are not limited to, silica, alumina, clays, titania, and magnesium oxide. In an embodiment, the support comprises a bound zeolitic support. In an aspect, the reforming catalyst can be a silica bound zeolite.

The reforming catalyst may be a dual-function reforming catalyst containing a metallic hydrogenation-dehydrogenation component on an inorganic oxide support which provides acid sites for cracking and isomerization. Examples of suitable inorganic oxide supports for the dual-function reforming catalysts include one or more inorganic oxides such as alumina, silica, titania, magnesia, zirconia, chromia, thoria, boria, spinels (e.g., $MgAl_2O_4$, $FeAl_2O_4$, $ZnAl_2O_4$, $CaAl_2O_4$), and synthetically prepared or naturally occurring clays and silicates. In some aspects, the inorganic oxide supports for the dual-function reforming catalysts may be acid-treated.

The term "zeolite" generally refers to a group of hydrated, crystalline aluminosilicates. These zeolites exhibit a network of $SiO_4$ and $AlO_4$ tetrahedra in which aluminum and silicon atoms are crosslinked in a three-dimensional framework by sharing oxygen atoms. In the framework, the mole ratio of oxygen atoms to the total of aluminum and silicon atoms may be equal to about 2. The framework exhibits a negative electrovalence that typically is balanced by the inclusion of cations within the crystal such as metals, alkali metals, alkaline earth metals, or hydrogen.

Zeolitic naphtha reforming catalysts based on zeolitic supports comprising L-type zeolites are a sub-group of zeolitic catalysts. Typical L-type zeolites contain mole ratios of oxides in accordance with the formula: $M_{2/n}O·Al_2O_3·xSiO_2·yH_2O$ where "M" designates at least one exchangeable cation such as barium, calcium, cerium, lithium, magnesium, potassium, sodium, strontium, and zinc as well as non-metallic cations like hydronium and ammonium ions which may be replaced by other exchangeable cations without causing a substantial alteration of the basic crystal structure of the L-type zeolite. The "n" in the formula represents the valence of "M", "x" is 2 or greater; and "y" is the number of water molecules contained in the channels or interconnected voids with the zeolite. Bound zeolitic supports comprising potassium L-type zeolites, or KL zeolites, have been found to be particularly desirable. The term "KL zeolite" as used herein refers to L-type zeolites in which the principal cation M incorporated in the zeolite is potassium. A KL zeolite may be cation-exchanged or impregnated with another metal and one or more halides to produce a platinum-impregnated, halided zeolite or a KL supported Pt-halide zeolite catalyst.

In an embodiment, the at least one Group VIII metal is platinum. In another embodiment, the at least one Group VIII metal is platinum and the Group IB metal is gold. In an embodiment, the at least one Group VIII metal is platinum and rhenium. The platinum and optionally one or more halides may be added to the zeolitic support by any suitable method, for example via impregnation with a solution of a platinum-containing compound and one or more halide-containing compounds. For example, the platinum-containing compound can be any decomposable platinum-containing compound. Examples of such compounds include, but are not limited to, ammonium tetrachloroplatinate, chloroplatinic acid, diammineplatinum (II) nitrite, bis-(ethylenediamine)platinum (II) chloride, platinum (II) acetylacetonate, dichlorodiammine platinum, platinum (II) chloride, tetraammineplatinum (II) hydroxide, tetraammineplatinum chloride, and tetraammineplatinum (II) nitrate.

In an embodiment, the naphtha reforming catalyst comprises a Group VIII metal; on a bound zeolitic support and at least one ammonium halide compound. The ammonium halide compound may comprise one or more compounds represented by the formula $N(R)_4X$, where X is a halide and where R represents a hydrogen or a substituted or unsubstituted carbon chain molecule having 1-20 carbons, where each R may be the same or different. In an embodiment, R is selected from the group consisting of methyl, ethyl, propyl, butyl, and combinations thereof, more specifically methyl. Examples of suitable ammonium compounds are represented by the formula $N(R)_4X$ and include ammonium chloride, ammonium fluoride, and tetraalkylammonium halides such as tetramethylammonium chloride, tetramethylammonium fluoride, tetraethylammonium chloride, tetraethylammonium fluoride, tetrapropylammonium chloride, tetrapropylammonium fluoride, tetrabutylammonium chloride, tetrabutylammonium fluoride, methyltriethylammonium chloride, methyltriethylammonium fluoride, and combinations thereof.

In an embodiment, the naphtha reforming catalyst can comprise platinum on a bound zeolitic support, such as for example platinum on silica bound KL-zeolite.

The naphtha reforming catalyst can be employed in any of the forms and/or profiles known to the art. The naphtha reforming catalyst can be employed in any desired catalyst shape. Desirable shapes include pills, pellets, granules, broken fragments, or extrudates with any profile known in the art. The naphtha reforming catalyst can be disposed within a reaction zone (e.g., in a fixed bed reactor, or in a moving bed reactor), disposed within a catalyst zone, and a hydrocarbon feed stream may be passed therethrough in the liquid, vapor, or mixed phase, and in either upward or downward, or inward or outward flow (e.g., radial flow).

In an embodiment, a method of carrying out a naphtha reforming process as disclosed herein can further comprise heating the hydrocarbon feed stream in a first furnace prior to introducing the hydrocarbon feed stream to the first reactor. Generally, the first furnace can be located upstream of the first reactor. In an embodiment, the first furnace can be a process heater that brings a feed to a required temperature for an intended reaction. Generally, a process heater (e.g., a fired heater) can be a direct-fired heat exchanger that uses the hot gases of combustion to raise the temperature of a feed flowing through one or more coils and/or tubes aligned throughout the process heater. In an embodiment, the first furnace can comprise any suitable furnace capable of raising the temperature of a feed stream (e.g., hydrocarbon feed stream) to achieve a desired inlet temperature to the reactor immediately downstream of the furnace. The temperature of the feed stream (e.g., hydrocarbon feed stream) needs to be raised so that the naphtha reforming reactions proceed in the subsequent reactor (e.g., first reactor), which is generally needed due to the endothermic nature of the reforming reactions.

In an embodiment, the first furnace can comprise tubes disposed therein, where the tubes can be in fluid communication with the first inlet of the first reactor, and where the first furnace is configured to heat a hydrocarbon feed stream (e.g., heat the tubes that the hydrocarbon feed stream is flowing through) prior to the hydrocarbon feed stream entering the first inlet of the first reactor.

In an embodiment, a method of carrying out a naphtha reforming process as disclosed herein can further comprise heating the hydrocarbon feed stream in a heat exchanger prior to introducing the hydrocarbon feed stream to the first reactor. The hydrocarbon feed stream can exchange heat with downstream reactor effluents (e.g., first reactor effluent, second reactor effluent, feed effluent heat exchanger effluent, etc.) to increase a temperature of the hydrocarbon feed stream, while decreasing a temperature of the downstream reactor effluent.

In an embodiment, the hydrocarbon feed stream can be heated while cooling the second reactor effluent by heat exchange between the second reactor effluent with the hydrocarbon feed stream.

In some embodiments, a method of carrying out a naphtha reforming process as disclosed herein can further comprise heating the hydrocarbon feed stream in a heat exchanger prior to introducing the hydrocarbon feed stream to the first furnace to yield a preheated hydrocarbon feed stream, and further heating the preheated hydrocarbon feed stream in a first furnace prior to introducing the hydrocarbon feed stream to the first reactor.

In general, the naphtha reforming reactions occurs under process conditions that thermodynamically favor the dehydrocyclization reactions and limit undesirable hydrocracking reactions, whether the naphtha reforming reactions are carried out in an adiabatic reactor, an isothermal reactor, or both. The naphtha reforming reactions can be carried out using any conventional naphtha reforming conditions, and may be carried out at reactor inlet temperatures ranging from about 600° F. (316° C.) to about 1,000° F. (538° C.), alternatively from about 650° F. (343° C.) to about 1,000° F. (538° C.), alternatively from about 700° F. (371° C.) to about 950° F. (510° C.), alternatively from about 750° F. (399° C.) to about 950° F. (510° C.), or alternatively from about 800° F. (427° C.) to about 950° F. (510° C.). Reaction pressures can range from about atmospheric pressure to about 300 psig (2.07 MPa), alternatively from about 25 psig (0.17 MPa) to about 300 psig (2.07 MPa), or alternatively from about 30 psig (0.21 MPa) to about 100 psig (0.69 MPa). The mole ratio of hydrogen to hydrocarbon in the hydrocarbon feed stream is normally between about 0.1:1 and about 10:1, alternatively from about 0.5:1 to about 5.0:1, or alternatively from about 1:1 to about 3:1. The liquid hourly space velocity (LHSV) for the hydrocarbon feed stream over the naphtha reforming catalyst (e.g., aromatization catalyst) is from about 0.5 hr$^{-1}$ to about 20 hr$^{-1}$, or alternatively from about 0.50 hr$^{-1}$ to about 5.0 hr$^{-1}$, based on the naphtha reforming catalyst in a reaction zone.

In an embodiment, an operating temperature in the first reactor does not exceed about 1,000° F. (538° C.), alternatively about 975° F. (524° C.), or alternatively about 950° F. (510° C.). In such embodiment, the first inlet of the first reactor can be configured to be maintained at a temperature of less than about 1,000° F. (538° C.), alternatively less than about 975° F. (524° C.), or alternatively less than about 950° F. (510° C.).

In an embodiment, a second or subsequent (e.g., downstream) reactor can comprise a second inlet and a second outlet, where the first reactor effluent can be introduced to the second reactor via the second inlet, and where the second reactor effluent can be recovered from the second reactor via the second outlet. In an embodiment, the second inlet of the second reactor can be in fluid communication with the first outlet of the first reactor. The first reactor effluent can be recovered from the first reactor via the first outlet, and then can be passed to the second reactor via the second inlet.

In an embodiment, the second reactor can comprise an isothermal reactor (e.g., reactor operating under approximately isothermal naphtha reforming conditions), where the second reactor can comprise a second naphtha reforming catalyst and where at least a portion of the convertible hydrocarbons in the first reactor effluent can be converted to an additional amount of the aromatic hydrocarbons in the second reactor to form the second reactor effluent. Generally, the term "isothermal" refers to a fairly constant temperature. As will be appreciated by one of skill in the art, and with the help of this disclosure, isothermal reactors are subjected to external heat exchange to ensure a constant operating temperature, for example isothermal reactors are either heated or cooled (depending on the type of the reaction that is performed inside the reactor).

In an embodiment, the second reactor can comprise a naphtha reforming catalyst (e.g., a second naphtha reforming catalyst). The second naphtha reforming catalyst can comprise any suitable naphtha reforming catalyst, for example a naphtha reforming catalyst as described previously herein for the first naphtha reforming catalyst. In some embodiments, the first naphtha reforming catalyst and the second naphtha reforming catalyst can be the same. In other embodiments, the first naphtha reforming catalyst and the second naphtha reforming catalyst can be different.

In some embodiments, the first naphtha reforming catalyst, the second naphtha reforming catalyst, or both can comprise a zeolitic naphtha reforming catalyst, for example platinum on a bound zeolitic support, such as platinum on silica bound KL-zeolite.

As used herein, an isothermal reactor is a reactor that is characterized by a fairly constant temperature within the catalyst bed that undergoes a reaction with a feed stream or reactant stream in the isothermal reactor (e.g., within a narrow temperature range, such as within a temperature difference of 50° C., 40° C., 30° C., 20° C., or 10° C.). Further, for purposes of the disclosure herein, an isothermal reactor can be defined as a reactor operating at a temperature above a certain threshold, such as a reactor operating at a temperature capable of sustaining a naphtha reforming reactions (e.g., a reactor operating at a temperature above the activation temperature for the naphtha reforming reactions).

In an embodiment, an operating temperature in the second reactor does not exceed about 1,000° F. (538° C.), alternatively about 975° F. (524° C.), or alternatively about 950° F. (510° C.). In an embodiment, the second inlet can be configured to be maintained at a temperature of less than about 1,000° F. (538° C.), alternatively less than about 975° F. (524° C.), or alternatively less than about 950° F. (510° C.).

In an embodiment, operating under isothermal naphtha reforming conditions in the second reactor can comprise operating at a temperature equal to or greater than about 800° F. (425° C.), alternatively equal to or greater than about 850° F. (450° C.), or alternatively equal to or greater than about 925° F. (500° C.).

In an embodiment, one or more temperature indicators (e.g., thermocouples) could be incorporated into some of the tubes of the plurality of tubes of the second reactor (e.g., isothermal reactor), such that an internal tube temperature could be monitored. In an embodiment, temperature indicators can be incorporated into about 1% to about 5% of the total number of tubes of the plurality of tubes in the isothermal reactor.

In an embodiment, the second reactor can comprise one or more tubes disposed within a reactor furnace, where each tube can comprise the second naphtha reforming catalyst. In an embodiment, the second reactor can comprise a plurality of tubes with particles of the second naphtha reforming catalyst disposed therein, where the plurality of tubes is disposed within a reactor furnace. The first reactor effluent can enter the plurality of tubes comprising the second naphtha reforming catalyst, and undergoes the naphtha reforming reactions as it travels within the tubes to produce the second reactor effluent which exits the tubes and is recovered from the second reactor. Generally, the reactor furnace can comprise any suitable furnace, such as a process heater (e.g., a fired heater) housing the plurality of tubes comprising the second naphtha reforming catalyst, where the reactor furnace can be a direct-fired heat exchanger that uses the hot gases and radiant energy of combustion to raise and maintain the temperature of a feed flowing through and reacting within the plurality of tubes housed therein. In an embodiment, the plurality of tubes comprising the second naphtha reforming catalyst disposed therein can be heated by burners in the reactor furnace.

In an embodiment, the first reactor effluent can be heated within the second reactor, where heating the first reactor effluent within the second reactor occurs during the conversion of at least a portion of the convertible hydrocarbons in the first reactor effluent to an additional amount of the aromatic hydrocarbons in the second reactor to form the second reactor effluent. As will be appreciated by one of skill in the art, and with the help of this disclosure, in order to perform an endothermic reaction (e.g., naphtha reforming reactions) under isothermal conditions (e.g., isothermal naphtha reforming conditions), the reaction zone (e.g., reactants such as the convertible hydrocarbons within a reaction zone) has to be supplied with heat to maintain the temperature within a desired range, or above a desired temperature (e.g., above the activation temperature for the naphtha reforming reactions).

In some embodiments, the reactor furnace can comprise a radiant zone and a convection zone (e.g., a non-radiant zone). The radiant zone of the reactor furnace comprises the zone where the firing of a plurality of burners produces radiant energy and a hot flue gas. The plurality of tubes can be heated by direct exposure to the radiant energy and the hot flue gas in the radiant zone of the reactor furnace. As will be appreciated by one of skill in the art, and with the help of this disclosure, the primary type of heat transfer in the radiant zone heated by burners is radiative heat transfer, although some convective heat transfer also occurs in the radiant zone. The hot flue gas is discharged from the radiant zone via the convection zone into the atmosphere. Here, the hot flue gas is utilized as heat transfer medium in the convection zone. The convection zone of the reactor furnace therefore has at least one heat exchanger for heating the first reactor effluent. The convection zone of the reactor furnace may have other heat exchangers to heat other streams within the process to maximize heat integration. For example, preheating hydrocarbon feed streams or for the production of steam. As will be appreciated by one of skill in the art, and with the help of this disclosure, the primary type of heat transfer in the convection zone is convective heat transfer, although some radiative heat transfer may also occur in the convection zone.

The convection zone of the reactor furnace comprises the zone of the reactor furnace where the first reactor effluent travels through prior to entering the plurality of tubes comprising particles of the second naphtha reforming catalyst disposed therein. The convection zone allows the first reactor effluent to capture available heat, thereby increasing the temperature of the first reactor effluent, prior to the first reactor effluent entering the second reactor (e.g., isothermal reactor). The second reactor effluent that exits the plurality of tubes comprising particles of the second naphtha reforming catalyst disposed therein can also travel through the convection zone of the reactor furnace prior to recovering the second reactor effluent from the second reactor (e.g., isothermal reactor). The convection zone allows the second reactor effluent to capture available heat, thereby increasing the temperature of the second reactor effluent, prior to the second reactor effluent being recovered from the second reactor (e.g., isothermal reactor). The heat captured by the second reactor effluent can be used for heat transfer in a heat exchanger, as described in more detail later herein.

In some embodiments, the first reactor effluent can be heated prior to passing the first reactor effluent into the second reactor. In an embodiment, heating the first reactor effluent comprises heating the first reactor effluent within heat exchange tubes disposed within the convection zone of the reactor furnace, where the heat exchange tubes are in fluid communication with the second inlet of the second reactor. The flow of first reactor effluent can be distributed between a plurality of heat exchange tubes in the convection zone, to allow for more efficient heat transfer to the first reactor effluent.

In an embodiment, a method of carrying out a naphtha reforming process as disclosed herein can further comprise heating the first reactor effluent in a second furnace prior to introducing the first reactor effluent to the second reactor. Generally, the second furnace can be located upstream of the second reactor (e.g., upstream of the reactor furnace). In an embodiment, the second furnace can be a process heater that brings a feed to a required temperature for an intended reaction, such as for example a process heater as described herein for the first furnace. In an embodiment, the second furnace can comprise any suitable furnace capable of raising the temperature of a feed stream (e.g., first reactor effluent) to achieve a desired inlet temperature to the reactor immediately downstream of the second furnace (e.g., second reactor). The temperature of the feed stream (e.g., first reactor effluent) can be raised so that the naphtha reforming reactions proceed in the subsequent reactor (e.g., second reactor), which is generally needed due to the endothermic nature of the naphtha reforming reactions.

In an embodiment, the second furnace can comprise heat exchange tubes disposed therein, where the heat exchange tubes can be in fluid communication with the second inlet of the second reactor, and where the second furnace is configured to heat the first reactor effluent stream (e.g., heat the heat exchange tubes that the first reactor effluent stream is flowing through) prior to the first reactor effluent stream entering the second inlet of the second reactor.

In an embodiment, a method of carrying out a naphtha reforming process as disclosed herein can comprise heating the first reactor effluent in a heat exchanger prior to introducing the first reactor effluent to the second reactor. The first reactor effluent can exchange heat with downstream reactor effluents (e.g., second reactor effluent) to increase a temperature of the first reactor effluent, while decreasing a temperature of the downstream reactor effluent.

In an embodiment, the first reactor effluent can be heated while cooling the second reactor effluent by heat exchange between the second reactor effluent and the first reactor effluent. In an embodiment, a heat exchanger can be configured to provide thermal contact between a fluid passing through the second outlet of the second reactor and a fluid passing into the second inlet of the second reactor.

In some embodiments, heating the first reactor effluent can comprises heating the first reactor effluent while cooling the second reactor effluent by heat exchange in a feed effluent heat exchanger to produce a feed effluent heat exchanger effluent, where the feed effluent heat exchanger effluent is the cooled second reactor effluent. The feed effluent heat exchanger effluent can be further used in another heat exchanger, for example for heating the hydrocarbon feed stream.

In an embodiment, a heat exchanger can be configured to provide thermal contact between a fluid passing through the second outlet of the second reactor and a fluid passing through the first outlet of the first reactor. In such embodiment, the fluid passing through the first outlet of the first reactor can be subjected to a first heating step in the heat exchanger, and subsequently to any other desired heating steps, such as for example in a furnace (e.g., a second furnace) and/or in the convection zone of the reactor furnace, prior to introducing the fluid into the second inlet of the second reactor.

In some embodiments, a method of carrying out a naphtha reforming process as disclosed herein can further comprise heating the first reactor effluent in a heat exchanger prior to introducing the first reactor effluent to the second furnace to yield a preheated first reactor effluent, and further heating the preheated first reactor effluent in a second furnace and/or a convection zone of the reactor furnace prior to introducing the first reactor effluent to the second reactor.

In an embodiment, a reactor system for carrying out a naphtha reforming process as disclosed herein can further comprise a third reactor comprising a third inlet and a third outlet, where the third reactor is configured to operate as an adiabatic reactor, and where the third reactor comprises a third reforming catalyst. The third reforming catalyst can be any suitable naphtha reforming catalyst described herein for the first naphtha reforming catalyst, the second naphtha reforming catalyst or both. In some embodiments, the third reforming catalyst can be the same as the first naphtha reforming catalyst or the second naphtha reforming catalyst. In other embodiments, the third reforming catalyst can be different than the first naphtha reforming catalyst or the second naphtha reforming catalyst. In an embodiment, the third reforming catalyst can comprise a zeolitic naphtha reforming catalyst. In an embodiment, the third reactor can be a radial flow reactor.

In an aspect, a radial flow reactor of the type disclosed herein can comprise a naphtha reforming catalyst having a catalyst particle size of from about 0.01 inches (0.25 mm) to about 0.5 inches (12.7 mm), alternatively from about 0.05 inches (1.27 mm) to about 0.35 inches (8.89 mm), or alternatively from about 0.0625 inches (1.59 mm) to about 0.25 inches (6.35 mm).

In an embodiment, the third outlet of the third reactor can be in fluid communication with the first inlet of the first reactor. In some embodiments, a raw hydrocarbon feed stream can be introduced to the third reactor via the third inlet. A temperature in the third reactor can be suitable for the naphtha reforming catalyst in the third reactor to absorb sulfur (e.g., sulfur containing compounds) that might be present in the hydrocarbon feed stream. The catalyst in the third reactor coupled in series with the first reactor can be used as a sulfur adsorbing material to protect the catalyst in the remainder of the reactors in the reactor system for carrying out a naphtha reforming process as disclosed herein. The third reactor may allow for the elimination of a separate sulfur converter adsorber (SCA), thus simplifying the process and saving the capital and operating costs associated with the operation of a sulfur converter adsorber.

In some embodiments, a reactor system for carrying out a naphtha reforming process as disclosed herein does not comprise a sulfur converter adsorber. Sulfur adsorbing systems will be described in more detail later herein.

In an embodiment, a third reactor effluent comprising the hydrocarbon feed stream can be recovered from the third reactor via the third outlet of the third reactor. A concentration of sulfur (e.g., sulfur containing compounds) in the hydrocarbon feed stream can be lower than a concentration of sulfur (e.g., sulfur containing compounds) in the raw hydrocarbon feed stream.

In some embodiments, an increase in an outlet reactor temperature in the third reactor could indicate a loss of activity for an endothermic reaction, e.g., could indicate that the naphtha reforming catalyst in the third reactor is spent and should be rejuvenated. Alternatively, a sulfur (e.g., sulfur containing compounds) concentration of the third reactor effluent could be monitored to indicate when the third reforming catalyst would require to be rejuvenated.

An embodiment of a general naphtha reforming process 100 is shown in FIG. 1. At the inlet of the process, the hydrocarbon feed stream is fed through line 102. The hydrocarbon feed stream passing through line 102 can be heated in a first furnace 108 to increase the temperature of the hydrocarbon feed stream. The heated hydrocarbon feed stream passing through line 109 can be introduced to a first reactor 110, where the first reactor 110 can be an adiabatic radial flow reactor comprising a catalyst bed 112 disposed therein, and where the catalyst bed 112 can comprise a first naphtha reforming catalyst. The first reactor 110 can include any of the adiabatic reactors described herein. At least a portion of the convertible hydrocarbons in the hydrocarbon feed stream can be converted to aromatic hydrocarbons in the first reactor 110 to form a first reactor effluent. The first reactor effluent passing through line 116 can be heated in a second furnace 120 to increase the temperature of the first reactor effluent. The heated first reactor effluent passing through line 122 can be introduced to a second reactor 140, where the second reactor 140 can operate under isothermal naphtha reforming conditions. The second reactor 140 can include any of the isothermal reactors described herein. The second reactor 140 can comprise a plurality of tubes 142 having a second naphtha reforming catalyst disposed therein, where the plurality of tubes 142 can be disposed within a reactor furnace 150. The first naphtha reforming catalyst and the second naphtha reforming catalyst can be the same or different. At least an additional portion of the convertible hydrocarbons in the first reactor effluent can be converted to aromatic hydrocarbons in the second reactor 140 to form a second reactor effluent 144. As will be appreciated by one of skill in the art, and with the help of this disclosure, although the isothermal tubes are depicted in the Figures herein as being grouped into bundles (e.g., two tube bundles), the isothermal tubes can be disposed in any suitable configuration, such as in a suitable matrix pattern of tubes (e.g., which could be larger tubes), spaced out for example in a triangular or square grid pattern. Further, and as will be appreciated by one of skill in the art, and with the help of this disclosure, although the isothermal tubes are depicted in the Figures herein as being grouped into two bundles, any suitable number of tube bundles can be used, such as 1, 2, 3, 4, 5, 6, 7, 8, 9, 10 or more tube bundles.

Figure 2:
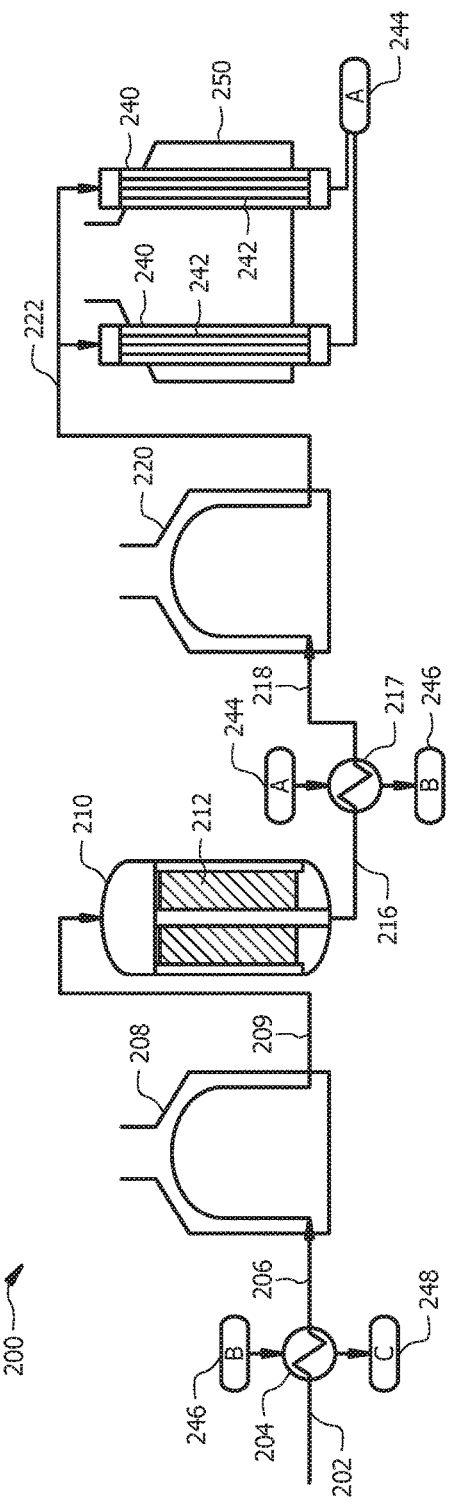
FIG. 2 is a flow diagram of another embodiment of a naphtha reforming process of the present disclosure.

An embodiment of another naphtha reforming process 200 is shown in FIG. 2. At the inlet of the process, the hydrocarbon feed stream is fed through line 202. The hydrocarbon feed stream passing through line 202 can be passed through a first heat exchanger 204 to preheat the hydrocarbon feed stream. The hydrocarbon feed stream passing through line 202 can capture heat from a second reactor effluent 246 in the first heat exchanger 204 to produce a preheated hydrocarbon feed stream passing through line 206, where a temperature of the second reactor effluent 246 is greater than a temperature of the hydrocarbon feed stream passing through line 202, and where the second reactor effluent 246 gives away heat and produces a second reactor effluent 248.

The preheated hydrocarbon feed stream passing through line 206 can be heated in a first furnace 208 to further increase the temperature of the hydrocarbon feed stream. For example, the preheated hydrocarbon feed stream passing through line 206 can be heated in a first furnace 208 to a naphtha reforming temperature. The heated hydrocarbon feed stream passing through line 209 can be introduced to a first reactor 210, where the first reactor 210 can be an adiabatic radial flow reactor comprising a catalyst bed 212 disposed therein, and where the catalyst bed 212 can comprise a first naphtha reforming catalyst. The first reactor 210 can include any of the adiabatic reactors described herein. At least a portion of the convertible hydrocarbons in the hydrocarbon feed stream can be converted to aromatic hydrocarbons in the first reactor 210 to form a first reactor effluent passing through line 216.

The first reactor effluent passing through line 216 can be passed through a second heat exchanger 217 to preheat the first reactor effluent. The first reactor effluent passing through line 216 can capture heat from a second reactor effluent 244 in the second heat exchanger 217 to produce a preheated first reactor effluent passing through line 218, where a temperature of the second reactor effluent 244 is greater than a temperature of the first reactor effluent passing through line 216, and where the second reactor effluent 244 gives away heat and produces a second reactor effluent 246.

The preheated first reactor effluent passing through line 218 can be heated in a second furnace 220 to further increase the temperature of the first reactor effluent. For example, the preheated first reactor effluent passing through line 218 can be heated in a second furnace 220 to a naphtha reforming temperature. The heated first reactor effluent passing through line 222 can be introduced to a second reactor 240, where the second reactor 240 can operate under isothermal naphtha reforming conditions. The second reactor 240 can include any of the isothermal reactors described herein. The second reactor 240 can comprise a plurality of tubes 242 having a second naphtha reforming catalyst disposed therein, where the plurality of tubes 242 can be disposed within a reactor furnace 250. The first naphtha reforming catalyst and the second naphtha reforming catalyst can be the same or different. At least an additional portion of the convertible hydrocarbons in the first reactor effluent can be converted to aromatic hydrocarbons in the second reactor 240 to form a second reactor effluent 244.

The second reactor effluent 244 can exchange heat with the first reactor effluent in the second heat exchanger 217 to produce a second reactor effluent 246, where a temperature of the second reactor effluent 246 is lower than a temperature of the second reactor effluent 244. The second reactor effluent 246 can further exchange heat with the hydrocarbon feed stream in the first heat exchanger 204 to produce a second reactor effluent 248, where a temperature of the second reactor effluent 248 is lower than a temperature of the second reactor effluent 246.

An embodiment of yet another naphtha reforming process 300 is shown in FIG. 3. At the inlet of the process, the hydrocarbon feed stream is fed through line 302. The hydrocarbon feed stream passing through line 302 can be passed through a first heat exchanger 304 to preheat the hydrocarbon feed stream. The hydrocarbon feed stream passing through line 302 can capture heat from a second reactor effluent 346 in the first heat exchanger 304 to produce a preheated hydrocarbon feed stream passing through line 306, where a temperature of the second reactor effluent 346 is greater than a temperature of the hydrocarbon feed stream passing through line 302, and where the second reactor effluent 346 gives away heat and produces a second reactor effluent 348.

The preheated hydrocarbon feed stream passing through line 306 can be heated in a first furnace 308 to further increase the temperature of the hydrocarbon feed stream. For example, the preheated hydrocarbon feed stream passing through line 306 can be heated in a first furnace 308 to a naphtha reforming temperature. The heated hydrocarbon feed stream passing through line 309 can be introduced to a first reactor 310, where the first reactor 310 can be an adiabatic radial flow reactor comprising a catalyst bed 312 disposed therein, and where the catalyst bed 312 can comprise a first naphtha reforming catalyst. The first reactor 310 can include any of the adiabatic reactors described herein. At least a portion of the convertible hydrocarbons in the hydrocarbon feed stream can be converted to aromatic hydrocarbons in the first reactor 310 to form a first reactor effluent passing from the first reactor in line 316.

The first reactor effluent passing through line 316 can be passed through a second heat exchanger 317 to preheat the first reactor effluent. The first reactor effluent passing through line 316 can capture heat from a second reactor effluent 344 in the second heat exchanger 317 to produce a preheated first reactor effluent passing through line 318, where a temperature of the second reactor effluent 344 is greater than a temperature of the first reactor effluent passing through line 316, and where the second reactor effluent 344 gives away heat and produces a second reactor effluent 346.

The preheated first reactor effluent passing through line 318 can be heated in a convection zone 330 of a reactor furnace 350 to further increase the temperature of the first reactor effluent. For example, the preheated first reactor effluent passing through line 318 can be heated in a convection zone 330 of a reactor furnace 350 to a naphtha reforming temperature. The heated first reactor effluent passing through line 322 can be introduced to a second reactor 340, where the second reactor 340 can operate under isothermal naphtha reforming conditions. The second reactor 340 can include any of the isothermal reactors described herein. The second reactor 340 can comprise a plurality of tubes 342 having a second naphtha reforming catalyst disposed therein, where the plurality of tubes 342 can be disposed within a radiant zone of the reactor furnace 350. The first naphtha reforming catalyst and the second naphtha reforming catalyst can be the same or different. At least an additional portion of the convertible hydrocarbons in the first reactor effluent can be converted to aromatic hydrocarbons in the second reactor 340 to form a second reactor effluent 344.

The second reactor effluent 344 can exchange heat with the first reactor effluent in the second heat exchanger 317 to produce a second reactor effluent 346, where a temperature of the second reactor effluent 346 is lower than a temperature of the second reactor effluent 344. The second reactor effluent 346 can further exchange heat with the hydrocarbon feed stream in the first heat exchanger 304 to produce a second reactor effluent 348, where a temperature of the second reactor effluent 348 is lower than a temperature of the second reactor effluent 346.

An embodiment of still yet another naphtha reforming process 400 is shown in FIG. 4. At the inlet of the process, the hydrocarbon feed stream is fed through line 402. The hydrocarbon feed stream passing through line 402 can be passed through a first heat exchanger 404 to preheat the hydrocarbon feed stream. The hydrocarbon feed stream passing through line 402 can capture heat from an isothermal reactor effluent 446 in the first heat exchanger 404 to produce a preheated hydrocarbon feed stream passing through line 406, where a temperature of the isothermal reactor effluent 446 is greater than a temperature of the hydrocarbon feed stream passing through line 402, and where the isothermal reactor effluent 446 gives away heat and produces an isothermal reactor effluent 448.

The preheated hydrocarbon feed stream passing through line 406 can be heated in a first furnace 408 to further increase the temperature of the hydrocarbon feed stream. For example, the preheated hydrocarbon feed stream passing through line 406 can be heated in a first furnace 408 to a naphtha reforming temperature. A first portion 409a of the heated hydrocarbon feed stream passing through line 409 can be introduced to a first adiabatic reactor 410, and a second portion 409b of the heated hydrocarbon feed stream passing through line 409 can be introduced to a second adiabatic reactor 411. The first adiabatic reactor 410 and/or the second adiabatic reactor 411 can include any of the adiabatic reactors described herein. The first adiabatic reactor 410 can be an adiabatic radial flow reactor comprising a first catalyst bed 412 disposed therein, where the first catalyst bed 412 can comprise a first naphtha reforming catalyst. The second adiabatic reactor 411 can be an adiabatic radial flow reactor comprising a second catalyst bed 413 disposed therein, where the second catalyst bed 413 can comprise a first naphtha reforming catalyst. The first naphtha reforming catalyst of the first adiabatic reactor 410 and the first naphtha reforming catalyst of the second adiabatic reactor 411 can be the same or different. In an embodiment, the first naphtha reforming catalyst of the first adiabatic reactor 410 and the first naphtha reforming catalyst of the second adiabatic reactor 411 are the same. At least a portion of the convertible hydrocarbons in the hydrocarbon feed stream passing though line 409a can be converted to aromatic hydrocarbons in the first adiabatic reactor 410 to form an adiabatic reactor effluent passing through line 416a. At least a portion of the convertible hydrocarbons in the hydrocarbon feed stream passing though line 409b can be converted to aromatic hydrocarbons in the second adiabatic reactor 411 to form an adiabatic reactor effluent passing through line 416b. The first adiabatic reactor 410 and the second adiabatic reactor 411 can be connected (e.g., run) in parallel, and as such, when either adiabatic reactor has to be serviced, for example to restore catalyst activity, one adiabatic reactor can be disconnected and serviced, while the other adiabatic reactor can continue the naphtha reforming process, thereby providing for a continuous naphtha reforming process. As will be appreciated by one of skill in the art, and with the help of this disclosure, when one adiabatic reactor is disconnected, the overall production rates given by the adiabatic reactor that continues the naphtha reforming process are reduced, although the naphtha reforming process remains continuous.

The adiabatic reactor effluent passing through line 416 (e.g., the combined streams of adiabatic reactor effluent passing through lines 416a and 416b) can be passed through a second heat exchanger 417 to preheat the adiabatic reactor effluent. The adiabatic reactor effluent passing through line 416 can capture heat from an isothermal reactor effluent 444 in the second heat exchanger 417 to produce a preheated first adiabatic effluent passing through line 418, where a temperature of the isothermal reactor effluent 444 is greater than a temperature of the adiabatic reactor effluent passing through line 416, and where the isothermal reactor effluent 444 gives away heat and produces an isothermal reactor effluent 446.

A first portion 418a of the preheated adiabatic reactor effluent passing through line 418 can be heated in a convection zone 430 of a first reactor furnace 450 to further increase the temperature of the adiabatic reactor effluent. For example, the first portion 418a of the preheated adiabatic reactor effluent passing through line 418 can be heated in a convection zone 430 of a first reactor furnace 450 to a naphtha reforming temperature. A second portion 418b of the preheated adiabatic reactor effluent passing through line 418 can be heated in a convection zone 431 of a second reactor furnace 451 to further increase the temperature of the adiabatic reactor effluent. For example, the second portion 418b of the preheated adiabatic reactor effluent passing through line 418 can be heated in a convection zone 431 of a second reactor furnace 451 to a naphtha reforming temperature. The heated adiabatic reactor effluent passing through line 422 can be introduced to a first isothermal reactor 440, where the first isothermal reactor 440 can operate under isothermal naphtha reforming conditions. The heated adiabatic reactor effluent passing through line 423 can be introduced to a second isothermal reactor 441, where the second isothermal reactor 441 can operate under isothermal naphtha reforming conditions. The first isothermal reactor 440 and/or the second isothermal reactor 441 can include any of the isothermal reactors described herein.

The first isothermal reactor 440 can comprise a plurality of tubes 442 having a second naphtha reforming catalyst disposed therein, where the plurality of tubes 442 can be disposed within a radiant zone of the first reactor furnace 450. At least an additional portion of the convertible hydrocarbons in the adiabatic reactor effluent can be converted to aromatic hydrocarbons in the first isothermal reactor 440 to form a first isothermal reactor effluent 444a. The second isothermal reactor 441 can comprise a plurality of tubes 443 having a second naphtha reforming catalyst disposed therein, where the plurality of tubes 443 can be disposed within a radiant zone of the second reactor furnace 451. The first naphtha reforming catalyst and the second naphtha reforming catalyst can be the same or different. At least an additional portion of the convertible hydrocarbons in the adiabatic reactor effluent can be converted to aromatic hydrocarbons in the second isothermal reactor 441 to form a second isothermal reactor effluent 444b. The first isothermal reactor 440 and the second isothermal reactor 441 are connected (e.g., run) in parallel, and as such, when either isothermal reactor has to be serviced, for example to restore catalyst activity, one isothermal reactor can be disconnected and serviced, while the other isothermal reactor can continue the naphtha reforming process, thereby providing for a continuous naphtha reforming process. As will be appreciated by one of skill in the art, and with the help of this disclosure, when one isothermal reactor is disconnected, the overall production rates given by the isothermal reactor that continues the naphtha reforming process are reduced, although the naphtha reforming process remains continuous.

The isothermal reactor effluent 444 (e.g., the combined streams of isothermal reactor effluent passing through lines 444a and 444b) can exchange heat with the adiabatic reactor effluent in the second heat exchanger 417 to produce an isothermal reactor effluent 446, where a temperature of the isothermal reactor effluent 446 is lower than a temperature of the isothermal reactor effluent 444. The isothermal reactor effluent 446 can further exchange heat with the hydrocarbon feed stream in the first heat exchanger 404 to produce an isothermal reactor effluent 448, where a temperature of the isothermal reactor effluent 448 is lower than a temperature of the isothermal reactor effluent 446.

Figure 5A:
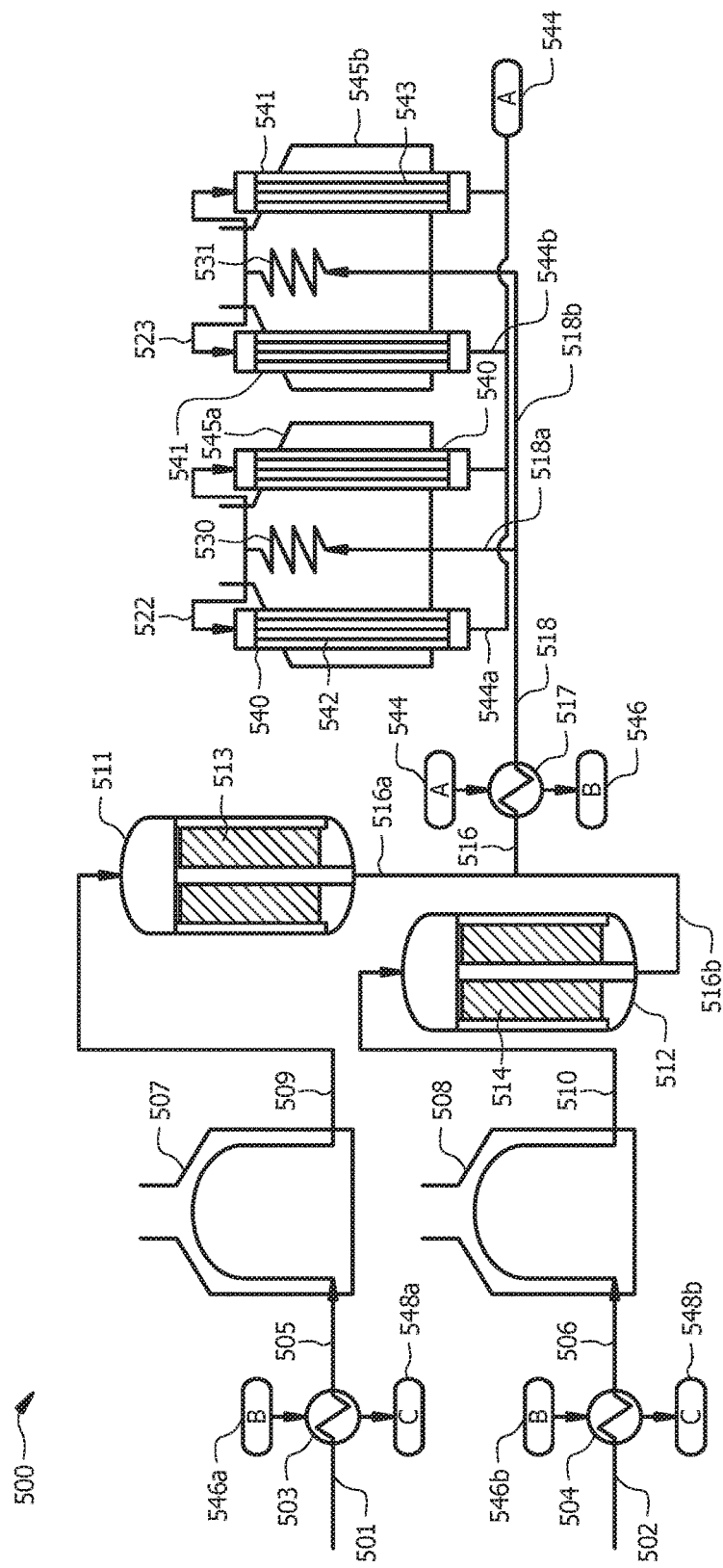
FIG. 5A is a flow diagram of still yet another embodiment of a naphtha reforming process of the present disclosure.

An embodiment of still yet another naphtha reforming process 500 is shown in FIG. 5A. At the inlet of the process, a first hydrocarbon feed stream is fed through line 501, and a second hydrocarbon feed stream is fed through line 502. The first hydrocarbon feed stream passing through line 501 can be passed through a first heat exchanger 503 to preheat the first hydrocarbon feed stream. The first hydrocarbon feed stream passing through line 501 can capture heat from an isothermal reactor effluent 546a in the first heat exchanger 503 to produce a preheated first hydrocarbon feed stream passing through line 505, where a temperature of the isothermal reactor effluent 546a is greater than a temperature of the first hydrocarbon feed stream passing through line 501, and where the isothermal reactor effluent 546a gives away heat and produces an isothermal reactor effluent 548a.

The preheated first hydrocarbon feed stream passing through line 505 can be heated in a first furnace 507 to further increase the temperature of the first hydrocarbon feed stream. For example, the preheated first hydrocarbon feed stream passing through line 505 can be heated in a first furnace 507 to a naphtha reforming temperature. The heated first hydrocarbon feed stream passing through line 509 can be introduced to a first adiabatic reactor 511. The first adiabatic reactor 511 can include any of the adiabatic reactors described herein. The first adiabatic reactor 511 can be an adiabatic radial flow reactor comprising a first catalyst bed 513 disposed therein, where the first catalyst bed 513 can comprise a first naphtha reforming catalyst. At least a portion of the convertible hydrocarbons in the first hydrocarbon feed stream passing though line 509 can be converted to aromatic hydrocarbons in the first adiabatic reactor 511 to form an adiabatic reactor effluent passing through line 516a.

The second hydrocarbon feed stream passing through line 502 can be passed through a second heat exchanger 504 to preheat the second hydrocarbon feed stream. The second hydrocarbon feed stream passing through line 502 can capture heat from an isothermal reactor effluent 546b in the second heat exchanger 504 to produce a preheated second hydrocarbon feed stream passing through line 506, where a temperature of the isothermal reactor effluent 546b is greater than a temperature of the second hydrocarbon feed stream passing through line 502, and where the isothermal reactor effluent 546b gives away heat and produces an isothermal reactor effluent 548b.

The preheated second hydrocarbon feed stream passing through line 506 can be heated in a second furnace 508 to further increase the temperature of the second hydrocarbon feed stream. For example, the preheated second hydrocarbon feed stream passing through line 506 can be heated in a second furnace 508 to a naphtha reforming temperature. The heated second hydrocarbon feed stream passing through line 510 can be introduced to a second adiabatic reactor 512. The second adiabatic reactor 512 can include any of the adiabatic reactors described herein. The second adiabatic reactor 512 can be an adiabatic radial flow reactor comprising a second catalyst bed 514 disposed therein, where the second catalyst bed 514 can comprise a first naphtha reforming catalyst. The first naphtha reforming catalyst of the first adiabatic reactor 511 and the first naphtha reforming catalyst of the second adiabatic reactor 512 can be the same or different. In an embodiment, the first naphtha reforming catalyst of the first adiabatic reactor 511 and the first naphtha reforming catalyst of the second adiabatic reactor 512 are the same. At least a portion of the convertible hydrocarbons in the second hydrocarbon feed stream passing though line 510 can be converted to aromatic hydrocarbons in the second adiabatic reactor 512 to form an adiabatic reactor effluent passing through line 516b. The first adiabatic reactor 511 and the second adiabatic reactor 512 are connected (e.g., run) in parallel, and as such, when either adiabatic reactor has to be serviced, for example to restore catalyst activity, one adiabatic reactor can be disconnected and serviced, while the other adiabatic reactor can continue the naphtha reforming process, thereby providing for a continuous naphtha reforming process.

The adiabatic reactor effluent passing through line 516 (e.g., the combined streams of adiabatic reactor effluent passing through lines 516a and 516b) can be passed through a third heat exchanger 517 to preheat the adiabatic reactor effluent. The adiabatic reactor effluent passing through line 516 can capture heat from an isothermal reactor effluent 544 (e.g., the combined streams of isothermal reactor effluent passing through lines 544a and 544b) in the third heat exchanger 517 to produce a preheated adiabatic reactor effluent passing through line 518, where a temperature of the isothermal reactor effluent 544 is greater than a temperature of the adiabatic reactor effluent passing through line 516, and where the isothermal reactor effluent 544 gives away heat and produces an isothermal reactor effluent 546.

A first portion 518a of the preheated adiabatic reactor effluent passing through line 518 can be heated in a convection zone 530 of a first reactor furnace 545a to further increase the temperature of the adiabatic reactor effluent. For example, the first portion 518a of the preheated adiabatic reactor effluent passing through line 518 can be heated in a convection zone 530 of a first reactor furnace 545a to a naphtha reforming temperature. A second portion 518b of the preheated adiabatic reactor effluent passing through line 518 can be heated in a convection zone 531 of a second reactor furnace 545b to further increase the temperature of the adiabatic reactor effluent. For example, the second portion 518b of the preheated adiabatic reactor effluent passing through line 518 can be heated in a convection zone 531 of a second reactor furnace 545b to a naphtha reforming temperature. The heated adiabatic reactor effluent passing through line 522 can be introduced to a first isothermal reactor 540, where the first isothermal reactor 540 can operate under isothermal naphtha reforming conditions. The heated adiabatic reactor effluent passing through line 523 can be introduced to a second isothermal reactor 541, where the second isothermal reactor 541 can operate under isothermal naphtha reforming conditions. The first isothermal reactor 540 and/or the second isothermal reactor 541 can include any of the isothermal reactors described herein.

The first isothermal reactor 540 can comprise a plurality of tubes 542 having a second naphtha reforming catalyst disposed therein, where the plurality of tubes 542 can be disposed within a radiant zone of the first reactor furnace 545a. The first naphtha reforming catalyst and the second naphtha reforming catalyst can be the same or different. At least an additional portion of the convertible hydrocarbons in the adiabatic reactor effluent can be converted to aromatic hydrocarbons in the first isothermal reactor 540 to form a first isothermal reactor effluent 544a. The second isothermal reactor 541 can comprise a plurality of tubes 543 having a second naphtha reforming catalyst disposed therein, where the plurality of tubes 543 can be disposed within a radiant zone of the second reactor furnace 545b. At least an additional portion of the convertible hydrocarbons in the adiabatic reactor effluent can be converted to aromatic hydrocarbons in the second isothermal reactor 541 to form a second isothermal reactor effluent 544b. The first isothermal reactor 540 and the second isothermal reactor 541 are connected (e.g., run) in parallel, and as such, when either isothermal reactor has to be serviced, for example to restore catalyst activity, one isothermal reactor can be disconnected and serviced, while the other isothermal reactor can continue the naphtha reforming process, thereby providing for a continuous naphtha reforming process.

The isothermal reactor effluent 544 (e.g., the combined streams of isothermal reactor effluent passing through lines 544a and 544b) can exchange heat with the adiabatic reactor effluent in the third heat exchanger 517 to produce an isothermal reactor effluent 546, where a temperature of the isothermal reactor effluent 546 is lower than a temperature of the isothermal reactor effluent 544. A first portion 546a of the isothermal reactor effluent 546 can further exchange heat with the hydrocarbon feed stream in the first heat exchanger 503 to produce an isothermal reactor effluent 548a, where a temperature of the isothermal reactor effluent 548a is lower than a temperature of the isothermal reactor effluent 546 (e.g., 546a). A second portion 546b of the isothermal reactor effluent 546 can further exchange heat with the hydrocarbon feed stream in the second heat exchanger 504 to produce an isothermal reactor effluent 548b, where a temperature of the isothermal reactor effluent 548b is lower than a temperature of the isothermal reactor effluent 546 (e.g., 546b).

In an embodiment, a reactor system for carrying out a naphtha reforming process as disclosed herein can comprise a plurality of adiabatic reactors, where each adiabatic reactor of the plurality of adiabatic reactors comprises a first naphtha reforming catalyst. In some embodiments, the plurality of adiabatic reactors can comprise a plurality of radial flow reactors. The reactor system can comprise a feed header fluidly coupled to at least one of the plurality of adiabatic reactors by one or more feed lines. The feed header can be provided to allow the hydrocarbon feed stream to be directed to each of the adiabatic reactors.

In an embodiment, the reactor system can further comprise a plurality of furnaces, where each furnace of the plurality of furnaces corresponds to one of the adiabatic reactors of the plurality of adiabatic reactors and where each furnace of the plurality of furnaces increases a temperature of the hydrocarbon feed stream that is communicated to a corresponding adiabatic reactor. Each furnace of the plurality of furnaces can be fluidly coupled between a corresponding adiabatic reactor and the feed header. The feed header can be provided to allow the hydrocarbon feed stream to be directed to each of the furnaces, thereby allowing for the hydrocarbon feed stream to be heated prior to introducing the hydrocarbon feed stream to a corresponding adiabatic reactor. A series of valves can be provided in the lines between the feed header and an inlet to each furnace.

In an embodiment, the reactor system can comprise an intermediate product header fluidly coupled to at least one of the plurality of adiabatic reactors by one or more product lines. The intermediate product header is provided to allow for recovering or collecting the first reactor effluent from each adiabatic reactor of the plurality of adiabatic reactors. A series of valves can be provided in the lines between the intermediate product header and outlets from each adiabatic reactor of the plurality of adiabatic reactors.

In some embodiments, the plurality of adiabatic reactors can be arranged in series between the feed header and the intermediate product header. In other embodiments, the plurality of adiabatic reactors can be arranged in parallel between the feed header and the intermediate product header. In yet other embodiments, some reactors of the plurality of adiabatic reactors can be arranged in series between the feed header and the intermediate product header, while other reactors of the plurality of adiabatic reactors can be arranged in parallel between the feed header and the intermediate product header.

In an embodiment, the reactor system can comprise one or more isothermal reactors, where each of the one or more isothermal reactors can comprise a second naphtha reforming catalyst. In some embodiments, the first naphtha reforming catalyst of the plurality of adiabatic reactors and the second naphtha reforming catalyst of the one or more isothermal reactors can be the same. In other embodiments, the first naphtha reforming catalyst of the plurality of adiabatic reactors and the second naphtha reforming catalyst of the one or more isothermal reactors can be different. The one or more isothermal reactors can be fluidly coupled to the intermediate product header by one or more inlet lines. The intermediate product header can be provided to allow the hydrocarbon feed stream to be directed to each of the isothermal reactors. A series of valves can be provided in the inlet lines between the intermediate product header and inlets to each of the one or more isothermal reactors.

In an embodiment, the reactor system can comprise an effluent header fluidly coupled to the one or more isothermal reactors by one or more effluent lines. The effluent header can be provided to allow for recovering or collecting the second reactor effluent from each isothermal reactor. A series of valves can be provided in the lines between the effluent header and outlets from each isothermal reactor. In an embodiment, a serial flow path is formed from the feed header, through one or more of the plurality of adiabatic reactors, through the intermediate product header, through at least one of the one or more isothermal reactors, and to the effluent header.

In an embodiment, the one or more isothermal reactors can comprise a plurality of isothermal reactors. In some embodiments, the plurality of isothermal reactors can be arranged in parallel between the intermediate product header and the effluent header. In other embodiments, the plurality of isothermal reactors can be arranged in series between the intermediate product header and the effluent header. In yet other embodiments, some reactors of the plurality of isothermal reactors can be arranged in parallel between the intermediate product header and the effluent header, while other reactors of the plurality of isothermal reactors can be arranged in series between the intermediate product header and the effluent header.

Figure 5B:
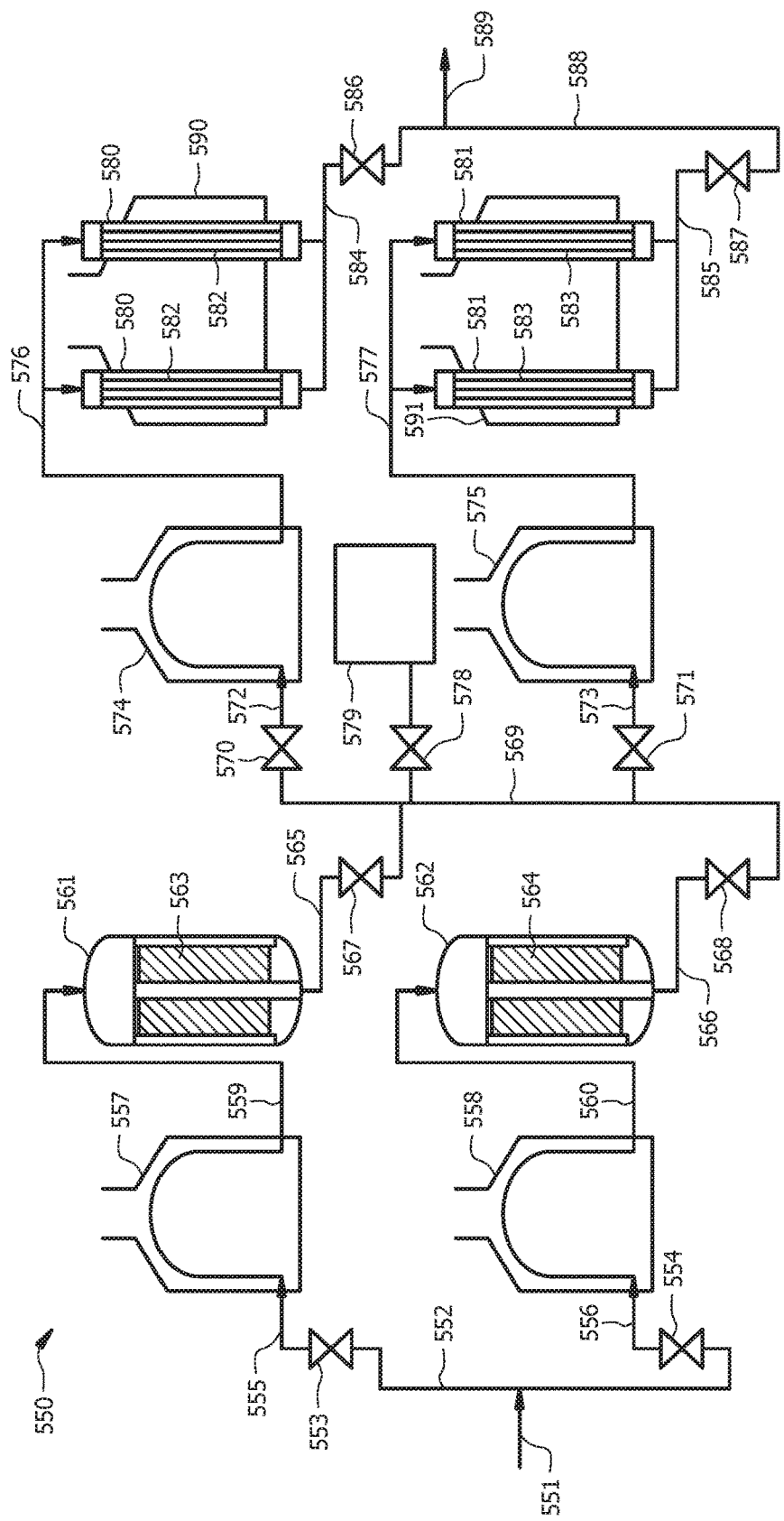
FIG. 5B is a flow diagram of still yet another embodiment of a naphtha reforming process of the present disclosure.

An embodiment of a general naphtha reforming process 550 is shown in FIG. 5B, in which additional lines (e.g., headers) are available between reactors to allow for a dynamic flow scheme, where individual reactors can be isolated from the naphtha reforming process, while a continuous naphtha reforming process can be maintained. As will be appreciated by one of skill in the art, and with the help of this disclosure, while the general naphtha reforming process 550 shows two adiabatic reactors (561, 562) operating in parallel, and two isothermal reactors (580, 581) operating in parallel, the concepts of the general naphtha reforming process 550 could be applied to any plurality of reactors (e.g., adiabatic, and/or isothermal reactors) operating in series and/or in parallel. As used herein, the term "dynamic flow scheme" refers to the ability of the hydrocarbon flow through a reactor system (e.g., a reactor system as shown in FIG. 5B for carrying out the general naphtha reforming process 550) to bypass any one of the adiabatic reactors and/or any one of the isothermal reactors, for example to restore catalytic activity in an isolated reactor, while also allowing the naphtha reforming process to continue to operate in the remaining adiabatic reactors and isothermal reactors. A first adiabatic reactor 561 and/or a second adiabatic reactor 562 can include any of the adiabatic reactors described herein. A first isothermal reactor 580 and/or a second isothermal reactor 581 can include any of the isothermal reactors described herein.

In an embodiment as shown in FIG. 5B, a dynamic flow scheme is achieved by providing a feed header 552, an intermediate product header 569, an effluent header 588, and a plurality of valves 553, 554, 567, 568, 570, 571, 578, 586, 587 disposed in the lines. The valves used herein may be simple valves or may represent more complex systems such as double-block and bleed valves or double-block and blind valves.

In an embodiment, the feed header 552 is provided to allow a hydrocarbon feed stream flowing through line 551 to be directed to any furnace preceding an adiabatic reactor, and an adiabatic reactor effluent may be removed downstream of any one of the adiabatic reactors. A series of valves may be provided in the lines between the feed header 552 and the inlet to any one of the furnaces 557, and 558. An intermediate product header 569 is provided to allow the adiabatic reactor effluent from any desired adiabatic reactor to be directed to any of the isothermal reactors; to any one of the furnaces preceding an isothermal reactor; or to a tank 579 for storage of the adiabatic reactor effluent. A series of valves may be provided in the lines between the intermediate product header 569 and an inlet to any one of the furnace 574, furnace 575, and tank 579. An effluent header 588 is provided to allow the isothermal reactor effluent from any desired isothermal reactor to be directed to line 589 leading out of the reactor system. A series of valves may be provided in the lines between the effluent header 588 and the outlet line from each isothermal reactor 580, and 581. The valves may be selectively operated in a dynamic fashion to provide a desired flow scheme using a provided reactor system. As part of the dynamic flow scheme, one or more reactors in the provided reactor system may be isolated to allow the catalyst within the isolated reactors to be restored prior to being placed back into the reactor system. Additional equipment as known in the art may also be included in the naphtha reforming process. For example, a halide removal system may be included to capture any halides evolving from the catalyst during the naphtha reforming process. Additional valves, purge lines, drain lines are all within the processes described herein.

In an embodiment, a naphtha reforming process 550 may be carried out using the reactor configuration shown in FIG. 5B. At the inlet of the process, a hydrocarbon feed stream may first pass through line 551, and initially enter the reactor system via the feed header 552. A first hydrocarbon feed stream passing from the feed header 552 via open valve 553 through line 555 can be heated in a first furnace 557 to increase the temperature of the hydrocarbon feed stream. The heated first hydrocarbon feed stream passing through line 559 can be introduced to a first adiabatic reactor 561, where the first adiabatic reactor 561 can be an adiabatic radial flow reactor comprising a first catalyst bed 563 disposed therein, and where the first catalyst bed 563 can comprise a first naphtha reforming catalyst. At least a portion of the convertible hydrocarbons in the first hydrocarbon feed stream can be converted to aromatic hydrocarbons in the first adiabatic reactor 561 to form a first adiabatic reactor effluent. The first adiabatic reactor effluent passing through line 565 can be communicated to the intermediate product header 569 via open valve 567. A second hydrocarbon feed stream passing from the feed header 552 via open valve 554 through line 556 can be heated in a second furnace 558 to increase the temperature of the hydrocarbon feed stream. The heated second hydrocarbon feed stream passing through line 560 can be introduced to a second adiabatic reactor 562, where the second adiabatic reactor 562 can be an adiabatic radial flow reactor comprising a second catalyst bed 564 disposed therein, and where the second catalyst bed 564 can comprise a first naphtha reforming catalyst. At least a portion of the convertible hydrocarbons in the second hydrocarbon feed stream can be converted to aromatic hydrocarbons in the second adiabatic reactor 562 to form a second adiabatic reactor effluent. The second adiabatic reactor effluent passing through line 566 can be communicated to the intermediate product header 569 via open valve 568.

In some embodiments of FIG. 5B, the first adiabatic reactor 561 can be isolated by closed valves 553 and 567, for example for servicing (e.g., restoring naphtha reforming catalyst activity) the first adiabatic reactor 561, while allowing the naphtha reforming process to continue to operate via the second adiabatic reactor 562. Once the servicing of the first adiabatic reactor 561 is completed, the first adiabatic reactor 561 can be reintroduced to the naphtha reforming process by opening valves 553 and 567. In other embodiments of FIG. 5B, the second adiabatic reactor 562 can be isolated by closed valves 554 and 568, for example for servicing (e.g., restoring naphtha reforming catalyst activity) the second adiabatic reactor 562, while allowing the naphtha reforming process to continue to operate via the first adiabatic reactor 561. Once the servicing of the second adiabatic reactor 562 is completed, the second adiabatic reactor 562 can be reintroduced to the naphtha reforming process by opening valves 554 and 568.

An adiabatic reactor effluent (e.g., first adiabatic reactor effluent and/or second adiabatic reactor effluent) passing from the intermediate product header 569 via open valve 570 through line 572 can be heated in a third furnace 574 to increase the temperature of the adiabatic reactor effluent. The heated adiabatic reactor effluent passing through line 576 can be introduced to the first isothermal reactor 580, where the first isothermal reactor 580 can operate under isothermal naphtha reforming conditions. The first isothermal reactor 580 can comprise a plurality of tubes 582 having a second naphtha reforming catalyst disposed therein, where the plurality of tubes 582 can be disposed within a first reactor furnace 590. The first naphtha reforming catalyst and the second naphtha reforming catalyst can be the same or different. At least an additional portion of the convertible hydrocarbons in the adiabatic reactor effluent can be converted to aromatic hydrocarbons in the first isothermal reactor 580 to form a first isothermal reactor effluent passing through line 584. The first isothermal reactor effluent passing through line 584 can be communicated to the effluent header 588 via open valve 586. The adiabatic reactor effluent passing from the intermediate product header 569 via open valve 571 through line 573 can be heated in a fourth furnace 575 to increase the temperature of the adiabatic reactor effluent. The heated adiabatic reactor effluent passing through line 577 can be introduced to the second isothermal reactor 581, where the second isothermal reactor 581 can operate under isothermal naphtha reforming conditions. The second isothermal reactor 581 can comprise a plurality of tubes 583 having a second naphtha reforming catalyst disposed therein, where the plurality of tubes 583 can be disposed within a second reactor furnace 591. At least an additional portion of the convertible hydrocarbons in the adiabatic reactor effluent can be converted to aromatic hydrocarbons in the second isothermal reactor 581 to form a second isothermal reactor effluent passing through line 585. The second isothermal reactor effluent passing through line 585 can be communicated to the effluent header 588 via open valve 587. An isothermal reactor effluent (e.g., first isothermal reactor effluent and/or second isothermal reactor effluent) can be communicated from the effluent header 588 to line 589 leading out of the reactor system.

In some embodiments of FIG. 5B, the first isothermal reactor 580 can be isolated by closed valves 570 and 586, for example for servicing (e.g., restoring naphtha reforming catalyst activity) the first isothermal reactor 580, while allowing the naphtha reforming process to continue to operate via the second isothermal reactor 581. Once the servicing of the first isothermal reactor 580 is completed, the first isothermal reactor 580 can be reintroduced to the naphtha reforming process by opening valves 570 and 586. In other embodiments of FIG. 5B, the second isothermal reactor 581 can be isolated by closed valves 571 and 587, for example for servicing (e.g., restoring naphtha reforming catalyst activity) the second isothermal reactor 581, while allowing the naphtha reforming process to continue to operate via the first isothermal reactor 580. Once the servicing of the second isothermal reactor 581 is completed, the second isothermal reactor 581 can be reintroduced to the naphtha reforming process by opening valves 571 and 587.

In an embodiment, during the operation of the reactor system for carrying out a naphtha reforming process as disclosed herein at least one reactor (e.g., an adiabatic reactor, an isothermal reactor, etc.) may be deemed to have an operational issue. In an embodiment, the nature of the operational issue may comprise a decrease in catalytic activity or selectivity over time. A catalyst (e.g., naphtha reforming catalyst) that exhibits an unacceptably low catalytic performance compared to an initial catalytic performance can be described as a "spent" catalyst (e.g., spent reforming catalyst or spent naphtha reforming catalyst). In an embodiment, the nature of the operational issue may comprise inspection and/or servicing of the reactor containing the catalyst. In another embodiment, the nature of the operational issue may comprise inspection and/or servicing of the safety systems associated with the reactor containing the catalyst. In an embodiment, the operational issue may be based on operational considerations, economic considerations, catalyst performance, or any combination thereof.

In an embodiment, the catalyst (e.g., naphtha reforming catalyst) used in the naphtha reforming process may experience a decrease in catalytic activity or selectivity over time. The resulting deactivation of the catalyst can result from a number of mechanisms including, but not limited to, coking, poisoning, and/or loss of catalytic material or components. As used herein, the term "coke" refers to a carbon-rich carbonaceous material, generally having a C/H mole ratio >1. The term "coking" refers to the process of depositing coke on a surface. Both the term "coke" and "coking" as used herein are meant to include the conventional meaning known in the art. In an embodiment, a catalyst can be deemed a spent catalyst when the catalytic activity is less than or equal to about 50%, alternatively about 40%, alternatively about 30%, alternatively 20%, or alternatively 10% of the initial catalytic activity of the catalyst when initially placed into service. In an embodiment, a catalyst can be deemed a spent catalyst when the catalytic selectivity as measured by the production of hydrocarbons with five carbon atoms or less ($C_5-$) is more than or equal to about 150% of the catalyst when initially placed into service. In an embodiment, a catalyst may be deemed to be a spent catalyst based on catalyst performance, alone or in combination with operational considerations, and/or economic considerations. For example, the catalyst may be deemed to be spent when the income attributable to an improved conversion efficiency, and thus an increased product yield, as a result of replacing the catalyst outweighs the expense of replacing the catalyst.

Molar selectivities are defined as:

$$\text{Benzene selectivity: } S_{Bz} = \frac{\dot{n}_{Bz,prod}}{\dot{n}_{conv\ C6,feed} - \dot{n}_{conv\ C6,prod}} \quad \text{Eq. 1}$$

$$\text{Toluene selectivity: } S_{Tol} = \frac{\dot{n}_{Tol,prod}}{\dot{n}_{conv\ C7,feed} - \dot{n}_{conv\ C7,prod}} \quad \text{Eq. 2}$$

$$\text{Benzene + Toluene selectivity: } S_{Bz+Tol} = \quad \text{Eq. 3}$$
$$\frac{\dot{n}_{Bz,prod} + \dot{n}_{Tol,prod}}{\dot{n}_{conv\ C6,C7,feed} - \dot{n}_{conv\ C6,C7,prod}}$$

$$\text{Aromatics selectivity: } S_{arom} = \frac{\dot{n}_{Bz,prod} + \dot{n}_{Tol,prod} + \dot{n}_{C8+arom,prod}}{\dot{n}_{conv\ C6-C8+,feed} - \dot{n}_{conv\ C6-C8+,prod}} \quad \text{Eq. 4}$$

Conversion is defined as the number of moles converted per mole of "convertible" hydrocarbons fed:

$$C_6 \text{ conversion: } X_{C6} = \frac{\dot{n}_{conv\ C6,feed} - \dot{n}_{conv\ C6,prod}}{\dot{n}_{conv\ C6,feed}} \quad \text{Eq. 5}$$

$$C_7 \text{ conversion: } X_{C7} = \frac{\dot{n}_{conv\ C7,feed} - \dot{n}_{conv\ C7,prod}}{\dot{n}_{conv\ C7,feed}} \quad \text{Eq. 6}$$

$$C_6 + C_7 \text{ conversion: } X_{C6+C7} = \quad \text{Eq. 7}$$
$$\frac{\dot{n}_{conv\ C6,feed} + \dot{n}_{conv\ C7,feed} - \dot{n}_{conv\ C6,prod} - \dot{n}_{conv\ C7,prod}}{\dot{n}_{conv\ C6,feed} + \dot{n}_{conv\ C7,feed}}$$

In these equations (equations 1 through 7), $\dot{n}$ indicates a molar flow rate in a continuous reactor or the number of moles in a batch reactor.

The ability of a reactor containing the spent catalyst (e.g., adiabatic reactor, isothermal reactor, etc.) to convert convertible hydrocarbons (e.g., aliphatic, alicyclic, and/or naphthenic hydrocarbons) in the hydrocarbon feed stream to aromatic hydrocarbons can be restored. In an embodiment, the ability to convert aliphatic, alicyclic, and/or naphthenic hydrocarbons to aromatic hydrocarbons can be restored by replacing the spent catalyst in the reactor with fresh catalyst, and/or rejuvenating the catalyst. Catalyst rejuvenation is described in more detail below. Suitable procedures known in the art may be used to replace the spent catalyst in the reactor with fresh catalyst at desired intervals. In an embodiment, each reactor may be restored at an equal time interval based on the expected life of the catalyst in the naphtha reforming process. In an embodiment, each reactor may be restored based on measurable indicators of the catalyst activity. For example, an outlet temperature rise may indicate a loss of activity for an endothermic reaction, and/or a decrease in the product concentration at the outlet of the reactor may indicate a decrease in the catalyst activity or performance. The fresh catalyst has a higher activity or performance as compared to the spent catalyst. The spent catalyst may then be disposed of or recycled to recover active catalytic materials for future use.

In an embodiment, a reactor system for carrying out a naphtha reforming process as disclosed herein can comprise a catalyst rejuvenation system coupled to the plurality of adiabatic reactors by a plurality of flow lines. The reactor system can further comprise a plurality of valves disposed in the one or more feed lines, the one or more product lines, and the flow lines, where the plurality of valves are configured to be dynamically operated to isolate at least one of the adiabatic reactors of the plurality of adiabatic reactors and fluidly couple the at least one isolated adiabatic reactor to the catalyst rejuvenation system while the remaining adiabatic reactors remain operational. The at least one isolated adiabatic reactor can comprise a spent naphtha reforming catalyst, and the catalytic activity in the isolated reactor(s) can be restored.

In an embodiment, a reactor system for carrying out a naphtha reforming process as disclosed herein can comprise a catalyst rejuvenation system coupled to one or more isothermal reactors by a plurality of flow lines. The reactor system can further comprise a plurality of valves disposed in the one or more inlet lines, the one or more effluent lines, and the flow lines, where the plurality of valves are configured to be dynamically operated to isolate at least one isothermal reactor of the one or more isothermal reactors and fluidly couple the at least one isolated isothermal reactor to the catalyst rejuvenation system while the remaining isothermal reactors remain operational. The at least one isolated isothermal reactor can comprise a spent naphtha reforming catalyst, and the catalytic activity in the isolated reactor(s) has to be restored.

In an embodiment, preparing the reactor (e.g., adiabatic reactor, isothermal rector) to resume conversion of the hydrocarbon feed stream comprising the convertible hydrocarbons (e.g., aliphatic, alicyclic, and/or naphthenic hydrocarbons) can comprise reducing the catalyst with a compound that reversibly reduces the activity of the catalyst (e.g. poisons the catalyst). Suitable compounds may include, but are not limited to, hydrogen, halides, carbon monoxide, or organic molecules that may reversibly adsorb and later desorb from the catalyst. By reversibly reducing the reactivity of the catalyst (e.g. poisoning the catalyst), the conversion in the restored reactor may be more gradually increased when hydrocarbons are reintroduced to the reactor.

Catalyst rejuvenation generally refers to restoring the catalyst by removing one or more contaminants on the catalyst. For example, rejuvenation may involve the conversion of carbonaceous material on the catalyst to carbon oxides and water. Decoking is one example of a rejuvenation process. In this process, oxygen, which may be supplied in the form of air, either air or air diluted with nitrogen, is provided to the reactor (e.g., an isolated reactor for in situ rejuvenation) at an appropriate temperature. The carbon deposits are thereby oxidized to form carbon dioxide and water. The rejuvenation process may continue until a desired level of rejuvenation has occurred.

In an embodiment, a catalyst rejuvenation process may be carried out by heating the spent catalyst to a temperature ranging of from about 25° C. to about 1,000° C., alternatively from about 50° C. to about 900° C., alternatively from about 100° C. to about 800° C., alternatively from 200° C. to 700° C., or alternatively from 300° C. to 600° C. to produce a decoked spent catalyst. The decoking process may be carried out by heating the spent catalyst for a time of from about 1 hour to about 40 hours, alternatively from about 2 hours to about 25 hours, alternatively from about 3 hours to about 20 hours, alternatively from 4 hours to 15 hours, or alternatively from 5 hours to 10 hours to produce a decoked spent catalyst. As discussed above, the decoking process may be carried out by heating the spent catalyst in the presence of oxygen, and the oxygen concentration may be from about 0.01 mol % to about 20 mol %, alternatively from about 0.1 mol % to about 15 mol %, alternatively from about 0.2 mol % to about 10 mol %, alternatively from about 0.5 mol % to about 5 mol %, or alternatively from about 1 mol % to about 3 mol % to produce a decoked spent catalyst. Suitable rejuvenation processes that can be used in accordance with the present disclosure are disclosed in U.S. Pat. Nos. 4,937,215; 5,260,238; 5,155,075; 4,851,380; and 7,868,217; each of which is incorporated by reference herein in its entirety.

In an embodiment, a catalyst rejuvenation system can be used to rejuvenate the catalyst in an isolated reactor. As used herein, rejuvenation refers to a process of reactivating a spent catalyst by decreasing coke content, redispersing metals, and/or introducing a replacement and/or additional catalytic component to the catalyst in order to increase the activity of the catalyst. In an embodiment, rejuvenating a catalyst comprises redispersing the metal in the spent catalyst to produce a redispersed spent catalyst, contacting the redispersed spent catalyst with a reactivating composition to produce a redispersed, reactivated spent catalyst, and thermally treating the redispersed, reactivated spent catalyst to produce a reactivated catalyst.

In an embodiment, rejuvenating the spent catalyst may begin by decoking the catalyst. Any of the decoking processes described above with respect to the rejuvenation of the spent catalyst may be used to decoke the catalyst. Following decoking of the spent catalyst, the metal on the decoked spent catalyst may be redispersed on the catalyst support. Without wishing to be limited by theory, the decoking process in combination with the hydrocarbon conversion process that the spent catalyst was subjected to, may have led to the agglomeration of the metal on the catalyst support. The agglomerated metal may not be fully available physically and chemically to the catalytic reactions and thus may be redispersed to increase the catalyst activity.

In an embodiment, the metal on the decoked spent catalyst is redispersed using one or more processes generally referred to as oxychlorination. Oxychlorination of the decoked spent catalyst may be carried out by contacting the decoked spent catalyst with a redispersing composition. Suitable redispersing compositions may comprise a chlorine-containing compound and oxygen. The chlorine-containing compound may be in a solid phase, liquid phase, gas phase, or any combination thereof. Examples of chlorine-containing compounds suitable for use in the redispersing composition include without limitation hydrochloric acid, chlorine, carbon tetrachloride, tetrachloroethylene, chlorobenzene, methyl chloride, methylene chloride, chloroform, allyl chloride, trichloroethylene, chloramine, chlorine oxides, chlorine acids, chlorine dioxide, dichlorine monoxide, dichlorine heptoxide, chloric acid, perchloric acid, or any combination thereof.

Contacting of the decoked spent catalyst with the redispersing composition may be carried out over a time period of from about 0.5 hours to about 50 hours, alternatively from about 1 hour to about 20 hours, alternatively from about 2 hours to about 10 hours, at a temperature in the range of from about 25° C. to about 1,000° C., alternatively from about 50° C. to about 900° C., alternatively from about 100° C. to about 800° C., alternatively from about 200° C. to about 400° C., or alternatively from about 400° C. to about 600° C. Contacting of the decoked spent catalyst with the redispersing composition may be carried out in the presence of oxygen. When oxygen is used, the oxygen concentration may range from about 0.01 mol % to about 20 mol %, alternatively from about 1 mol % to about 18 mol %, alternatively from about 5 mol % to about 15 mol %, or alternatively from about 8 mol % to about 12 mol %.

In an embodiment, the decoked spent catalyst is contacted with a redispersing composition comprising a chlorine-containing compound (e.g., HCl) and oxygen in the presence of water. When water is used, the water to HCl mole ratio ($H_2O:HCl$) may be from about 0.01:1 to about 10:1, alternatively from about 0.5:1 to about 5:1, or alternatively from about 1:1 to about 3:1. When chlorine-containing compounds are used other than HCl, the $H_2O:HCl$ mole ratio is calculated based on the equivalent amount of HCl generated in the presence of the spent catalyst.

The spent catalyst may be subjected to a reactivation step, which may occur after the decoked spent catalyst has undergone a redispersion as described above. In an embodiment, reactivation of the decoked, redispersed spent catalyst may be carried out using a reactivating composition comprising one or more halogenating agents, including gas phase halogenating agents, liquid phase halogenating agents, solid phase halogenating agents, or any combination thereof. In an embodiment, reactivation of the decoked, redispersed spent catalyst is carried out by contacting the decoked, redispersed spent catalyst with a fluorine-containing solution in a process generally referred to as fluoridation. The fluorine-containing compound may be in the solid phase, liquid phase, gas phase, or any combination thereof. Examples of fluorine-containing compounds suitable for use in this disclosure include without limitation tetramethylammonium fluoride (TMAF), ammonium fluoride ($NH_4F$ or AF), tetrafluoroethylene, 2,2,2-trifluoroethanol (TFE), fluorine ($F_2$), hydrofluoric acid (HF), or combinations thereof. In an embodiment, the fluorine-containing compound is a perfluorinated alkane, perfluorinated alcohol, or mixtures thereof. Examples of perfluorinated alcohols suitable for use in this disclosure include without limitation 2,2,2-trifluoroethanol (TFE), hexafluoroisopropanol, tetrafluoropropanol, pentafluoropropanol, hexafluorophenylpropanol, perfluorobutyl alcohol, hexafluor-2-propanol, pentafluoro-1-propanol, tetrafluoro-1-propanol, 1,1,1,3,3,3-hexafluoro-2-propanol, 2,2,3,3,3-pentafluoro-1-propanol, and any combination thereof.

In an embodiment, the fluorine-containing compound is an ammonium halide compound and may comprise one or more compounds represented by the general formula $N(R)_4F$, where R represents a hydrogen or a substituted or unsubstituted carbon chain molecule having from 1 to 20 carbons, where each R may be the same or different. In an embodiment, R is methyl, ethyl, propyl, butyl, or combinations thereof. Alternatively, R is methyl. Examples of suitable ammonium compounds include ammonium fluoride (AF), tetramethylammonium fluoride (TMAF), tetraethylammonium fluoride (TEAF), tetrapropylammonium fluoride, tetrabutylammonium fluoride, methyltriethylammonium fluoride, or any combination thereof. Alternatively, the ammonium halide compound may also comprise at least one hydrofluoric acid and at least one ammonium hydroxide represented by the formula $N(R')_4OH$, where R' is hydrogen or a substituted or unsubstituted carbon chain molecule having from 1 to 20 carbon atoms, where each R' may be the same or different. In an embodiment, R' is methyl, ethyl, propyl, butyl, or combinations thereof. Alternatively, R' is methyl. Examples of ammonium hydroxides suitable for use in this disclosure include ammonium hydroxide, tetraalkylammonium hydroxides such as tetramethylammonium hydroxide, tetraethylammonium hydroxide, tetrapropylammonium hydroxide, tetrabutylammonium hydroxide, or any combination thereof.

In an embodiment the decoked, redispersed spent catalyst is contacted with a solution of TMAF in the temperature range of from about 0° C. to about 200° C., alternatively from about 20° C. to about 100° C., or alternatively from about 40° C. to about 60° C. for a time period of from about 1 minute to about 100 hours, alternatively from about 0.1 hours to about 50 hours, or alternatively from about 1 hour to about 24 hours. The solution of TMAF may also contain one or more suitable solvents.

In an embodiment, the decoked, redispersed spent catalyst may be reactivated through contact with a gas phase fluoridating agent such as, for example, fluorine. In such an embodiment, the gas phase fluoridating agent may be contacted with a decoked, redispersed spent catalyst for a time period of from about 1 minute to about 100 hours, alternatively from about 0.1 hours to about 50 hours, alternatively from about 1 hour to about 24 hours, or alternatively from about 4 hours to about 11 hours.

A chlorine-containing compound may also be utilized in the reactivation of the decoked, redispersed spent catalyst. The chlorine-containing compound may be in the solid phase, liquid phase, gas phase, or any combination thereof. In an embodiment, the chlorine-containing compound is of the type described above. Examples of chlorine-containing compounds suitable for use in the reactivating composition include without limitation compounds represented by the general formula $N(R'')_4Cl$, where R'' represents a hydrogen or a substituted or unsubstituted carbon chain molecule having 1 to 20 carbons where each R'' may be the same or different. In an embodiment, R'' is methyl, ethyl, propyl, butyl, or combinations thereof. Alternatively, R'' is methyl. Specific examples of suitable organic ammonium chlorine compounds include ammonium chloride, tetramethylammonium chloride (TMAC), tetraethylammonium chloride, tetrapropylammonium chloride, tetrabutylammonium chloride, methyltriethylammonium chloride, or combinations thereof. Alternatively, the chlorine-containing compound is TMAC.

In some aspects, a method of rejuvenating the naphtha reforming catalyst can comprise (1) contacting a spent catalyst with a chlorine-containing stream comprising a chlorine-containing compound to produce a chlorinated spent catalyst (e.g., chlorination); (2) contacting the chlorinated spent catalyst with a decoking gas stream comprising oxygen to produce a de-coked catalyst; and (3) contacting the de-coked catalyst with a fluorine-containing stream comprising a fluorine-containing compound (e.g., fluorination) to produce a rejuvenated naphtha reforming catalyst.

Referring now to step (1) of the method of rejuvenating the naphtha reforming catalyst, the chlorine-containing compound in the chlorine-containing stream may be any suitable chlorine-containing compound or any chlorine-containing compound disclosed herein. For instance, illustrative chlorine-containing compounds may include, but are not limited to, hydrochloric acid, chlorine gas ($Cl_2$), carbon tetrachloride, tetrachloroethylene, chlorobenzene, methyl chloride, methylene chloride, chloroform, allyl chloride, trichloroethylene, a chloramine, a chlorine oxide, a chlorine acid, chlorine dioxide, dichlorine monoxide, dichlorine heptoxide, chloric acid, perchloric acid, ammonium chloride, tetramethylammonium chloride, tetraethylammonium chloride, tetrapropylammonium chloride, tetrabutylammonium chloride, methyltriethylammonium chloride, and the like, or any combination thereof. Other suitable chlorine-containing compounds may include arenes and alkyl-substituted arenes (e.g., benzene, toluene, and xylenes) where at least one hydrogen atom is replaced with a Cl atom.

In some aspects, the chlorine-containing compound may comprise (or consist essentially of, or consist of) hydrochloric acid; alternatively, chlorine gas ($Cl_2$); alternatively, carbon tetrachloride; alternatively, tetrachloroethylene; alternatively, chlorobenzene; alternatively, methyl chloride; alternatively, methylene chloride; alternatively, chloroform; alternatively, allyl chloride; alternatively, trichloroethylene; alternatively, a chloramine; alternatively, a chlorine oxide; alternatively, a chlorine acid; alternatively, chlorine dioxide; alternatively, dichlorine monoxide; alternatively, dichlorine heptoxide; alternatively, chloric acid; alternatively, perchloric acid; alternatively, ammonium chloride; alternatively, tetramethylammonium chloride; alternatively, tetraethylammonium chloride; alternatively, tetrapropylammonium chloride; alternatively, tetrabutylammonium chloride; or alternatively, methyltriethylammonium chloride.

In other aspects, the chlorine-containing compound may comprise (or consist essentially of, or consist of) chlorine gas ($Cl_2$). In addition to the chlorine-containing compound, the chlorine-containing stream may further comprise an inert gas, such as helium, neon, argon, nitrogen, or combinations of two or more of these materials. In certain aspects, the chlorine-containing stream may comprise (or consist essentially of, or consist of) a chlorine-containing compound and an inert gas, and the inert gas may be or may comprise nitrogen. In a further aspect, the chlorine-containing stream may comprise (or consist essentially of, or consist of) chlorine gas ($Cl_2$) and nitrogen.

While not being limited thereto, the amount of chlorine (Cl) in the chlorine-containing stream often may be less than about 15% by volume. For instance, the chlorine-containing stream may comprise an amount of the chlorine-containing compound that is controlled to give a concentration in ppmv (ppm by volume) of Cl in the chlorine-containing stream of less than about 100,000; alternatively, a ppmv of Cl of less than about 50,000; alternatively, a ppmv of Cl of less than about 25,000; alternatively, a ppmv of Cl of less than about 10,000. Suitable ranges for the concentration of Cl may include, but are not limited to, the following ranges: from about 50 to about 100,000 ppmv, from about 50 to about 50,000 ppmv, from about 50 to about 25,000 ppmv, from about 100 to about 20,000 ppmv, from about 250 to about 25,000 ppmv, from about 500 to about 25,000 ppmv, from about 1,000 to about 25,000 ppmv, from about 5,000 to about 50,000 ppmv, from about 2,500 to about 35,000 ppmv, or from about 7,500 to about 35,000 ppmv, and the like.

The chlorine-containing stream may be substantially free of an oxygen-containing compound (e.g., oxygen ($O_2$) and water ($H_2O$)), i.e., may contain less than 100 ppmw (ppm by weight) of an oxygen-containing compound. Therefore, it is contemplated that the amount of any oxygen-containing compound in the chlorine-containing stream may be less than 50 ppmw, less than 25 ppmw, less than 10 ppmw, less than 5 ppmw, or less than 3 ppmw, in certain aspects. In other aspects, the amount of any oxygen-containing compound in the chlorine-containing stream may be in range from about 0.1 to 100 ppmw, from about 0.5 to 100 ppmw, from about 1 to 100 ppmw, from about 0.1 to about 50 ppmw, from about 0.1 to about 25 ppmw, from about 0.1 to about 10 ppmw, or from about 0.1 to about 5 ppmw. While not wishing to be bound by theory, it is believed that it may be beneficial to have substantially no oxygen added during the chlorination step of the method of rejuvenating a spent catalyst. Moreover, although not required, the chlorine-containing stream may be substantially free of fluorine-containing compounds, i.e., may contain less than 100 ppmw (ppm by weight) of fluorine-containing compounds. As above, it is contemplated that the amount of fluorine-containing compounds in the chlorine-containing stream may be, for instance, less than 50 ppmw, less than 10 ppmw, in a range from about 0.1 to 100 ppmw, in a range from about 0.1 to about 50 ppmw, or in a range from about 0.1 to about 10 ppmw, and the like.

The chlorination step (1) may be conducted at a variety of temperatures and time periods. For instance, the chlorination step may be conducted at a chlorination temperature in a range from about 0° C. to about 500° C.; alternatively, from about 0° C. to about 300° C.; alternatively, from about 20° C. to about 400° C.; alternatively, from about 20° C. to about 300° C.; alternatively, from about 30° C. to about 300° C.; alternatively, from about 40° C. to about 300° C.; alternatively, from about 100° C. to about 250° C.; alternatively, from about 150° C. to about 300° C.; alternatively, from about 200° C. to about 300° C.; alternatively, or alternatively, from about 150° C. to about 275° C. In these and other aspects, these temperature ranges also are meant to encompass circumstances where the chlorination step is conducted at a series of different temperatures, instead of at a single fixed temperature, falling within the respective ranges.

The duration of the chlorination step is not limited to any particular period of time. Hence, the chlorination step may be conducted, for example, in a time period ranging from as little as 30-45 minutes to as long as 12-24 hours, 36-48 hours, or more. The appropriate chlorination time may depend upon, for example, the chlorination temperature and the amount of chlorine in the chlorine-containing stream, among other variables. Generally, however, the chlorination step may be conducted in a time period that may be in a range from about 45 minutes to about 48 hours, such as, for example, from about 1 hour to about 48 hours, from about 45 minutes to about 24 hours, from about 45 minutes to about 18 hours, from about 1 hour to about 12 hours, from about 2 hours to about 12 hours, from about 4 hours to about 10 hours, or from about 2 hours to about 8 hours.

Step (2) of the method of rejuvenating the naphtha reforming catalyst often may be referred to as the carbon burn step, or decoking step, and in this step, a chlorinated spent catalyst may be contacted with a decoking gas stream comprising oxygen. In addition to oxygen, the decoking gas stream may comprise an inert gas, i.e., the decoking gas stream may comprise (or consist essentially of, or consist of) oxygen and an inert gas. Typical inert gasses useful in the carbon burn step may encompass helium, neon, argon, nitrogen, and the like, and this includes combinations of two or more of these materials. In certain aspects, the decoking gas stream may comprise (or consist essentially of, or consist of) oxygen and nitrogen; alternatively, air and nitrogen; or alternatively, air.

Since the decoking gas stream may comprise air, the decoking gas stream may comprise about 20-21 mole % oxygen. More often, however, the amount of oxygen in the decoking gas stream may be less than about 10 mole %. For example, in some aspects, the decoking gas stream may comprise less than about 8 mole %, less than about 5 mole %, or less than about 3 mole % oxygen. Accordingly, suitable ranges for the mole % of oxygen in the decoking gas stream may include, but are not limited to, the following ranges: from about 0.1 to about 25 mole %, from about 0.1 to about 20 mole %, from about 0.1 to about 10 mole %, from about 0.2 to about 10 mole %, from about 0.2 to about 5 mole %, from about 0.3 to about 5 mole %, from about 0.5 to about 5 mole %, from about 0.5 to about 4 mole %, from about 0.5 to about 3 mole %, or from about 1 to about 3 mole %, and the like.

In an aspect, the decoking gas stream may be substantially halogen-free, i.e., substantially free of halogen-containing compounds. In this context, "substantially halogen-free" means less than 100 ppmw (ppm by weight) of halogen-containing compounds, such as chlorine-containing compounds, in the decoking gas stream. Therefore, it is contemplated that the amount of halogen-containing compounds in the decoking gas stream may be less than 50 ppmw, less than 40 ppmw, less than 25 ppmw, less than 10 ppmw, less than 5 ppmw, or less than 3 ppmw, in certain aspects. In other aspects, the amount of halogen-containing compounds in the decoking gas stream may be in range from about 0.1 to 100 ppmw, from about 0.5 to 100 ppmw, from about 1 to 100 ppmw, from about 0.1 to about 50 ppmw, from about 0.1 to about 25 ppmw, from about 0.1 to about 10 ppmw, or from about 0.1 to about 5 ppmw. While not wishing to be bound by theory, it is believed that it may be beneficial to have substantially no halogens, such as chlorine, added during the carbon burn step of the method of rejuvenating a spent catalyst.

In another aspect, the decoking gas stream may be substantially free of water, and in this regard, "substantially free" means less than 100 ppmw (ppm by weight) of water in the decoking gas stream. Therefore, it is contemplated that the amount of water in the decoking gas stream may be less than 50 ppmw, less than 25 ppmw, less than 10 ppmw, less than 5 ppmw, or less than 3 ppmw, in certain aspects. In other aspects, the amount of water in the decoking gas stream may be in range from about 0.1 to 100 ppmw, from about 0.5 to 100 ppmw, from about 1 to 100 ppmw, from about 0.1 to about 50 ppmw, from about 0.1 to about 25 ppmw, from about 0.1 to about 10 ppmw, or from about 0.1 to about 5 ppmw. While not wishing to be bound by theory, it is believed that it may be beneficial to have substantially no water added during the carbon burn step of the method of rejuvenating a spent catalyst.

Similar to that described above for the chlorine-containing stream, any compositional attributes of the decoking gas stream are meant to refer to the incoming decoking gas stream, prior to contacting the chlorinated spent catalyst and the metal reactor, unless expressly stated otherwise. As one of skill in the art would readily recognize, the outgoing decoking gas stream, after contacting the chlorinated spent catalyst, may vary significantly in composition from the incoming decoking gas stream. For instance, chlorine deposited during the chlorination may elute, in some circumstances, from the catalyst during the carbon burn step. Moreover, water may be produced during the carbon burn step, and thus, water may be detected in the outgoing decoking gas stream.

The carbon burn step may be conducted at a variety of temperatures and time periods. For instance, the carbon burn step may be conducted at a peak decoking temperature in a range from about 150° C. to about 600° C.; alternatively, from about 200° C. to about 500° C.; alternatively, from about 300° C. to about 600° C.; alternatively, from about 300° C. to about 550° C.; alternatively, from about 300° C. to about 500° C.; alternatively, from about 320° C. to about 480° C.; alternatively, from about 340° C. to about 460° C.; or alternatively, from about 350° C. to about 450° C. In these and other aspects, these temperature ranges also are meant to encompass circumstances where the carbon burn step is conducted at a series of different temperatures (e.g., an initial decoking temperature, a peak decoking temperature), instead of at a single fixed temperature, falling within the respective ranges. For instance, and not limited thereto, the carbon burn step may start at an initial decoking temperature which is the same as a chlorine purging temperature (discussed further herein below). Thus, for example, the carbon burn step may commence at an initial decoking temperature in a range from about 0° C. to about 300° C., from about 20° C. to about 250° C., from about 50° C. to about 200° C., or from about 150° C. to about 260° C. Subsequently, the temperature of the carbon burn step may be increased to a peak decoking temperature, for example, in a range from about 300° C. to about 600° C., or from about 350° C. to about 450° C.

The duration of the carbon burn step is not limited to any particular period of time. Hence, the carbon burn step may be conducted, for example, in a time period ranging from as little as 30-45 minutes to as long as 48-72 hours, or more. The appropriate decoking time may depend upon, for example, the initial decoking temperature, the peak decoking temperature, and the amount of oxygen in the decoking gas stream, among other variables. Generally, however, the carbon burn step may be conducted in a time period that may be in a range from about 45 minutes to about 72 hours, such as, for example, from about 1 hour to about 72 hours, from about 24 hours to about 72 hours, from about 12 hours to about 60 hours, from about 12 hours to about 48 hours, or from about 1 hour to about 6 hours.

Alternatively, the carbon burn step may be conducted for a time period sufficient to reduce the wt. % of carbon on the chlorinated spent catalyst to less than about 1 wt. % (a de-coked catalyst). In some aspects, the carbon burn step may be conducted for a time period sufficient to reduce the wt. % of carbon on the chlorinated spent catalyst to less than about 0.75 wt. %, less than about 0.5 wt. %, or less than about 0.2 wt. %. In other aspects, the carbon burn step may be conducted for a time period determined by monitoring the $CO_2$ level in the outgoing or exiting decoking gas stream, after contacting the catalyst. Hence, the carbon burn step may be conducted for a time period sufficient to reduce the amount of $CO_2$ in the outgoing or exiting decoking gas stream, after contacting the catalyst, to less than about 100 ppmv, for example, less than about 50 ppmv, or less than about 20 ppmv.

Alternatively, the carbon burn step may be conducted for a time period sufficient to result in a rejuvenated catalyst having an activity that is from about 50% to about 80% of the activity of the fresh catalyst, for example, from about 50% to about 75%, or from about 55% to about 75%. In this regard, the activity of the rejuvenated catalyst is based on returning to within about 50%-80% of the fresh catalyst activity of the same production run of catalyst, tested on the same equipment and under the same method and conditions.

In step (3) of the method of rejuvenating the naphtha reforming catalyst, the de-coked catalyst may be contacted with a fluorine-containing stream comprising a fluorine-containing compound. Suitable fluorine-containing compounds may include, but are not limited to, hydrofluoric acid, fluorine gas ($F_2$), 2,2,2-trifluoroethanol, tetrafluoroethylene, carbon tetrafluoride, carbon trifluoride, fluoromethane, heptafluoropropane, decafluorobutane, hexafluoroisopropanol, tetrafluoropropanol, pentafluoropropanol, hexafluorophenylpropanol, perfluorobutyl alcohol, hexafluor-2-propanol, pentafluoro-1-propanol, tetrafluoro-1-propanol, 1,1,1,3,3,3-hexafluoro-2-propanol, 2,2,3,3,3-pentafluoro-1-propanol, ammonium fluoride, tetramethylammonium fluoride, tetraethylammonium fluoride, tetrapropylammonium fluoride, tetrabutylammonium fluoride, methyltriethylammonium fluoride, and the like, or any combination thereof. Other suitable fluorine-containing compounds may include arenes and alkyl-substituted arenes (e.g., benzene, toluene, and xylenes) where at least one hydrogen atom is replaced with a F atom.

In another aspect, the fluorine-containing compound may comprise (or consist essentially of, or consist of) hydrofluoric acid; alternatively, fluorine gas ($F_2$); alternatively, 2,2,2-trifluoroethanol; alternatively, tetrafluoroethylene; alternatively, carbon tetrafluoride; alternatively, carbon trifluoride; alternatively, fluoromethane; alternatively, heptafluoropropane; alternatively, decafluorobutane; alternatively, hexafluoroisopropanol; alternatively, tetrafluoropropanol; alternatively, pentafluoropropanol; alternatively, hexafluorophenylpropanol; alternatively, perfluorobutyl alcohol; alternatively, hexafluor-2-propanol; alternatively, pentafluoro-1-propanol; alternatively, tetrafluoro-1-propanol; alternatively, 1,1,1,3,3,3-hexafluoro-2-propanol; alternatively, 2,2,3,3,3-pentafluoro-1-propanol; alternatively, ammonium fluoride; alternatively, tetramethylammonium fluoride; alternatively, tetraethylammonium fluoride; alternatively, tetrapropylammonium fluoride; alternatively, tetrabutylammonium fluoride; or alternatively, methyltriethylammonium fluoride.

In another aspect, the fluorine-containing compound may comprise (or consist essentially of, or consist of) fluorine gas ($F_2$). In addition to fluorine, the fluorine-containing stream may further comprise an inert gas, such as helium, neon, argon, nitrogen, or combinations of two or more of these materials. In yet another aspect, the fluorine-containing stream may comprise (or consist essentially of, or consist of) a fluorine-containing compound and an inert gas, and the inert gas may be or may comprise nitrogen. In still another aspect, the fluorine-containing stream may comprise (or consist essentially of, or consist of) fluorine gas ($F_2$) and nitrogen.

While not being limited thereto, the amount of fluorine (F) in the fluorine-containing stream often may be less than about 15% by volume. For instance, the fluorine-containing stream may comprise an amount of the fluorine-containing compound that is controlled to give a concentration in ppmv (ppm by volume) of F in the fluorine-containing stream of less than about 100,000; alternatively, a ppmv of F of less than about 50,000; alternatively, a ppmv of F of less than about 25,000; alternatively, a ppmv of F of less than about 10,000. Suitable ranges for the concentration of F may include, but are not limited to, the following ranges: from about 50 to about 150,000 ppmv, from about 50 to about 100,000 ppmv, from about 1,000 to about 15,000 ppmv, from about 50 to about 5,000 ppmv, from about 100 to about 20,000 ppmv, from about 250 to about 25,000 ppmv, from about 5,000 to about 50,000 ppmv, from about 1,000 to about 25,000 ppmv, from about 5,000 to about 25,000 ppmv, from about 2,500 to about 35,000 ppmv, or from about 7,500 to about 35,000 ppmv, and the like.

The fluorine-containing stream may be substantially free of oxygen-containing compounds (e.g., oxygen ($O_2$) and water ($H_2O$)), i.e., may contain less than 100 ppmw (ppm by weight) of oxygen-containing compounds. Therefore, it is contemplated that the amount of oxygen-containing compounds in the fluorine-containing stream may be less than 50 ppmw, less than 25 ppmw, less than 10 ppmw, less than 5 ppmw, or less than 3 ppmw, in certain aspects. In other aspects, the amount of oxygen-containing compounds in the fluorine-containing stream may be in range from about 0.1 to 100 ppmw, from about 0.5 to 100 ppmw, from about 1 to 100 ppmw, from about 0.1 to about 50 ppmw, from about 0.1 to about 25 ppmw, from about 0.1 to about 10 ppmw, or from about 0.1 to about 5 ppmw. While not wishing to be bound by theory, it is believed that it may be beneficial to have substantially no oxygen added during the fluorination step of the method of rejuvenating a spent catalyst. Moreover, although not required, the fluorine-containing stream may be substantially free of chlorine-containing compounds, i.e., may contain less than 100 ppmw (ppm by weight) of chlorine-containing compounds. As above, it is contemplated that the amount of chlorine-containing compounds in the fluorine-containing stream may be, for instance, less than 50 ppmw, less than 10 ppmw, in a range from about 0.1 to 100 ppmw, in a range from about 0.1 to about 50 ppmw, or in a range from about 0.1 to about 10 ppmw, and the like.

The fluorination step may be conducted at a variety of temperatures and time periods. For instance, the fluorination step may be conducted at a fluorination temperature in a range from about 0° C. to about 500° C.; alternatively, from about 0° C. to about 300° C.; alternatively, from about 20° C. to about 300° C.; alternatively, from about 20° C. to about 250° C.; alternatively, from about 20° C. to about 150° C.; alternatively, from about 35° C. to about 300° C.; alternatively, from about 35° C. to about 200° C.; alternatively, from about 50° C. to about 250° C.; alternatively, from about 50° C. to about 200° C.; alternatively, from about 100° C. to about 300° C.; alternatively, from about 100° C. to about 250° C.; alternatively, from about 150° C. to about 275° C.; or alternatively, from about 15° C. to about 50° C. In these and other aspects, these temperature ranges also are meant to encompass circumstances where the fluorination step is conducted at a series of different temperatures, instead of at a single fixed temperature, falling within the respective ranges.

The duration of the fluorination step is not limited to any particular period of time. Hence, the fluorination step may be conducted, for example, in a time period ranging from as little as 30-45 minutes to as long as 12-24 hours, 36-48 hours, or more. The appropriate fluorination time may depend upon, for example, the fluorination temperature and the amount of fluorine in the fluorine-containing stream, among other variables. Generally, however, the fluorination step may be conducted in a time period that may be in a range from about 45 minutes to about 48 hours, such as, for example, from about 1 hour to about 48 hours, from about 45 minutes to about 24 hours, from about 45 minutes to about 18 hours, from about 1 hour to about 12 hours, from about 2 hours to about 12 hours, from about 4 hours to about 10 hours, or from about 2 hours to about 8 hours.

In various aspects contemplated herein, the method of rejuvenating the naphtha reforming catalyst may further include one or more optional steps performed prior to the chlorination step and the carbon burn step. For example, a method of rejuvenating a spent catalyst may further comprise a partial decoking step prior to the chlorination step, and/or may further comprise a pre-drying step prior to the chlorination step. These optional pre-chlorination steps are discussed in greater detail herein below. In one aspect, at least one of these optional steps may be performed in a method of rejuvenating a spent catalyst, while in another aspect, both of these optional steps may be performed. The pre-chlorination steps may be performed in any order, however, in a particular aspect, the partial decoking step may be performed first, followed by the pre-drying step.

In other aspects, a method of rejuvenating the naphtha reforming catalyst can comprise (i) contacting the spent catalyst with a halogen-containing stream comprising chlorine and/or fluorine to produce a halogenated spent catalyst; and (ii) contacting the halogenated spent catalyst with a decoking gas stream comprising oxygen to produce a rejuvenated naphtha reforming catalyst. The chlorine and fluorine in step (i) can be introduced, in any suitable order, such as together, or sequentially in any order. Methods of rejuvenating catalysts are described in more detail in U.S. application Ser. No. 15/597,189 filed on 17 May 2017; U.S. Pat. Nos. 8,716,161; 8,912,108; 9,174,895; and 9,421,530; and U.S. Publication No. 2014/0213839; each of which is incorporated by reference herein in its entirety.

In addition to the embodiments disclosed herein for rejuvenating the catalyst, suitable processes for rejuvenating the catalyst are described in U.S. Pat. Nos. RE34,250; 4,810,683; 5,776,849; 4,855,269; 4,925,819; 5,106,798; and 8,664,144; each of which is incorporated by reference herein in its entirety. U.S. Pat. No. 4,937,215, which is also hereby incorporated by reference in its entirety, also describes a process for rejuvenating deactivated Pt-zeolite catalysts by treating the catalyst at about 200-525° C. with a halogen compound. Oxygen is then added to the mixture to remove coke and, finally, the catalyst is treated with a chlorofluorocarbon compound, oxygen, and nitrogen.

In still other embodiments, the catalyst rejuvenation system may be used to reduce a fresh catalyst in situ or otherwise prepare the catalyst for the introduction of hydrocarbons. For example, the catalyst rejuvenation system may be used to flush the catalyst with nitrogen prior to introduction of hydrocarbons to the reactor when the reactor is placed back into service for performing the naphtha reforming reactions.

In an embodiment, the catalyst rejuvenation system can comprise a halide source whereby halide can be added to the first naphtha reforming catalyst, the second naphtha reforming catalyst, or both during rejuvenation. The use of a halide source can lead to halide being present in the rejuvenated catalyst.

In an embodiment, preparing a reactor to resume conversion of the hydrocarbon feed stream comprising the convertible hydrocarbons can comprise reducing the catalyst with a compound that reversibly reduces the activity of the catalyst, as previously described herein.

Once the ability of the reactor (e.g., adiabatic reactor, isothermal reactor) to convert the convertible hydrocarbons (e.g., aliphatic, alicyclic, and/or naphthenic hydrocarbons) to aromatic hydrocarbons has been restored, the reactor may be optionally prepared to resume conversion of the hydrocarbon feed stream comprising the aliphatic, alicyclic, and/or naphthenic hydrocarbons. In an embodiment, a variety of processes may be used to prepare the catalyst for use in the naphtha reforming process. For example, the reactor may be flushed with an inert gas and the catalyst reduced prior to introduction of a hydrocarbon feed stream to the reactor. In an embodiment, the catalyst may be heated and/or exposed to a heated inert gas to allow any components of the catalyst that may evolve or desorb to be removed prior to contacting the catalyst with a hydrocarbon feed stream. For example, a catalyst comprising a halide may evolve some of the halide during exposure to the hydrocarbon feed stream. Preparing the catalyst by exposing the catalyst to a heated gas coupled to a halide removal system may allow a portion of the halides that would otherwise evolve or desorb during the naphtha reforming process to be removed prior to the reactor being placed in service in the reactor system. As a halide may reduce the activity of any downstream catalysts, preparing the fresh catalysts in this way may help avoid reducing the activity of the catalysts contained in the other reactors in the naphtha reforming process. Additional suitable preparation procedures are known in the art. In an embodiment, the reactor may not be prepared for use with the process until shortly before the reactor is to be placed back into service in the reactor system.

In some embodiments, the reaction by which the naphtha reforming catalyst became spent can be irreversible and require that the catalyst be replaced rather than rejuvenated, and the resulting costs savings and process simplification may outweigh the catalyst replacement costs.

Once the catalytic activity in the isolated reactor (e.g., isolated isothermal reactor, isolated adiabatic reactor) is restored, the corresponding valves of the plurality of valves can be dynamically operated to return the isolated reactor(s) to an operational state (e.g., back into service) by restoring fluid communication between the reactor and the corresponding inlet and outlet lines.

Once the reactor (e.g., isothermal reactor, adiabatic reactor) that has been restored and prepared is placed back into service, the naphtha reforming reactor system can resume operations to convert at least a portion of the convertible hydrocarbons (e.g., aliphatic, alicyclic, and/or naphthenic hydrocarbons) in the hydrocarbon feed stream to aromatic hydrocarbons. A catalyst rejuvenation process can be repeated each time a reactor contains a catalyst that is deemed to be spent.

In an embodiment, the naphtha reforming reactors (e.g., first reactor operating at adiabatic conditions, second reactor operating under isothermal naphtha reforming conditions, etc.) disclosed herein can incorporate one or more improvements, when compared to conventional adiabatic reactors and/or isothermal reactors employed in naphtha reforming processes. Such improvements will be described in more detail later herein, and can be employed in any of the process flow schemes disclosed herein (e.g., in any flow scheme described with respect to FIGS. 1-5B).

In an embodiment, a reactor system for carrying out a naphtha reforming process as disclosed herein can comprise a first reactor operating at adiabatic conditions, where the first reactor comprises a first naphtha reforming catalyst; and a second reactor operating under isothermal conditions (e.g. isothermal naphtha reforming conditions), where the second reactor comprises a second naphtha reforming catalyst; and where an amount of the first naphtha reforming catalyst in the first reactor is less than amount of the second naphtha reforming catalyst in the second reactor. In such embodiment, the bulk (e.g., majority) of the naphtha reforming reactions can occur in the isothermal reactor. As will be appreciated by one of skill in the art, and with the help of this disclosure, the isothermal reactor can be more efficient than the adiabatic reactor, as it allows for the catalyst to be utilized more efficiently, since the temperature is maintained above a threshold, such as a naphtha reforming reaction threshold (e.g., the activation temperature for naphtha reforming reactions).

In an embodiment, a reactor system for carrying out a naphtha reforming process as disclosed herein can be characterized by a weight ratio of the catalytic material in the first naphtha reforming catalyst of the adiabatic reactor to the catalytic material in the second naphtha reforming catalyst of the isothermal reactor of from about 1:2 to about 1:10, alternatively from about 1:3 to about 1:9, or alternatively from about 1:4 to about 1:8. As will be appreciated by one of skill in the art, and with the help of this disclosure, the adiabatic reactor can contain more reforming catalyst per the same amount of converted or reformed hydrocarbons than the isothermal reactor, as the isothermal reactor can use more of the naphtha reforming catalyst efficiently.

In an embodiment, the operating temperatures in the first reactor and/or the second reactor do not exceed about 1,000° F. (538° C.). The first reactor (e.g., adiabatic reactor) can be configured to convert the most readily convertible hydrocarbons (e.g., cyclohexane) in the reactor feed stream to aromatic hydrocarbons, and as such does not require inlet temperatures in excess of 1,000 F (538 C). Adiabatic reactors that are configured to perform endothermic reactions such as the naphtha reforming reactions generally have the highest temperature at the inlet, and the temperature decreases across the hydrocarbon flow path through the adiabatic reactor between the inlet and the outlet, where an outlet temperature of an adiabatic reactor performing an endothermic reaction is lower than the inlet temperature of the same reactor. Isothermal reactors that are configured to perform endothermic reactions such as the naphtha reforming reactions as disclosed herein can generally maintain a catalyst temperature above the endothermic reaction threshold temperature that is high enough (although below 1,000 F or 538 C) to efficiently promote the naphtha reforming reactions in the isothermal reactor, and to efficiently utilize the catalyst disposed therein.

In an embodiment, the second reactor (e.g., isothermal reactor) can comprise a plurality of tubes having the second naphtha reforming catalyst (e.g., particles of the second naphtha reforming catalyst) disposed therein, and where the plurality of tubes can be disposed within a heated portion of the reactor furnace. In an embodiment, the isothermal naphtha reforming conditions in the second reactor can be maintained by heating the plurality of tubes of the second reactor within the reactor. In an embodiment, the reactor can comprise a heat source (e.g., burners, heat exchange medium, etc.) configured to heat the interior of the reactor furnace, e.g., heat the plurality of tubes disposed within the reactor furnace. The plurality of tubes can be heated by burners in a radiant zone of the reactor furnace, where the burners combust (e.g., burn) a fuel to heat the tubes. Alternatively, the plurality of tubes can be heated by a heat exchange medium, for example a molten salt such as molten fluorides (e.g., LiF, NaF, KF, etc.), molten chlorides (e.g., $MgCl_2$), molten nitrates, or combinations thereof.

The first reactor effluent passing from a first adiabatic reactor to a second reactor (e.g., isothermal reactor) can be heated within the reactor furnace prior to entering the isothermal reactor, for example in a convection zone of the reactor furnace, by convective heat from the radiant zone of reactor furnace, in a heat exchanger, or the like, as previously described herein.

In an embodiment, from about 15% to about 35%, alternatively from about 17.5% to about 27.5%, or alternatively from about 20% to about 30% of the conversion of the convertible hydrocarbons of the hydrocarbon feed stream to aromatic hydrocarbons can occur in the first reactor (e.g., adiabatic reactor) to produce the first reactor effluent.

In an embodiment, the first reactor effluent recovered from the first reactor (e.g., adiabatic reactor) can be passed through the plurality of tubes within the second reactor (e.g., isothermal reactor), where at least an additional portion of the convertible hydrocarbon in the first reactor effluent can be converted to an addition amount of the aromatic hydrocarbons in the second reactor to form a second reactor effluent, and where the plurality of tubes can be heated within the reactor furnace during the converting.

In an embodiment, from about 65% to about 85%, alternatively from about 67.5% to about 82.5%, or alternatively from about 70% to about 80% of the conversion of the convertible hydrocarbons of the hydrocarbon feed stream to aromatic hydrocarbons can occur in the second reactor (e.g., isothermal reactor) to produce the first reactor effluent.

In an embodiment, the plurality of tubes of the second reactor (e.g., isothermal reactor) can comprise between about 250 tubes to about 5,000 tubes, alternatively between about 500 tubes to about 5,000 tubes, alternatively between about 750 tubes to about 4,000 tubes, or alternatively between about 1,000 tubes to about 3,000 tubes in the reactor furnace. When a capacity larger than about 5,000 tubes is desired for the isothermal reactor, two or more isothermal reactors in parallel could be used. As will be appreciated by one of skill in the art, and with the help of this disclosure, multiple isothermal reactors in parallel can be used even for a capacity less than about 5,000 tubes, such as less than about 1,000 tubes for example. The plurality of tubes can be arranged in parallel with each other between an inlet of the reactor furnace and an outlet of the reactor furnace, e.g., between an inlet of the isothermal reactor and an outlet of the isothermal reactor. In some embodiments, a plurality of isothermal reactors can be arranged in parallel with tubes disposed in each reactor.

In an embodiment, the plurality of tubes of the second reactor (e.g., isothermal reactor) can have an internal diameter (D) between about 0.5 inches (12.7 mm) and about 4 inches (101.6 mm), alternatively between about 0.5 inches (12.7 mm) and about 3 inches (76.2 mm), alternatively between about 1 inch (25.4 mm) and about 2.5 inches (63.5 mm), alternatively between about 1.5 inches (38.1 mm) and about 2 inches (50.8 mm), or alternatively between about 2.5 inches (63.5 mm) and about 3 inches (76.2 mm).

In an embodiment, the plurality of tubes of the second reactor (e.g., isothermal reactor) can have a length (L) to internal diameter (D) ratio (i.e., L/D ratio) between about 25 and about 150, alternatively between about 25 and about 100, or alternatively between about 25 and about 50.

In an embodiment, piping and equipment used throughout the naphtha reforming process as disclosed herein can be constructed of suitable materials based on the operating conditions of the equipment. In an embodiment, nickel (Ni)

and/or cobalt (Co) containing alloys can be used in the construction of a plant for carrying out the naphtha reforming process as disclosed herein, including the piping and/or equipment. Suitable alloys include, but are not limited to, all alloys containing at least about 8 wt. % Ni and/or Co including 300 series austenitic stainless steels (e.g., 304, 310, 316, 321, 347), Incoloy 800, Incoloy 802, heat resistant casting such as HK-40, HP-50, Manaurite XTM, and nickel base alloys such as Inconel 600, 601, 617, 625, Hastelloy C and X, Haynes 214, Nimonic 115, and Udimet 700.

However, since the operating temperatures are not to exceed 1,000° F. (538° C.), the reactor internals do not necessarily need to be coated with a protective coating, as there is less of a chance for coking, carburization, and metal dusting. In an embodiment, the plurality of tubes of the second reactor (e.g., isothermal reactor) do not contain a metal protective layer, such as for example a metal protective layer comprising stannide.

In some embodiments, it may be desirable to coat only the metal surfaces of the piping or equipment that contact the hydrocarbons and aromatics at temperatures above 1,000° F. (538° C.) are made of a material or are coated with a material having a resistance to coking, carburization, and metal dusting. In an embodiment, the surface of the piping and equipment that contact hydrocarbons above 1,000° F. (538° C.) can be coated by a method comprising plating, cladding, painting, or coating the surfaces that contact the hydrocarbon to provide improved resistance to carburization and metal dusting followed by heating to cure the coating in a reducing environment to form the metal protective layer. Examples of metal surfaces of the piping or equipment that may contact the hydrocarbons and aromatics at temperatures above 1,000° F. (538° C.) include surfaces of the furnace tubes in the furnace (e.g., first furnace) before an adiabatic reactor (e.g., first adiabatic reactor, or first reactor) and surfaces of piping that carries the effluent of the furnace (e.g., heated hydrocarbon feed stream, heated first hydrocarbon feed stream).

In some embodiments, it may be desirable that metal surfaces of the piping or equipment that contact the hydrocarbons and aromatics at elevated temperatures are made of a material or are coated with a material having a resistance to coking, carburization, and metal dusting. In an embodiment, the surface of the piping and equipment that contact hydrocarbons can be treated with a metal protective layer by a method comprising plating, cladding, painting, or coating the surfaces that contact the hydrocarbon followed by heating to cure the coating in a reducing environment to form the metal protective layer. The metal protective layer provides improved resistance to carburization and metal dusting. Alternatively, the surfaces can be constructed of or lined with a ceramic material.

In an embodiment, the piping and equipment used throughout the naphtha reforming process as disclosed herein can have a metal-containing coating, cladding, plating, or paint applied to at least a portion (e.g., at least about 80%, alternatively at least about 95%, or alternatively about 100%) of the surface area that is to be contacted with hydrocarbons at process temperature. After coating, the metal-coated reactor system can be preferably heated and cured in a reducing environment to produce a metal protective layer comprising intermetallic and/or metal carbide layers. A preferred metal protective layer for the reactor system preferably comprises a base construction material (such as a carbon steel, a chromium steel, or a stainless steel) having one or more adherent metallic layers attached thereto. An example of metallic layer includes elemental chromium. Suitable coatings as well as application and processing techniques are described in U.S. Pat. Nos. 5,676,821; and 6,551,660, each of which is incorporated by reference herein in its entirety.

Additional materials useful for preventing coking may include alloys comprising aluminum. For example, the alloy may comprise at least about 1 wt. % Al and more preferably at least about 4 wt. % Al up to a maximum of about 10 wt. % Al. Alternatively, the alloy may be coated with a diffusion layer of Al, where Al metal is reacted with the alloy in a high temperature process to form a surface diffusion layer rich in aluminum. The concentration of Al in the surface diffusion layer can range anywhere from about 5 wt. % to roughly 30 wt. % depending upon the preparation method. Suitable alloys and materials formed using aluminum and aluminum coating are described in more detail in U.S. Pat. No. 6,803,029, which is incorporated by reference herein in its entirety.

As will be appreciated by one of skill in the art, and with the help of this disclosure, generally, lower overall pressures, and specifically a lower pressure drop across a catalyst bed can be beneficial in fixed bed reactors such as the adiabatic reactors and the isothermal reactors used for the naphtha reforming reactions as disclosed herein, as the naphtha reforming reactions results in a large net increase in moles during the reaction. For example, one way to lower the pressure drop across a catalyst bed can be to increase a catalyst particle size, since the naphtha reforming reactions are not diffusion limited. Further, as will be appreciated by one of skill in the art, and with the help of this disclosure, doubling a catalyst particle size could lead to halving the pressure drop across the catalyst bed.

In an embodiment, a graded catalyst bed loading can be used inside at least one tube of the plurality of tubes of the second reactor (e.g., isothermal reactor), where a catalyst grading can be in catalyst particle size, catalyst activity (e.g., group VIII metal loading, group IB metal loading, Pt loading, etc.), or both. As will be appreciated by one of skill in the art, and with the help of this disclosure, the second reactor could be operated under isothermal naphtha reforming conditions under a non-uniform catalyst loading inside the plurality of tubes of the second reactor.

In an embodiment, a pressure drop between an inlet of the plurality of tubes of the second reactor (e.g., isothermal reactor) and an outlet of the plurality of tubes can be less than about 20 psia (0.14 MPa), alternatively less than about 25 psia (0.17 MPa), alternatively less than about 30 psia (0.21 MPa), or alternatively less than about 35 psia (0.25 MPa). In other embodiments, the pressure drop measured between an inlet of the plurality of tubes of the second reactor (e.g., isothermal reactor) and an outlet of the plurality of tubes can be from about 1 psia (0.007 MPa) to about 20 psia (0.1 MPa), from about 2 psia (0.01 MPa) to about 15 psia (0.01 MPa), from about 3 psia (0.02 MPa) to about 12 psia (0.08 MPa). By using a graded catalyst loading into the plurality of tubes of the second reactor, where the grading is based on catalyst particle size, the pressure drop across the second reactor can be lowered, which can in turn allow for a lower inlet pressure for the inlet of the plurality of tubes of the second reactor.

In an embodiment, a pressure at an inlet of the plurality of tubes of the second reactor (e.g., isothermal reactor) can be less than about 150 psig (1.04 MPa), alternatively between about 75 psig (0.53 MPa) and about 100 psig (0.69 MPa), alternatively between about 25 psig (0.17 MPa) and about 70 psig (0.48 MPa), between about 30 psig (0.21 MPa) and about 60 psig (0.41 MPa), or alternatively between about 35 psig (0.24 MPa) and about 50 psig (0.34 MPa).

Generally, a lower overall pressure can result in a higher conversion to aromatic hydrocarbons, since the naphtha reforming reactions results in a large net increase in moles. A lower overall pressure drop in the reactor system for carrying out a naphtha reforming process as disclosed herein can also be achieved by eliminating the use of a sulfur converter adsorber (SCA), as the SCA can contribute to almost 10% of the overall pressure drop in the reactor system.

In an embodiment, the catalyst can have a crush strength of equal to or greater than about 4 pounds force (lbf, 17.8 N), alternatively equal to or greater than about 5 lbf (22.2 N), alternatively equal to or greater than about 6 lbf (26.7 N), wherein the catalyst has a particle size of about $1/16^{th}$ inch (16 mm) in diameter. For purposes of the disclosure herein, the crush strength can be defined as the resistance of the catalyst support and/or catalyst (e.g., catalyst particles) to compressive forces, without experiencing mechanical failure. Measurements of crush strength are intended to provide an indication of the ability of the catalyst to maintain its physical integrity during handling and use. Crush strength can be determined in accordance with ASTM method D 6175-98 "Standard Test Method for Radial Crush Strength of Extruded Catalyst," with the exception that the force applied to the sample is applied laterally. As will be appreciated by one of skill in the art, and with the help of this disclosure, the ability to have a tube loaded with catalyst can be limited by the height of the loaded catalyst column, and the pressure drop across the reactor when the pressure contributes to the force exerted on the catalyst.

In an embodiment, at least one tube of the plurality of tubes of the second reactor (e.g., isothermal reactor) has a plurality of catalyst zones. In an embodiment, an amount of the second naphtha reforming catalyst of the isothermal reactor can be configured to be substantially fully utilized when the second naphtha reforming catalyst disposed within the plurality of tubes is operating above an endothermic reaction threshold temperature, wherein the endothermic reaction threshold temperature can be about 800° F. (425° C.).

In an embodiment, at least one tube of the plurality of tubes of the second reactor (e.g., isothermal reactor) comprises a graded catalyst bed, where the catalyst bed is graded with respect to the catalyst particle size and/or catalyst activity. Generally, the use of a graded bed with respect to the catalyst particle size can be used to control the pressure drop across the plurality of tubes of the second reactor. Further, the use of a graded bed with respect to the catalyst activity can allow for controlling the overall rate of reaction along a length of a catalyst bed. For example, when the catalyst bed comprises a naphtha reforming catalyst, if the zone of the catalyst bed that the hydrocarbon feed stream encounters first has a high catalytic activity, then the reforming reaction can proceed at a very high rate causing a large drop in temperature, which can trigger a lower than desired reaction rate in subsequent zones of the catalyst bed.

In an embodiment, the plurality of tubes of the second reactor (e.g., isothermal reactor) comprises a graded catalyst bed, where the catalyst bed is graded with respect to the catalyst particle size. In an embodiment, at least one tube of the plurality of tubes of the second reactor (e.g., isothermal reactor) comprises a graded catalyst bed, where the catalyst bed is graded with respect to the catalyst particle size.

In an embodiment, the naphtha reforming catalyst (e.g., a first naphtha reforming catalyst, a second naphtha reforming catalyst, etc.) can have a catalyst particle size of from about 0.01 inches (0.25 mm) to about 0.5 inches (12.7 mm), alternatively from about 0.05 inches (1.27 mm) to about 0.35 inches (8.89 mm), or alternatively from about 0.0625 inches (1.59 mm) to about 0.25 inches (6.35 mm). Generally, the catalyst bed inside the plurality of tubes of the second reactor (e.g., isothermal reactor) can comprise catalyst particles having a size decreasing along a length of at least one tube of the plurality of tubes, from an inlet of the plurality of tubes towards an outlet of the plurality of tubes, and in the direction of the flow inside the tubes. For example, the catalyst particles can be characterized by a size gradient, where a catalyst particle size can decrease from an entry point into a catalyst bed (e.g., inlet) to an exit point from the catalyst bed (e.g., outlet), e.g., a size of the catalyst particles can decrease along a catalyst bed in the direction of the flow through the tube comprising the catalyst particles. In some embodiments, a decrease in the size of the catalyst particles can be continuous (e.g., according to any gradient(s)) along a length of the fixed bed or zone thereof. In other embodiments, the decrease in the size of the catalyst particles can occur step-wise through a plurality of zones across a length of the fixed bed wherein the catalyst particles size composition (or distribution of catalyst particles sizes) of the individual zones is constant. As another example, a size of the catalyst particles can decrease along some regions or zones of the catalyst bed, and stay the same along yet other zones of the catalyst bed.

In an embodiment, the catalyst bed can comprise a plurality of catalyst zones, where a first catalyst zone of the plurality of catalyst zones can comprise a first catalyst material having a first particle size, where a second catalyst zone of the plurality of catalyst zones can comprise a second catalyst material having a second particle size, where the first particle size can be larger than the second particle size, and where the first catalyst zone can be upstream of the second catalyst zone. The first reactor effluent can contact the catalyst particles in the first catalyst zone of the plurality of catalyst zones to produce a first catalyst zone effluent, where the first catalyst zone is the first zone of the plurality of catalyst zones contacted by the first reactor effluent. The first catalyst zone effluent can contact the catalyst particles in the second catalyst zone of the plurality of catalyst zones to produce a second catalyst zone effluent, which can then be recovered as the second reactor effluent in embodiments where the catalyst bed comprises only two catalyst zones, a first catalyst zone and a second catalyst zone. In embodiments where the catalyst bed comprises more than two catalyst zones, the second catalyst zone effluent can be further introduced to the next catalyst zone, and so on. In some embodiments, the first particle size can be about 0.125 inches (3.18 mm), and the second particle size can be about 0.0625 inches (1.59 mm). Any subsequent zones, if present, could have further decreasing catalyst particle sizes.

An embodiment of a graded catalyst bed 600 is shown in FIG. 6A. The graded catalyst bed 600 can be housed in a tube 602 (e.g., a tube of the plurality of tubes of the second reactor), and can comprise a top catalyst zone 610, and a bottom catalyst zone 612, where the flow in the reactor can be from the top catalyst zone 610 to the bottom catalyst zone 612. The top catalyst zone 610 can comprise a first catalyst material 620 having a first particle size, and the bottom catalyst zone 612 can comprise the second catalyst material 622 having the second particle size, where the first particle size is larger than the second particle size.

Another embodiment of a graded catalyst bed 650 is shown in FIG. 6B. The graded catalyst bed 650 can be housed in a tube 602 (e.g., a tube of the plurality of tubes of the second reactor), and can comprise a top catalyst zone 660 (e.g., a first zone), a middle catalyst zone 662, and a bottom catalyst zone 664 (e.g., a final zone), where the flow in the reactor can be from the top catalyst zone 660 towards the bottom catalyst zone 664, and where the middle catalyst zone 662 can be located between the top catalyst zone 660 and the bottom catalyst zone 664. The top catalyst zone 660 can comprise a first catalyst material 620 having a first particle size. The bottom catalyst zone 664 can comprise a second catalyst material 622 having a second particle size, where the first particle size is larger than the second particle size. The middle catalyst zone 662 can comprise both the first catalyst material 620 having the first particle size and the second catalyst material 622 having the second particle size. In some embodiments, the middle catalyst zone 662 can comprise the first catalyst material 620 and the second catalyst material in about the same amounts by volume, though higher or lower relative volumetric amounts can also be used. In an embodiment, the middle catalyst zone 662 can comprise the first catalyst material 620 and the second catalyst material in a ratio of about 45/55, about 50/50, about 55/45, based on volumetric ratios of the first catalyst material 620 to the second catalyst material 622 in the middle catalyst zone 662.

In an embodiment, the plurality of tubes of the second reactor (e.g., isothermal reactor) comprises a graded catalyst bed, where the catalyst bed is graded with respect to the catalyst loading and/or activity. In an embodiment, at least one tube of the plurality of tubes of the second reactor (e.g., isothermal reactor) comprises a graded catalyst bed, where the catalyst bed is graded with respect to the catalyst loading and/or activity. The catalyst bed can be graded by the loading of a catalytically active metal (e.g., group VIII metal, group IB metal, Pt, etc.), and/or by the loading of an inert diluent to a fixed catalyst composition. In some aspects where the catalyst grading occurs via metal loading, no inert diluent is used. In an embodiment, a top catalyst zone can comprise from about 0.5 wt. % to about 0.60 wt. % catalytically active metal (e.g., group VIII metal, group IB metal, Pt, etc.), a middle catalyst zone can comprise from about 0.75 wt. % to about 0.90 wt. % catalytically active metal (e.g., group VIII metal, group IB metal, Pt, etc.), and a bottom catalyst zone can comprise from about 1.0 wt. % to about 1.25 wt. % catalytically active metal (e.g., group VIII metal, group IB metal, Pt, etc.). As will be appreciated by one of skill in the art, and with the help of this disclosure, the ranges of catalytically active metal (e.g., group VIII metal, group IB metal, Pt, etc.) loading in each of the top, middle, and bottom zones can vary as necessary for each individual naphtha reforming process.

In an embodiment, the catalyst bed (e.g., graded catalyst bed) inside the plurality of tubes of the second reactor (e.g., isothermal reactor) can comprise catalyst particles having an amount of active catalyst material per unit volume (e.g., volumetric concentration of active catalyst material) increasing along a length of at least one tube of the plurality of tubes, from an inlet to the plurality of tubes towards an outlet of the plurality of tubes, and in the direction of the flow inside the tubes, where the balance of the material per unit volume can be an inert material, a less active naphtha reforming catalyst material, an isomerization catalyst, or a mixture of both.

In an embodiment, the inert material of the graded catalyst bed can be any suitable chemically inert solid diluent or bulking material that does not catalyze the naphtha reforming reactions. For example, the inert material can be any support described herein for the naphtha reforming catalyst, such as a zeolite and one or more halides, without the at least one group VIII metal. In some embodiments, the inert material can comprise alumina, preferably silica, alpha alumina, silica-alumina, fused alumina, aluminosilicates, glass beads, and the like, or combinations thereof.

In an embodiment, the last catalyst zone (e.g., second catalyst zone, bottom catalyst zone, third catalyst zone, fourth catalyst zone) inside the plurality of tubes of the second reactor (e.g., isothermal reactor) can comprise isomerization catalyst particles. In an embodiment, the isomerization catalyst can be any suitable isomerization catalyst material that has a higher activity for the naphtha isomerization reactions than the naphtha reforming catalyst, particularly for the isomerization of branched hydrocarbons to less branched hydrocarbons; or any suitable isomerization catalyst material that catalyzes to a lesser extent the naphtha reforming reactions when compared to the naphtha reforming catalyst (e.g., a less active naphtha reforming catalyst material). As will be appreciated by one of skill in the art, and with the help of this disclosure, if the isomerization catalyst was placed in the first reaction zone, then the isomerization catalyst would catalyze the reaction of the large excess of unbranched hydrocarbons (e.g., convertible hydrocarbons) into much-much less reactive branched hydrocarbons. However, and as will be appreciated by one of skill in the art, and with the help of this disclosure, if the isomerization catalyst is placed in the last reaction zone, subsequent to substantially all the unbranched hydrocarbons having been converted, the isomerization catalyst can catalyze the conversion of branched hydrocarbons into (the now depleted) unbranched hydrocarbons.

The isomerization catalyst can catalyze the conversion of acyclic hydrocarbons to cyclic hydrocarbons, but should not have high activity or activity towards dehydrogenating the cyclic hydrocarbons to produce aromatic hydrocarbons. In some embodiments, the isomerization catalyst can comprise a zeolite support, and one or more halides. The zeolite support, and one or more halides can be any suitable zeolitic supports and halides as described herein for the naphtha reforming catalyst, without the at least one group VIII metal. In an aspect, the isomerization catalysts can be used for isomerizing dimethylbutanes to convertible $C_6$s.

In an embodiment, the catalyst bed (e.g., graded catalyst bed) can comprise a plurality of catalyst zones, where a first catalyst zone of the plurality of catalyst zones can comprise a mixture of a naphtha reforming catalyst, a less active naphtha reforming catalyst material, and an inert material, or a mixture of both, and where the first catalyst zone can be disposed on an upstream end of the at least one tube within the reactor furnace. In some embodiments, the catalyst bed can comprise a second catalyst zone of the plurality of catalyst zones where the second catalyst zone can comprise only a catalyst without the inert material, and where the second catalyst zone can be disposed downstream of the first catalyst zone. Each catalyst zone of the plurality of catalyst zones comprises an increasing amount of catalyst particles (e.g., an increasing volumetric concentration of active catalyst material) from an upstream to a downstream direction, where a final catalyst zone of the plurality of catalysts zones contains the lowest amount (e.g., little to none) of inert material, and where the final catalyst zone is the most downstream catalyst zone of the plurality of catalyst zones.

In some embodiments, the catalyst bed (e.g., graded catalyst bed) inside the plurality of tubes of the second reactor (e.g., isothermal reactor) can comprise two or more zones (e.g., catalytic zones), where the first zone and subsequent zones comprises the naphtha reforming catalyst and optionally an inert material, a less active naphtha reforming catalyst material, or mixtures thereof. In such an embodiment, the last zone comprises the naphtha reforming catalyst and optionally an inert material, an isomerization catalyst, or mixtures thereof. When the catalyst bed comprises two or more zones (e.g., catalytic zones), the naphtha reforming catalyst can be distributed along the catalyst bed according to a volumetric concentration gradient. For example, a volumetric concentration of the naphtha reforming catalyst can increase from an entry point into a catalyst bed (e.g., inlet) to an exit point from the catalyst bed (e.g., outlet), e.g., a volumetric concentration of the naphtha reforming catalyst can increase along a catalyst bed in the direction of the flow through the isothermal reactor. In some embodiments, an increase in the volumetric concentration of the naphtha reforming catalyst can be continuous along a length of the catalyst bed or zone thereof. In other embodiments, the increase in the volumetric concentration of the naphtha reforming catalyst can be step-wise across a length of the catalyst bed or zone thereof. As another example, a volumetric concentration of the naphtha reforming catalyst can increase along some regions or zones of the catalyst bed, and stay the same along yet other regions of the catalyst bed. The amount of inert material, less active naphtha reforming catalyst material, an isomerization catalyst, or a mixture of both can likewise be adjusted or varied across the catalyst bed geometry (e.g., along a length of the catalyst bed or zone thereof) to provide a desired naphtha reforming catalyst volumetric concentration profile.

In an embodiment, the catalyst bed (e.g., graded catalyst bed) inside the plurality of tubes of the second reactor (e.g., isothermal reactor) can comprise a top zone, a middle zone, and a bottom zone, where the flow in the reactor can be from a top zone towards a bottom zone, and where the middle zone can be located between the top zone and the bottom zone. In such embodiment, the top zone comprises both a naphtha reforming catalyst and an inert material, a less active naphtha reforming catalyst material, or a mixtures thereof, where an amount of naphtha reforming catalyst by volume is about the same as (e.g., about 45/55, about 50/50, about 55/45, based on volumetric ratios of naphtha reforming catalyst to inert material, less active naphtha reforming catalyst material, or a mixture of both in the top zone) or less then (e.g., less than 50%, 45%, 40%, 35%, 30%, 25%, 20%, 15%, 10%, or 5%, based on a total volume of the top zone) an amount of inert material, less active naphtha reforming catalyst material, or a mixture of both in the top zone; where the middle zone comprises an inert material, a less active naphtha reforming catalyst material, or a mixture of both in an amount by volume that is less than (e.g., less than 50%, 45%, 40%, 35%, 30%, 25%, 20%, 15%, 10%, 5%, or 1%, based on a total volume of the middle zone) an amount of the naphtha reforming catalyst; and where an amount of the naphtha reforming catalyst by volume is greater than (e.g., greater than 50%, 55%, 60%, 65%, 70%, 75%, 80%, 85%, 90%, 95%, 99%, or 100% based on a total volume of the bottom zone) an amount of the inert material, less active naphtha reforming catalyst material, or mixture of both in the bottom zone. In such embodiment, the middle catalyst zone comprises both a naphtha reforming catalyst and an inert material, a less active naphtha reforming catalyst material, or mixtures thereof. In such embodiments, the bottom catalyst zone comprises both a naphtha reforming catalyst and an inert material, a less active naphtha reforming catalyst material, an isomerization catalyst, or a mixture thereof.

In an embodiment, the naphtha reforming catalyst can be present in the graded catalyst bed or any zone thereof in an amount of from about 10 vol. % to about 100 vol. %, alternatively from about 25 vol. % to about 100 vol. %, or alternatively from about 33 vol. % to about 66 vol. %, based on the total volume of the catalyst bed or zone thereof.

In an embodiment, the catalyst bed (e.g., graded catalyst bed) inside the plurality of tubes of the second reactor (e.g., isothermal reactor) can comprise a top zone, a middle zone, and a bottom zone; where the top zone includes from about 50 vol. % to about 60 vol. % of a naphtha reforming catalyst and from about 40 vol. % to about 50 vol. % inert material, less active naphtha reforming catalyst material, or mixture of both by volume; where the middle zone includes from about 80 vol. % to about 60 vol. % of a naphtha reforming catalyst and from about 20 vol. % to about 40 vol. % of an inert material, less active naphtha reforming catalyst material, or mixture of both by volume; and where the bottom zone includes about 100 vol. % reforming catalyst by volume.

In another embodiment, the catalyst bed (e.g., graded catalyst bed) inside the plurality of tubes of the second reactor (e.g., isothermal reactor) can comprise a top zone, a middle zone, and a bottom zone; where the top zone includes from about 50 vol. % to about 60 vol. % of a naphtha reforming catalyst and from about 40 vol. % to about 50 vol. % inert material, less active naphtha reforming catalyst material, or mixture of both by volume; where the middle zone includes from about 80 vol. % to about 60 vol. % of a naphtha reforming catalyst and from about 20 vol. % to about 40 vol. % of an inert material, less active naphtha reforming catalyst material, or mixture of both by volume; and where the bottom zone includes from about 100 vol. % to about 20 vol. % naphtha reforming catalyst by volume and from about 0 vol. % to about 20 vol. % of an isomerization catalyst material.

In an embodiment, the catalyst bed (e.g., graded catalyst bed) can comprise a plurality of catalyst zones, where a first catalyst zone of the plurality of catalyst zones can comprise a mixture of catalyst particles (e.g., naphtha reforming catalyst particles) and a first material (e.g., an inert material, a less active naphtha reforming catalyst material, or a mixture of both), and where the first catalyst zone can be disposed on an upstream end of the at least one tube within the reactor furnace.

In an embodiment, the first reactor effluent recovered from the adiabatic reactor can pass through a plurality of catalyst zones within at least one tube of the plurality of tubes of the second reactor (e.g., isothermal reactor) while being heated in the reactor furnace. The first reactor effluent can contact a mixture of catalyst particles and a first material in a first catalyst zone of the plurality of catalyst zones, where the first catalyst zone is the first catalyst zone of the plurality of catalyst zones contacted by the first reactor effluent, where the first reactor effluent contacts a second mixture of catalyst particles and the first material in a second catalyst zone of the plurality of catalyst zones, and where a ratio of the volume of catalyst particles to the volume of the first material is higher in the second catalyst zone than in the first catalyst zone.

In an embodiment, the first reactor effluent can contact the mixture of catalyst particles and the first material in the first catalyst zone of the plurality of catalyst zones to produce a first catalyst zone effluent, where the first catalyst zone is the first catalyst zone of the plurality of catalyst zones contacted by the first reactor effluent. The first catalyst zone effluent can contact a second catalyst zone of the plurality of catalyst zones containing a second mixture of catalyst particles and a second material (e.g., an inert material, a less active naphtha reforming catalyst material, or a mixture of both), where a weight ratio of the amount of catalyst particles to the second material is higher in the second catalyst zone than a weight ratio of the amount of the catalyst particles to the first material in the first catalyst zone, where the first catalyst zone is upstream of the second catalyst zone, and where the first material and the second material can be the same or different. These weight ratios are based on the weight of the catalyst when loaded. The second catalyst zone effluent can contact the remaining catalyst zones of the plurality of catalyst zones, where each catalyst zone of the plurality of catalyst zones comprises an increasing amount of catalyst particles from an upstream to a downstream direction, and where a final catalyst zone of the plurality of catalysts zones contains no first material and/or second material, where the final catalyst zone is the most downstream catalyst zone of the plurality of catalyst zones.

In an embodiment, the first reactor effluent contacts naphtha reforming catalyst particles in a first catalyst zone of the plurality of catalyst zones to produce a first catalyst zone effluent, wherein the first catalyst zone is the first catalyst zone of the plurality of catalyst zones contacted by the first reactor effluent; wherein the first catalyst zone effluent contacts a second catalyst zone of the plurality of catalyst zones to produce a second catalyst zone effluent, wherein the second catalyst zone contains a second zone mixture of naphtha reforming catalyst particles and a second material, wherein the first catalyst zone is upstream of the second catalyst zone; and wherein the second catalyst zone effluent contacts a third catalyst zone of the plurality of catalyst zones to produce a third catalyst zone effluent, wherein the third catalyst zone contains naphtha reforming catalyst particles or a third zone mixture of naphtha reforming catalyst particles and a third material, wherein the third catalyst zone is downstream of the second catalyst zone, and wherein the third catalyst zone is the last catalyst zone of the plurality of catalyst zones contacted by the first reactor effluent. In such embodiment, the third zone mixture comprises an inert material, an isomerization catalyst, or a mixture of both an inert material and an isomerization catalyst. In such embodiment, at least a catalyst zone upstream of the third catalyst zone comprises substantially naphtha reforming catalyst particles.

In another embodiment, the first reactor effluent contacts a first catalyst zone of the plurality of catalyst zones to produce a first catalyst zone effluent, wherein the first catalyst zone contains a first zone mixture of naphtha reforming catalyst particles and a first material, wherein the first catalyst zone is the first catalyst zone of the plurality of catalyst zones contacted by the first reactor effluent; wherein the first catalyst zone effluent contacts a second catalyst zone of the plurality of catalyst zones to produce a second catalyst zone effluent, wherein the second catalyst zone contains naphtha reforming catalyst particles, wherein the first catalyst zone is upstream of the second catalyst zone; and wherein the second catalyst zone effluent contacts a third catalyst zone of the plurality of catalyst zones to produce a third catalyst zone effluent, wherein the third catalyst zone contains naphtha reforming catalyst particles or a third zone mixture of naphtha reforming catalyst particles and a third material, wherein the third catalyst zone is downstream of the second catalyst zone, and wherein the third catalyst zone is the last catalyst zone of the plurality of catalyst zones contacted by the first reactor effluent. In such embodiment, the third zone mixture comprises an inert material, an isomerization catalyst, or a mixture of both an inert material and an isomerization catalyst. In such embodiment, at least a catalyst zone upstream of the third catalyst zone comprises substantially naphtha reforming catalyst particles.

An embodiment of a graded catalyst bed 700 is shown in FIG. 7A. The graded catalyst bed 700 can be housed in a tube 702 (e.g., a tube of the plurality of tubes of the second reactor), and can comprise a top catalyst zone 710, and a bottom catalyst zone 712, where the flow in the reactor can be from the top catalyst zone 710 to the bottom catalyst zone 712. The top catalyst zone 710 can comprise a naphtha reforming catalyst 720 and a first material 722, where the first material can comprise an inert material, a less active naphtha reforming catalyst material, or a mixture of both, and where a concentration of the naphtha reforming catalyst 720 per unit volume is about the same as a concentration of the first material 722 per unit volume in the first catalyst zone. The bottom catalyst zone 712 can comprise the naphtha reforming catalyst 720 and no first material.

Another embodiment of a graded catalyst bed 750 is shown in FIG. 7B. The graded catalyst bed 750 can be housed in a tube 702 (e.g., a tube of the plurality of tubes of the second reactor), and can comprise a top catalyst zone 760 (e.g., a first zone), a middle catalyst zone 762, and a bottom catalyst zone 764 (e.g., a final zone), where the flow in the reactor can be from the top catalyst zone 760 towards the bottom catalyst zone 764, and where the middle catalyst zone 762 can be located between the top catalyst zone 760 and the bottom catalyst zone 764. The top catalyst zone 760 can comprise a naphtha reforming catalyst 720 and a first material 722, where the first material can comprise an inert material, a less active naphtha reforming catalyst material, or a mixture of both, and where a concentration of the naphtha reforming catalyst 720 per unit volume is about the same as a concentration of the first material 722 per unit volume in the top catalyst zone. The middle catalyst zone 762 can comprise the naphtha reforming catalyst 720 and the first material 722, where a concentration of the naphtha reforming catalyst 720 per unit volume is greater than a concentration of the first material 722 per unit volume in the middle catalyst zone (e.g., a ratio of a concentration of the naphtha reforming catalyst 720 per unit volume to a concentration of the first material 722 per unit volume in the middle catalyst zone is about 2:1). The bottom catalyst zone 764 can comprise the naphtha reforming catalyst 720 and no first material.

In an embodiment, the plurality of tubes of the second reactor (e.g., isothermal reactor) comprises a graded catalyst bed, where the catalyst bed is graded with respect to both the catalyst particle size and the catalyst loading and/or activity. In an embodiment, at least one tube of the plurality of tubes of the second reactor (e.g., isothermal reactor) comprises a graded catalyst bed, where the catalyst bed is graded with respect to both the catalyst particle size and the catalyst loading and/or activity. The catalyst bed can be graded with respect to the catalyst particle size as previously described herein and concurrently with respect to the catalyst loading and/or activity as previously described herein.

In an embodiment, the catalyst bed inside the plurality of tubes of the second reactor (e.g., isothermal reactor) can comprise catalyst particles having (i) a size decreasing along a length of at least one tube of the plurality of tubes, from an inlet to the plurality of tubes towards an outlet of the plurality of tubes, and in the direction of the flow inside the tubes; and (ii) an amount of active catalyst material per unit volume (e.g., volumetric concentration of active catalyst material) increasing along a length of at least one tube of the plurality of tubes, from an inlet to the plurality of tubes towards an outlet of the plurality of tubes, and in the direction of the flow inside the tubes, where the balance of the material per unit volume can be an inert material, a less active naphtha reforming catalyst material, an isomerization catalyst, or mixtures thereof.

In an embodiment, the catalyst bed (e.g., graded catalyst bed) can comprise a plurality of catalyst zones, where a first catalyst zone of the plurality of catalyst zones can comprise a mixture of catalyst particles (e.g., naphtha reforming catalyst particles) having a first catalyst particle size and a first material (e.g., an inert material, a less active naphtha reforming catalyst material, or a mixture of both) having a first material particle size, and where the first catalyst zone can be disposed on an upstream end of the at least one tube within the reactor furnace. The catalyst bed can comprise a second catalyst zone, where the second catalyst zone of the plurality of catalyst zones can comprise only a second catalyst material having a second catalyst particle size, without the inert material, where the first particle size can be larger than the second particle size, and where the first catalyst zone can be upstream of the second catalyst zone. In some embodiments, the first catalyst particle size and the first material particle size can be the same. In other embodiments, the first catalyst particle size and the first material particle size can be different. Each catalyst zone of the plurality of catalyst zones comprises an increasing amount of catalyst particles (e.g., an increasing volumetric concentration of active catalyst material) from an upstream to a downstream direction, where a final catalyst zone of the plurality of catalysts zones contains no inert material, where the catalyst particles decrease in size from an upstream to a downstream direction, and where the final catalyst zone is the most downstream catalyst zone of the plurality of catalyst zones.

Figure 8A:
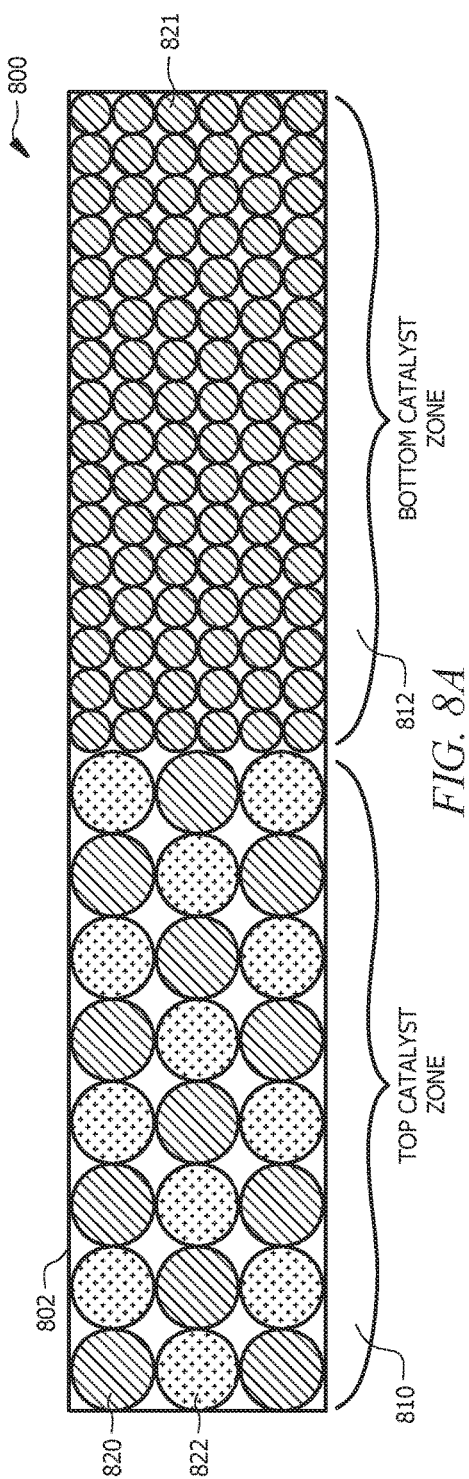
FIG. 8A is a diagram of still yet another embodiment of a graded catalyst bed of the present disclosure.
Figure 8B:
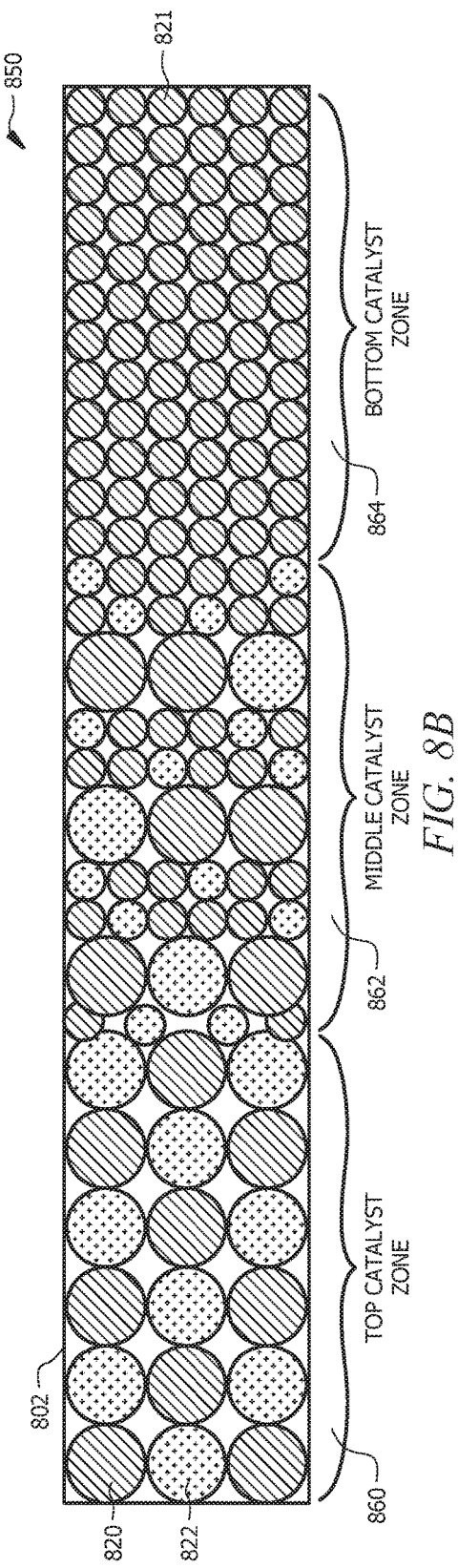
FIG. 8B is a diagram of still yet another embodiment of a graded catalyst bed of the present disclosure.

An embodiment of a graded catalyst bed 800 is shown in FIG. 8A. The graded catalyst bed 800 can be housed in a tube 802 (e.g., a tube of the plurality of tubes of the second reactor), and can comprise a top catalyst zone 810, and a bottom catalyst zone 812, where the flow in the reactor can be from the top catalyst zone 810 to the bottom catalyst zone 812. The top catalyst zone 810 can comprise a naphtha reforming catalyst 820 having a first particle size and a first material 822 having the first particle size, where the first material can comprise an inert material, a less active naphtha reforming catalyst material, or a mixture of both, and where a concentration of the naphtha reforming catalyst 820 per unit volume is about the same as a concentration of the first material 822 per unit volume in the first catalyst zone. The bottom catalyst zone 812 can comprise a naphtha reforming catalyst 821 having a second particle size and no first material, where the first particle size is larger than the second particle size.

Another embodiment of a graded catalyst bed 850 is shown in FIG. 7B. The graded catalyst bed 850 can be housed in a tube 802 (e.g., a tube of the plurality of tubes of the second reactor), and can comprise a top catalyst zone 860 (e.g., a first zone), a middle catalyst zone 862, and a bottom catalyst zone 864 (e.g., a final zone), where the flow in the reactor can be from the top catalyst zone 860 towards the bottom catalyst zone 864, and where the middle catalyst zone 862 can be located between the top catalyst zone 860 and the bottom catalyst zone 864. The top catalyst zone 860 can comprise a naphtha reforming catalyst 820 having a first particle size and a first material 822 having the first particle size, where the first material can comprise an inert material, a less active naphtha reforming catalyst material, or a mixture of both, and where a concentration of the naphtha reforming catalyst 820 per unit volume is about the same as a concentration of the first material 822 per unit volume in the top catalyst zone. The middle catalyst zone 862 can comprise the naphtha reforming catalyst 820 having the first particle size, the naphtha reforming catalyst 821 having a second particle size, the first material 822 having the first particle size, and a first material 823 having the second particle size, where a concentration of the naphtha reforming catalyst per unit volume is greater than a concentration of the first material per unit volume in the middle catalyst zone (e.g., a ratio of a concentration of the naphtha reforming catalyst per unit volume to a concentration of the first material per unit volume in the middle catalyst zone is about 2:1); and where the first particle size is larger than the second particle size. The bottom catalyst zone 864 can comprise the naphtha reforming catalyst 821 having the second particle size and no first material.

In an embodiment, a method of carrying out a naphtha reforming process as disclosed herein can further comprise processing the hydrocarbon feed stream with a preliminary reactor (e.g., sulfur sorber unit), where the preliminary reactor contains a sulfur control sorbent (e.g., sulfur adsorbing material) alone or in combination with a sulfur converting material, and where the sulfur control sorbent can remove a portion of the sulfur in the hydrocarbon feed stream and the sulfur converting material can convert a portion of the sulfur in the hydrocarbon feed stream to a material more readily adsorbed by the sulfur control sorbent. The preliminary reactor processes the hydrocarbon feed stream prior to introducing the hydrocarbon feed stream to the first reactor (e.g., adiabatic reactor). The preliminary reactor (e.g., sulfur sorber unit) may also act as a precaution or backup in case any upstream hydrotreating system fails or has an operating upset. The preliminary reactor unit may be used to reduce the amount of sulfur in the hydrocarbon feed stream and may comprise any suitable sulfur converter adsorber capable of removing sulfur from the hydrocarbon feed stream. In an embodiment, the preliminary reactor unit can be in fluid communication with the first inlet of the first reactor (e.g., adiabatic reactor). The preliminary reactor unit can be upstream of the first furnace, where the first furnace can be configured to heat the hydrocarbon feed stream prior to the hydrocarbon feed stream entering the first inlet of the first reactor.

In an embodiment, the bed of the sulfur adsorbing material can comprise any suitable sulfur adsorbing material. The sulfur adsorbing material can comprise a base on a substrate, where the substrate can comprise an inorganic oxide, such as alumina, silica, aluminosilicates, zeolites, and the like, or combinations thereof. The base can comprise any suitable hydroxide, such as sodium hydroxide, potassium hydroxide, ammonium hydroxide, tetraalkylammonium hydroxide, lithium, copper, zinc oxide, and the like, or combinations thereof. In an embodiment, the sulfur adsorbing material can comprise potassium hydroxide on alumina. In some embodiments, the sulfur adsorbing material can comprise the first naphtha reforming catalyst, the second naphtha reforming catalyst, the third reforming catalyst, or combinations thereof.

In an embodiment, the bed of the sulfur adsorbing material can be preceded by a bed of a sulfur converting material. The sulfur converting material can comprise any suitable material that can convert the sulfur-containing compounds present in the hydrocarbon feed stream. The sulfur converting material can comprise at least one group VIII metal on an inorganic oxide substrate, such as alumina, silica, aluminosilicates, zeolites, and the like, or combinations thereof. The at least one group VIII metal can comprise Pt, Pd, Ni, Co, and the like, or combinations thereof. In an embodiment, the sulfur converting material can comprise Pt on alumina.

In an embodiment, a method of carrying out a naphtha reforming process as disclosed herein can further comprise passing the hydrocarbon feed stream through a preliminary reactor, where the preliminary reactor contains a sulfur control sorbent (e.g., sulfur adsorbing material) alone or in combination with a sulfur converting material, and where the sulfur control sorbent can remove a portion of the sulfur in the hydrocarbon feed stream and the sulfur converting material can convert a portion of the sulfur in the hydrocarbon feed stream to a material more readily adsorbed by the sulfur control sorbent. In such embodiment, the method can further comprise (i) detecting a first sulfur level in the hydrocarbon feed stream upstream of the preliminary reactor; (ii) detecting a second sulfur level in the hydrocarbon feed stream downstream of the preliminary reactor; and (iii) ceasing the introduction of the hydrocarbon feed stream to the first reactor when a reduction in a sulfur level between the first sulfur level and the second sulfur level is less than a threshold. Sulfur levels can be monitored (e.g., detected) by using on-stream sulfur analyzers.

Figure 9A:
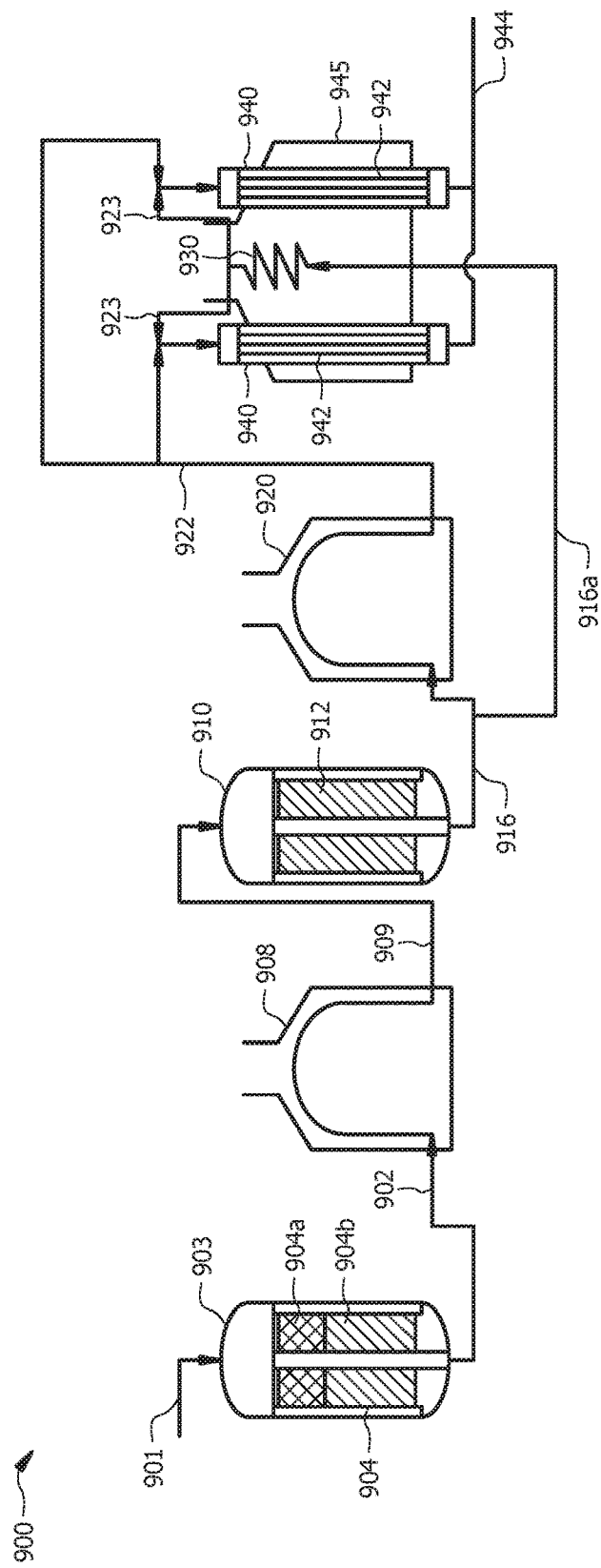
FIG. 9A is a flow diagram of still yet another embodiment of a naphtha reforming process of the present disclosure.

An embodiment of a general naphtha reforming process 900 is shown in FIG. 9A. At the inlet of the process, a preliminary hydrocarbon feed stream is fed through line 901 to a preliminary reactor 903 to produce a hydrocarbon feed stream, where the preliminary reactor 903 comprises a bed of sulfur control sorbent 904, and where the preliminary reactor can be a radial flow reactor. In some embodiments, the bed of sulfur control sorbent 904 can comprise an optional top portion 904a of the bed comprising a sulfur converting material and a bottom portion 904b of the bed comprising a sulfur adsorbing material. In some aspects, the top portion 904a and the bottom portion 904b can be two distinct beds. In other aspects, the top portion 904a and the bottom portion 904b can be two different zones within the same bed. In other embodiments, the bed of sulfur control sorbent 904 can comprise substantially sulfur adsorbing material. In yet other embodiments, the bed 904 can comprise a combination of a sulfur control and sulfur absorber material, wherein the bed 904 can be a single bed. The preliminary reactor 903 can include any of the adiabatic reactors described herein. The preliminary hydrocarbon feed stream can be characterized by a first sulfur level of equal to or greater than about 50 ppbw, alternatively equal to or greater than about 100 ppbw, or alternatively equal to or greater than about 200 ppbw. The first sulfur level of the preliminary hydrocarbon feed stream can be monitored (e.g., detected) in the line 901. The hydrocarbon feed stream can be characterized by a second sulfur level of less than about 50 ppbw, alternatively less than about 40 ppbw, or alternatively less than about 25 ppbw. The second sulfur level of the hydrocarbon feed stream can be monitored (e.g., detected) in the line 902. In embodiments where the second sulfur level of the hydrocarbon feed stream is above 50 ppmw, the flow of hydrocarbon feed stream through line 902 towards the first reactor 910 can be interrupted, and an alternative hydrocarbon feed stream that has a sulfur level below 50 ppbw can be introduced to line 902. The alternative hydrocarbon feed stream can be a hydrocarbon feed stream that is introduced to another preliminary reactor (not shown in FIG. 9) to bypass the preliminary reactor 903. The hydrocarbon feed stream passing through line 902 can be heated in a first furnace 908 to increase the temperature of the hydrocarbon feed stream. The heated hydrocarbon feed stream passing through line 909 can be introduced to a first reactor 910, where the first reactor 910 can be an adiabatic radial flow reactor comprising a catalyst bed 912 disposed therein, and where the catalyst bed 912 can comprise a first naphtha reforming catalyst. The first reactor 910 can include any of the adiabatic reactors described herein. At least a portion of the convertible hydrocarbons in the hydrocarbon feed stream can be converted to aromatic hydrocarbons in the first reactor 910 to form a first reactor effluent. In some embodiments, the first reactor effluent passing through line 916 can be heated in a second furnace 920 to increase the temperature of the first reactor effluent. The heated first reactor effluent passing through line 922 can be introduced to a second reactor 940, where the second reactor 940 can operate under isothermal naphtha reforming conditions. In other embodiments, the first reactor effluent passing through line 916a can be heated in a convection zone 930 of a reactor furnace 945 to further increase the temperature of the first reactor effluent. For example, the first reactor effluent passing through line 916a can be heated in a convection zone 930 of a reactor furnace 945 to a naphtha reforming temperature. The heated first reactor effluent passing through line 923 can be introduced to a second reactor 940, where the second reactor 940 can operate under isothermal naphtha reforming conditions. The second reactor 940 can include any of the isothermal reactors described herein. The second reactor 940 can comprise a plurality of tubes 942 having a second naphtha reforming catalyst disposed therein, where the plurality of tubes 942 can be disposed within a reactor furnace 945. The first naphtha reforming catalyst and the second naphtha reforming catalyst can be the same or different. At least an additional portion of the convertible hydrocarbons in the first reactor effluent can be converted to aromatic hydrocarbons in the second reactor 940 to form a second reactor effluent 944.

In an embodiment, a method of carrying out a naphtha reforming process as disclosed herein can further comprise passing the hydrocarbon feed stream through a preliminary reactor (e.g., a third reactor) comprising a third reforming catalyst prior to introducing the hydrocarbon feed stream to the first reactor (e.g., adiabatic reactor) comprising the first naphtha reforming catalyst, to produce a preliminary reactor effluent, where the third catalyst can remove a portion of the sulfur in the hydrocarbon feed stream, and where the first naphtha reforming catalyst, the second naphtha reforming catalyst of a second reactor (e.g. isothermal reactor) downstream of the first reactor, and the third reforming catalyst can be the same or different. In such embodiment, the method can further comprise (i) detecting a decrease in temperature between the hydrocarbon feed stream and the preliminary reactor effluent; and (ii) ceasing the introduction of the feed stream to the preliminary reactor when the decrease in the temperature is less than a threshold. The third reforming catalyst of the preliminary reactor can serve a dual purpose of reforming a portion of the convertible hydrocarbons of the hydrocarbon feed stream, and removing a portion of the sulfur in the hydrocarbon feed stream. The naphtha reforming reactions are highly endothermic, and as such a temperature of the preliminary reactor effluent is lower than a temperature of the hydrocarbon feed stream prior to entering the preliminary reactor. A decrease in catalytic activity of the third reforming catalyst can lead to the naphtha reforming reactions occurring at a lower extent, which in turn can translate in less of a temperature decrease between the hydrocarbon feed stream and the preliminary reactor effluent (e.g., a higher temperature of the preliminary reactor effluent than expected). A decrease in catalytic activity of the third reforming catalyst can be due to the presence of sulfur in the hydrocarbon feed stream, e.g., catalyst deactivation or poisoning by sulfur in the hydrocarbon feed stream. A decrease in catalytic activity of the third reforming catalyst indicated by less of a temperature decrease between the hydrocarbon feed stream and the preliminary reactor effluent (e.g., increase in the preliminary reactor effluent temperature) can generally indicate that the catalyst is spent and it should be rejuvenated.

In some embodiments, the third reactor comprising the third reforming catalyst can be run in parallel with the first reactor comprising the first naphtha reforming catalyst, such that when either the first naphtha reforming catalyst or the third reforming catalyst becomes spent, the third reactor or the first reactor, respectively, could continue the naphtha reforming process, thereby providing for a continuous naphtha reforming process.

Figure 9B:
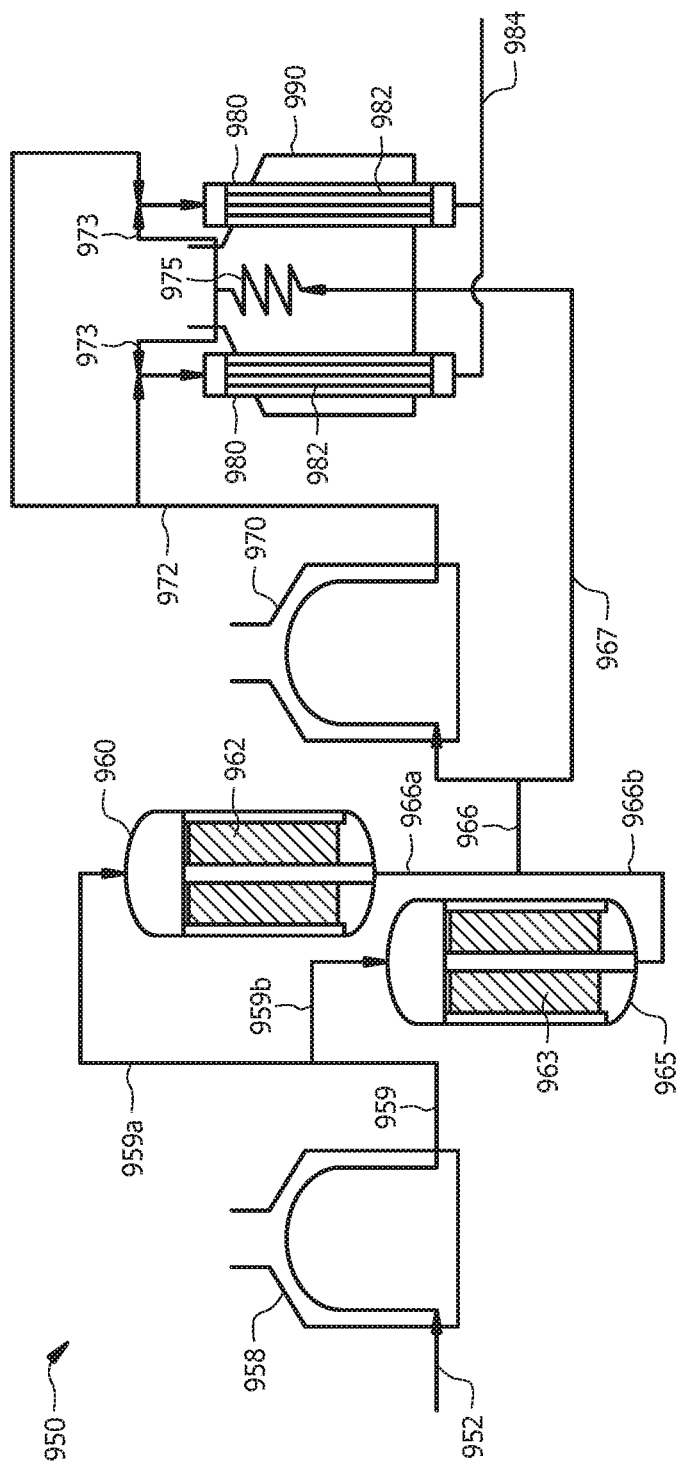
FIG. 9B is a flow diagram of still yet another embodiment of a naphtha reforming process of the present disclosure.

An embodiment of a general naphtha reforming process 950 is shown in FIG. 9B. At the inlet of the process, a hydrocarbon feed stream is fed through line 952. The hydrocarbon feed stream passing through line 952 can be heated in a first furnace 958 to increase the temperature of the hydrocarbon feed stream. A first portion 959a of the heated hydrocarbon feed stream passing through line 959 can be introduced to a first reactor 960, where the first reactor 960 can be an adiabatic radial flow reactor comprising a catalyst bed 962 disposed therein, and where the catalyst bed 962 can comprise a first naphtha reforming catalyst. At least a portion of the convertible hydrocarbons in the heated hydrocarbon feed stream passing through line 959a can be converted to aromatic hydrocarbons in the first reactor 960 to form a first reactor effluent. A second portion 959b of the heated hydrocarbon feed stream passing through line 959 can be introduced to a third reactor 965, where the third reactor 965 can be an adiabatic radial flow reactor comprising a catalyst bed 963 disposed therein, and where the catalyst bed 963 can comprise a third reforming catalyst. The first reactor 960 and/or the third reactor 965 can include any of the adiabatic reactors described herein. At least a portion of the convertible hydrocarbons in the heated hydrocarbon feed stream passing through line 959b can be converted to aromatic hydrocarbons in the third reactor 965 to form a third reactor effluent. A decrease in catalytic activity of the third reforming catalyst indicated by less of a temperature decrease between the hydrocarbon feed stream passing through line 959b and the third reactor effluent passing through line 966b (e.g., increase in the third reactor effluent temperature) can generally indicate that the third reforming catalyst is spent and a catalytic activity should be restored. In such case, the flow of heated hydrocarbon feed stream through line 959b can be shut off, along with the flow of third reactor effluent through line 966b, to isolate the third reactor and restore catalytic activity in the third reactor 965. Similarly, a decrease in catalytic activity of the first naphtha reforming catalyst indicated by less of a temperature decrease between the hydrocarbon feed stream passing through line 959a and the first reactor effluent passing through line 966a (e.g., increase in the first reactor effluent temperature) can generally indicate that the first naphtha reforming catalyst is spent and a catalytic activity should be restored. In such case, the flow of heated hydrocarbon feed stream through line 959a can be shut off, along with the flow of first reactor effluent through line 966a, to isolate the first reactor and restore catalytic activity in the first reactor 960. In some embodiments, the adiabatic reactor effluent passing through line 966 (e.g., the combined streams of first reactor effluent passing through line 966a and the second reactor effluent passing through line 966b) can be heated in a second furnace 970 to increase the temperature of the adiabatic reactor effluent. The heated adiabatic reactor effluent passing through line 972 can be introduced to a second reactor 980, where the second reactor 980 can operate under isothermal naphtha reforming conditions. In other embodiments, the adiabatic reactor effluent passing through line 967 (e.g., the combined streams of first reactor effluent passing through line 966a and the second reactor effluent passing through line 966b) can be heated in a convection zone 975 of a reactor furnace 990 to further increase the temperature of the adiabatic reactor effluent. For example, the adiabatic reactor effluent passing through line 967 can be heated in a convection zone 975 of a reactor furnace 990 to a naphtha reforming temperature. The heated adiabatic reactor effluent passing through line 973 can be introduced to a second reactor 980, where the second reactor 980 can operate under isothermal naphtha reforming conditions. The second reactor 980 can include any of the isothermal reactors described herein. The second reactor 980 can comprise a plurality of tubes 982 having a second naphtha reforming catalyst disposed therein, where the plurality of tubes 982 can be disposed within a reactor furnace 990. The first naphtha reforming catalyst and the second naphtha reforming catalyst can be the same or different. At least an additional portion of the convertible hydrocarbons in the adiabatic reactor effluent can be converted to aromatic hydrocarbons in the second reactor 980 to form a second reactor effluent 984.

In an embodiment, an increase in an outlet reactor temperature in the second reactor (e.g., isothermal reactor) could indicate a loss of activity for an endothermic reaction, e.g., could indicate that the naphtha reforming catalyst in the second reactor (e.g., second naphtha reforming catalyst) is spent and catalytic activity needs to be restored. In an embodiment, a method of carrying out a naphtha reforming process as disclosed herein can further comprise (i) ceasing the passing of the first reactor effluent to the isothermal reactor; (ii) rejuvenating the second naphtha reforming catalyst in the isothermal reactor; and (iii) returning the first reactor effluent to the isothermal reactor after rejuvenating the second naphtha reforming catalyst. In some embodiments, the reactor system for carrying out a naphtha reforming process as disclosed herein can comprise two isothermal reactors (e.g., a first isothermal reactor and a second isothermal reactor) connected in parallel, such that when either the second naphtha reforming catalyst of the first isothermal reactor or the second naphtha reforming catalyst of the second isothermal reactor becomes spent, the second isothermal reactor or the first isothermal reactor, respectively, could continue the naphtha reforming process, thereby providing for a continuous naphtha reforming process.

In an embodiment, a method of carrying out a naphtha reforming process as disclosed herein can comprise operating a naphtha reforming reactor system comprising a plurality of reactors until a reactor is deemed to contain a spent catalyst, where each of the plurality of reactors contains a catalyst comprising a zeolite capable of converting at least a portion of a hydrocarbon feed stream to aromatic hydrocarbons; isolating the reactor containing the spent catalyst from a remaining plurality of reactors; restoring the ability of the reactor containing the spent catalyst to convert at least a portion of the hydrocarbon feed stream to aromatic hydrocarbons; preparing the reactor to resume conversion of the hydrocarbon feed stream; returning the reactor to the hydrocarbon feed stream by connecting the reactor to the remaining plurality of reactors; and resuming operations of the naphtha reforming reactor system to convert at least the portion of the hydrocarbon feed stream to aromatic hydrocarbons.

In an embodiment, a method of carrying out a naphtha reforming process for producing aromatic hydrocarbons as disclosed herein can advantageously display improvements in one or more process characteristics when compared to conventional methods of carrying out a naphtha reforming process for producing aromatic hydrocarbons. In conventional methods of carrying out a naphtha reforming process for producing aromatic hydrocarbons, typically at least 5-10 adiabatic reactors operating in series are used for achieving a desired conversion of the convertible hydrocarbons to aromatic hydrocarbons. In an embodiment, a reactor system for carrying out a naphtha reforming process as disclosed herein can advantageously employ 1-2 adiabatic reactors and 1-2 isothermal reactors to achieve a similar desired conversion of the convertible hydrocarbons to aromatic hydrocarbons, thereby reducing capital and operating costs. The adiabatic reactor(s) will suffer the biggest portion of the endotherm associated with the naphtha reforming reactions by converting the easily convertible hydrocarbons, thus reducing the heat flux at the upstream end of the of the plurality of tubes of the isothermal reactor, thus making it possible to run the remainder of the naphtha reforming reactions in an isothermal reactor without the metallurgical problems or high alloy steels associated with operation at such high heat flux levels.

In an embodiment, the first reactor (e.g., adiabatic reactor) can advantageously serve in an early warning capacity in case of feed contamination with sulfur. In case of loss of endotherm in the first reactor, the feed can be shut off and the naphtha reforming catalyst of the second reactor (e.g., downstream isothermal reactor) can be protected from contamination with sulfur. The contamination warning capability of the first reactor can advantageously eliminate the need for a sulfur converter adsorber (SCA). A further advantage of removing the SCA is that any aromatics in the feed would need to be converted to cycloalkanes in the SCA which would then be converted to aromatics once again in the naphtha reforming section of the plant. So, the ultimate conversion and the ultimate % aromatics content in the effluent would both benefit by the presence of aromatics in the feed. With the SCA, the presence of aromatics in the feed is detrimental to overall plant performance.

As a further advantage of the reactor system and methods disclosed herein, the operating conditions of the naphtha reforming reactions can be altered to produce further operational advantages. In an embodiment, the operating conditions of the naphtha reforming process may be reduced in severity using the systems and methods disclosed herein. For example, the pressures and temperatures used in the system, including a naphtha reforming reactor section, may be reduced. In an embodiment, the temperatures within the system may be maintained below about 1,000° F. (538° C.), alternatively below about 950° F. (510° C.), or alternatively below about 900° F. (482° C.), which could in turn decrease carburization and metal loss rates. The reduction of the operating temperature may result in decreased conversion efficiency in the adiabatic reactor(s). In order to compensate for this reduction in conversion efficiency, a recycle stream comprising the unreacted reactants may be used to produce an overall equivalent conversion efficiency, or the reactors may be resized as needed. A plurality of recycle lines may be used within the system to allow for multiple recycle configurations within the reactor system. Further, the reduction in operating temperature may allow for the reduction or elimination of high temperature piping alloys and/or metal protective layers on the surfaces of the piping and equipment contacting the hydrocarbon feed stream as described above. The reduction or elimination of high temperature piping alloys and/or the metal protective layers may represent a significant cost savings in the overall system. A decrease in the severity of the operating conditions can also result in an increased catalyst life such that the catalyst deactivates at a slower rate.

A decrease in the highest temperatures which would normally be seen in the adiabatic configuration will results in a decrease in the amount of unwanted cracking of hydrocarbons to light gases (e.g. methane).

In an embodiment, the naphtha reforming catalyst of the second reactor (e.g., isothermal reactor) can be advantageously active substantially at all times, as opposed to the naphtha reforming catalyst of the adiabatic reactors where only a portion of the reforming catalyst is above the endothermic reaction threshold temperature, and thus active. In the adiabatic reactor, the reforming catalyst that is below the endothermic reaction threshold temperature due to heat loss to the endothermic reaction is mostly inactive. At the start of the run, and for much of the run, this unused catalyst represents the majority of the catalyst in the reactor. The catalyst being active all the time in the isothermal reactor can advantageously allow for using a smaller amount of catalyst. The use of a graded catalyst bed (both in activity and in particle size) can advantageously allow for operation and maintenance of isothermal naphtha reforming conditions, where the necessary amount of catalytically active metal (e.g., group VIII metal, Pt) is reduced due to the fact that substantially all of the catalytically active metal in the isothermal reactor is employed at all times, as opposed to an adiabatic reactor where a large portion of the catalytically active metal is idle at any given time. Further, the tubular design of the isothermal reactor can be more amenable to in situ catalyst rejuvenation when compared to a radial flow reactor. A feed system for halides could be added to allow for in situ rejuvenation of the catalyst in the isothermal reactor(s).

In an embodiment, a reactor system for carrying out a naphtha reforming process as disclosed herein can advantageously allow for recovering a portion of the heat of reactor effluents by using such effluent streams in heat exchangers for heating hydrocarbon feed streams into the reactors, as previously described herein.

In an embodiment, a reactor system for carrying out a naphtha reforming process as disclosed herein can advantageously allow for continuous operation by using reactors coupled in parallel, e.g., two or more adiabatic reactors in parallel and two or more isothermal reactors in parallel. Restoring the catalyst activity in one reactor would not necessitate an entire plant shutdown. Further, if increased production was desired (e.g., to accommodate higher feed rates), another isothermal reactor could be added in parallel with the existing isothermal reactor(s); and/or another adiabatic reactor could be added in parallel with the existing adiabatic reactor(s).

In an embodiment, the use of a graded catalyst bed in the second reactor (e.g., isothermal reactor) can advantageously result in a decreased pressure drop along the isothermal reactor. Further, eliminating SCAs from the reactor system can allow for a further decrease in overall pressure drop in the reactor system. A lower pressure drop can generally result in operating (e.g., compressor, and associated energy) savings. Lower cycle pressure drop allows for lower inlet pressures, and lower pressures allow for increased conversion (the reaction has an increase in moles, so lower pressures aid in conversion). The graded catalyst bed not only gives lesser pressure drop, but the rate of pressure drop increase over the run is lessened. In particular, the rate of plugging (or pressure drop increase) in the top zone of the isothermal reactor is reduced significantly. It is the first or top zone that is most susceptible to plugging and pressure drop increases. Additional advantages of the systems and/or methods of carrying out a naphtha reforming process for producing aromatic hydrocarbons as disclosed herein can be apparent to one of skill in the art viewing this disclosure.

The present disclosure is further illustrated by the following examples, which are not to be construed in any way as imposing limitations upon the scope thereof. On the contrary, it is to be clearly understood that resort can be had to various other aspects, embodiments, modifications, and equivalents thereof which, after reading the description herein, can be suggest to one of ordinary skill in the art without departing from the spirit of the present invention or the scope of the appended claims.

EXAMPLES

The disclosure having been generally described, the following examples demonstrate the practice and advantages thereof. It is understood that the examples are given by way of illustration and are not intended to limit the specification of the claims to follow in any manner.

Example 1

The crush strength of naphtha reforming catalyst particles was investigated in accordance with ASTM method D 6175-98 "Standard Test Method for Radial Crush Strength of Extruded Catalyst," with the exception that the force applied to the sample is applied laterally. $\frac{1}{8}^{th}$ inch (3.2 mm) extrudates were used for testing. The force was applied at 3.80 lb/mm to catalyst particles with dimensions of 0.3783 inches length and 0.1260 inches diameter, and the data are displayed in Table 1.

TABLE 1

| Physical Analysis | Expected Range | Target Value | Sample #1 | Sample #2 | Sample #3 |
|---|---|---|---|---|---|
| Crush Strength [lb] | min 5.0 | 7.50 | 10.14 | 11.35 | 11.77 |
| Crush [lb/mm] | | | 2.44 | 2.65 | 2.61 |
| Length [inches] | 0.10–0.35 | 0.15 | 0.16 | 0.17 | 0.18 |
| Diameter [inches] | 0.062–0.074 | 0.068 | 0.064 | 0.063 | 0.064 |

Additional Embodiments

The following are nonlimiting, specific embodiments in accordance with the present disclosure:

Part A

A first embodiment, which is a method comprising introducing a hydrocarbon feed stream to a first reactor operating under adiabatic naphtha reforming conditions, wherein the first reactor comprises a first naphtha reforming catalyst and wherein the hydrocarbon feed stream comprises a convertible hydrocarbon; converting at least a portion of the convertible hydrocarbon in the hydrocarbon feed stream to an aromatic hydrocarbon in the first reactor to form a first reactor effluent; passing the first reactor effluent from the first reactor to a second reactor operating under isothermal naphtha reforming conditions, wherein the second reactor comprises a second naphtha reforming catalyst and wherein the first naphtha reforming catalyst and the second naphtha reforming catalyst are the same or different; converting at least an additional portion of the convertible hydrocarbon in the first reactor effluent to an additional amount of the aromatic hydrocarbon in the second reactor to form a second reactor effluent; and recovering the second reactor effluent from the second reactor.

A second embodiment, which is the method of the first embodiment further comprising: heating the hydrocarbon feed stream in a first furnace prior to introducing the hydrocarbon feed stream to the first reactor.

A third embodiment, which is the method of any one of the first and the second embodiments, wherein the first reactor comprises a radial flow reactor.

A fourth embodiment, which is the method of any one of the first through the third embodiments, wherein the second reactor comprises a plurality of tubes with particles of the second naphtha reforming catalyst disposed therein, wherein the plurality of tubes is disposed within a reactor furnace.

A fifth embodiment, which is the method of the fourth embodiment, wherein the plurality of tubes is heated by burners in the reactor furnace.

A sixth embodiment, which is the method of any one of the first through the fifth embodiments further comprising heating the first reactor effluent within the reactor furnace, wherein heating the first reactor effluent within the second reactor occurs during the converting.

A seventh embodiment, which is the method of any one of the first through the sixth embodiments further comprising heating the first reactor effluent in a second furnace prior to passing the first reactor effluent into the second reactor.

An eighth embodiment, which is the method of the seventh embodiment, wherein heating the first reactor effluent comprises heating the first reactor effluent while cooling the second reactor effluent by heat exchange in a feed effluent heat exchanger to produce a feed effluent heat exchanger effluent.

A ninth embodiment, which is the method of any one of the first through the eighth embodiments, wherein the second reactor is disposed within a reactor furnace, wherein the reactor furnace comprises a radiant zone and a convection zone, and wherein heating the first reactor effluent comprises heating the first reactor effluent within tubes disposed within the convection zone.

A tenth embodiment, which is the method of any one of the first through the ninth embodiments further comprising processing the hydrocarbon feed stream with a bed of a sulfur adsorbing material within a preliminary reactor prior to introducing the hydrocarbon feed stream to the first reactor.

An eleventh embodiment, which is the method of the tenth embodiment, wherein the bed of the sulfur adsorbing material comprises potassium hydroxide on alumina.

A twelfth embodiment, which is the method of any one of the first through the eleventh embodiments, wherein the bed of the sulfur adsorbing material within the preliminary reactor is preceded by a bed of a sulfur converting material comprising Pt on alumina.

A thirteenth embodiment, which is the method of any one of the first through the twelfth embodiments, wherein the preliminary reactor contains the first naphtha reforming catalyst, the second naphtha reforming catalyst, a third reforming catalyst, or combinations thereof as the sulfur adsorbing material.

A fourteenth embodiment, which is the method of any one of the first through the thirteenth embodiments further comprising heating the hydrocarbon feed stream while cooling the second reactor effluent by heat exchange between the second reactor effluent with the hydrocarbon feed stream.

A fifteenth embodiment, which is the method of any one of the first through the fourteenth embodiments further comprising heating the first reactor effluent while cooling the second reactor effluent by heat exchange between the second reactor effluent and the first reactor effluent.

A sixteenth embodiment, which is the method of any one of the first through the fifteenth embodiments, wherein the second naphtha reforming catalyst, the first naphtha reforming catalyst, or both comprise a zeolitic naphtha reforming catalyst.

A seventeenth embodiment, which is a reactor system comprising a first reactor comprising a first inlet and a first outlet, wherein the first reactor is configured to operate as an adiabatic reactor, and wherein the first reactor comprises a first naphtha reforming catalyst; and a second reactor comprising a second inlet and a second outlet, wherein the second inlet is in fluid communication with the first outlet of the first reactor, wherein the second reactor is configured to operate as an isothermal reactor, wherein the second reactor comprises a second naphtha reforming catalyst, and wherein the first naphtha reforming catalyst and the second naphtha reforming catalyst are the same or different.

An eighteenth embodiment, which is the reactor system of the seventeenth embodiment, wherein the first reactor comprises a radial flow reactor.

A nineteenth embodiment, which is the reactor system of any one of the seventeenth and the eighteenth embodiments, wherein the second reactor comprises a plurality of tubes disposed within a reactor furnace, wherein each tube of the plurality of tubes comprises the second naphtha reforming catalyst.

A twentieth embodiment, which is the reactor system of the nineteenth embodiment, wherein the plurality of tubes does not contain a metal protective layer comprising stannide.

A twenty-first embodiment, which is the reactor system of any one of the seventeenth through the twentieth embodiment, wherein the first inlet, the second inlet, or both are configured to be maintained at a temperature of less than 1000° F. (538° C.).

A twenty-second embodiment, which is the reactor system of any one of the seventeenth through the twenty-first embodiments further comprising tubes disposed within a first furnace in fluid communication with the first inlet, wherein the first furnace is configured to heat a hydrocarbon feed stream prior to the hydrocarbon feed stream entering the first inlet.

A twenty-third embodiment, which is the reactor system of any one of the seventeenth through the twenty-second embodiments further comprising tubes disposed within a second furnace in fluid communication with the second inlet, wherein the second furnace is configured to heat a first reactor effluent stream prior to the first reactor effluent stream entering the second inlet.

A twenty-fourth embodiment, which is the reactor system of any one of the seventeenth through the twenty-third embodiments further comprising heat exchange tubes disposed within a convection zone of the reactor furnace in fluid communication with the second inlet, wherein the reactor furnace is configured to heat a first reactor effluent stream prior to the first reactor effluent stream entering the second inlet.

A twenty-fifth embodiment, which is the reactor system of the twenty-second embodiment further comprising a preliminary reactor in fluid communication with the first inlet, wherein the preliminary reactor is upstream of the first furnace.

A twenty-sixth embodiment, which is the reactor system of any one of the seventeenth through the twenty-fifth embodiments further comprising a heat exchanger, wherein the heat exchanger is configured to provide thermal contact between a fluid passing through the second outlet and a fluid passing through the first outlet.

A twenty-seventh embodiment, which is the reactor system of any one of the seventeenth through the twenty-sixth embodiments further comprising a heat exchanger, wherein the heat exchanger is configured to provide thermal contact between a fluid passing through the second outlet and a fluid passing into the second inlet.

A twenty-eighth embodiment, which is the reactor system of any one of the seventeenth through the twenty-seventh embodiments further comprising a third reactor comprising a third inlet and a third outlet, wherein the third reactor is configured to operate as an adiabatic reactor, wherein the third reactor comprises a third reforming catalyst, and wherein the third outlet is in fluid communication with the first inlet, wherein the third reforming catalysts is the same or different as the first naphtha reforming catalyst or the second naphtha reforming catalyst.

A twenty-ninth embodiment, which is the reactor system of any one of the seventeenth through the twenty-eighth embodiments, wherein the reactor system does not comprise a sulfur converter adsorber.

A thirtieth embodiment, which is a reactor system comprising a plurality of adiabatic reactors, wherein each adiabatic reactor of the plurality of adiabatic reactors comprises a first naphtha reforming catalyst; a feed header fluidly coupled to at least one of the plurality of adiabatic reactors by one or more feed lines; an intermediate product header fluidly coupled to at least one of the plurality of adiabatic reactors by one or more product lines; one or more isothermal reactors fluidly coupled to the intermediate product header by one or more inlet lines, wherein the one or more isothermal reactors comprise a second naphtha reforming catalyst and wherein the first naphtha reforming catalyst and the second naphtha reforming catalyst are the same or different; and an effluent header fluidly coupled to the one or more isothermal reactors by one or more effluent lines, wherein a serial flow path is formed from the feed header, through one or more of the plurality of adiabatic reactors, through the intermediate product header, through at least one of the one or more isothermal reactors, and to the effluent header.

A thirty-first embodiment, which is the reactor system of the thirtieth embodiment further comprising a plurality of furnaces, wherein each furnace of the plurality of furnaces corresponds to one of the adiabatic reactors of the plurality of adiabatic reactors, wherein each furnace of the plurality of furnaces is fluidly coupled between a corresponding adiabatic reactor and the feed header.

A thirty-second embodiment, which is the reactor system of any one of the thirtieth and the thirty-first embodiments, wherein the plurality of adiabatic reactors are arranged in series between the feed header and the intermediate product header.

A thirty-third embodiment, which is the reactor system of any one of the thirtieth and the thirty-first embodiments, wherein the plurality of adiabatic reactors are arranged in parallel between the feed header and the intermediate product header.

A thirty-fourth embodiment, which is the reactor system of any one of the thirtieth through the thirty-third embodiments, wherein the one or more isothermal reactors comprise two or more isothermal reactors arranged in parallel between the intermediate product header and the effluent header.

A thirty-fifth embodiment, which is the reactor system of any one of the thirtieth through the thirty-fourth embodiments, wherein the plurality of adiabatic reactors comprises a plurality of radial flow reactors.

A thirty-sixth embodiment, which is the reactor system of any one of the thirtieth through the thirty-fifth embodiments further comprising a catalyst rejuvenation system coupled to the plurality of adiabatic reactors by a plurality of flow lines; and a plurality of valves disposed in the one or more feed lines, the one or more product lines, and the flow lines, wherein the plurality of valves are configured to be dynamically operated to isolate at least one of the adiabatic reactors of the plurality of adiabatic reactors and fluidly couple the at least one isolated adiabatic reactor to the catalyst rejuvenation system while the remaining adiabatic reactors remain operational.

A thirty-seventh embodiment, which is the reactor system of any one of the thirtieth through the thirty-sixth embodiments further comprising a catalyst rejuvenation system coupled to one or more isothermal reactors by a plurality of flow lines; and a plurality of valves disposed in the one or more inlet lines, the one or more effluent lines, and the flow lines, wherein the plurality of valves are configured to be dynamically operated to isolate at least one isothermal reactor of the one or more isothermal reactors and fluidly couple the at least one isolated isothermal reactor to the catalyst rejuvenation system while the remaining isothermal reactors remain operational.

A thirty-eighth embodiment, which is the reactor system of any one of the thirty-sixth and the thirty-seventh embodiments, wherein the catalyst rejuvenation system comprises a halide source whereby halide is added to the first naphtha reforming catalyst, the second naphtha reforming catalyst, or both during rejuvenation.

Part B

A first embodiment, which is a method comprising introducing a hydrocarbon feed stream to a first reactor operating under adiabatic naphtha reforming conditions, wherein the first reactor comprises a first naphtha reforming catalyst, and wherein the hydrocarbon feed stream comprises a convertible hydrocarbon; converting at least a portion of the convertible hydrocarbon in the hydrocarbon feed stream to an aromatic hydrocarbon in the first reactor to form a first reactor effluent; passing the first reactor effluent from the first reactor to a second reactor operating under isothermal naphtha reforming conditions, wherein the second reactor comprises a second naphtha reforming catalyst, and wherein the first naphtha reforming catalyst and the second naphtha reforming catalyst are the same or different; converting at least an additional portion of the convertible hydrocarbon in the first reactor effluent to an additional amount of the aromatic hydrocarbon in the second reactor to form a second reactor effluent; and recovering the second reactor effluent from the second reactor, wherein an amount of the first naphtha reforming catalyst in the first reactor is less than an amount of the second naphtha reforming catalyst in the second reactor.

A second embodiment, which is the method of the first embodiment further comprising heating the hydrocarbon feed stream in a first furnace prior to introducing the hydrocarbon feed stream to the first reactor.

A third embodiment, which is the method of any one of the first and the second embodiments, wherein an operating temperature in the first reactor does not exceed 1,000° F. (538° C.).

A fourth embodiment, which is the method of any one of the first through the third embodiments, wherein an operating temperature in the second reactor does not exceed 1,000° F. (538° C.).

A fifth embodiment, which is the method of any one of the first through the fourth embodiments, wherein the second reactor comprises a plurality of tubes with particles of the second naphtha reforming catalyst disposed therein, wherein the plurality of tubes is disposed within a reactor furnace, and wherein the method further comprises: heating the first reactor effluent within the reactor furnace.

A sixth embodiment, which is the method of the fifth embodiment, the plurality of tubes is heated by burners in the reactor furnace.

A seventh embodiment, which is the method of any one of the first through the fifth embodiments, wherein the plurality of tubes is heated by a heat exchange medium or a molten salt.

An eighth embodiment, which is the method of any one of the first through the seventh embodiments, wherein at least one tube of the plurality of tubes contains a plurality of catalyst zones.

A ninth embodiment, which is the method of the eighth embodiment, wherein the first reactor effluent contacts a mixture of catalyst particles and a first material in a first catalyst zone of the plurality of catalyst zones to produce a first catalyst zone effluent, wherein the first catalyst zone is the first catalyst zone of the plurality of catalyst zones contacted by the first reactor effluent.

A tenth embodiment, which is the method of the ninth embodiment, wherein the first material comprises an inert material, a less active naphtha reforming catalyst material, or a mixture of both.

An eleventh embodiment, which is the method of any one of the first through the tenth embodiments, wherein the first catalyst zone effluent contacts a second catalyst zone of the plurality of catalyst zones to produce a second catalyst zone effluent, wherein the second catalyst zone contains a second mixture of catalyst particles and a second material, wherein the weight ratio of the amount of catalyst particles to the second material is higher in the second catalyst zone than the weight ratio of the amount of the catalyst particles to the first material in the first catalyst zone, wherein the first catalyst zone is upstream of the second catalyst zone, and wherein the weight ratio is based on the weight of the catalyst when loaded.

A twelfth embodiment, which is the method of the eleventh embodiment, wherein the second material comprises an inert material, a less active naphtha reforming catalyst material, or a mixture of both.

A thirteenth embodiment, which is the method of any one of the first through the eighth embodiments, wherein the first reactor effluent contacts catalyst particles in a first catalyst zone of the plurality of catalyst zones to produce a first catalyst zone effluent, wherein the first catalyst zone is the first catalyst zone of the plurality of catalyst zones contacted by the first reactor effluent; wherein the first catalyst zone effluent contacts a second catalyst zone of the plurality of catalyst zones to produce a second catalyst zone effluent, wherein the second catalyst zone contains a second zone mixture of catalyst particles and a second material, wherein the first catalyst zone is upstream of the second catalyst zone; and wherein the second catalyst zone effluent contacts a third catalyst zone of the plurality of catalyst zones to produce a third catalyst zone effluent, wherein the third catalyst zone contains catalyst particles or a third zone mixture of catalyst particles and a third material, wherein the third catalyst zone is downstream of the second catalyst zone, and wherein the third catalyst zone is the last catalyst zone of the plurality of catalyst zones contacted by the first reactor effluent.

A fourteenth embodiment, which is the method of the thirteenth embodiment, wherein the third zone mixture comprises an inert material, an isomerization catalyst, or a mixture of both an inert material and an isomerization catalyst.

A fifteenth embodiment, which is the method of any one of the first through the eighth embodiments, wherein the first reactor effluent contacts a first catalyst zone of the plurality of catalyst zones to produce a first catalyst zone effluent, wherein the first catalyst zone contains a first zone mixture of catalyst particles and a first material, wherein the first catalyst zone is the first catalyst zone of the plurality of catalyst zones contacted by the first reactor effluent; wherein the first catalyst zone effluent contacts a second catalyst zone of the plurality of catalyst zones to produce a second catalyst zone effluent, wherein the second catalyst zone contains catalyst particles, wherein the first catalyst zone is upstream of the second catalyst zone; and wherein the second catalyst zone effluent contacts a third catalyst zone of the plurality of catalyst zones to produce a third catalyst zone effluent, wherein the third catalyst zone contains catalyst particles or a third zone mixture of catalyst particles and a third material, wherein the third catalyst zone is downstream of the second catalyst zone, and wherein the third catalyst zone is the last catalyst zone of the plurality of catalyst zones contacted by the first reactor effluent.

A sixteenth embodiment, which is the method of the fifteenth embodiment, wherein the third zone mixture comprises an inert material, an isomerization catalyst, or a mixture of both an inert material and an isomerization catalyst.

A seventeenth embodiment, which is the method of any one of the first through the twelfth embodiments, wherein the second catalyst zone effluent contacts the remaining catalyst zones of the plurality of catalyst zones, wherein each catalyst zone of the plurality of catalyst zones comprises an increasing amount of catalyst particles from an upstream to a downstream direction, and wherein a final catalyst zone of the plurality of catalysts zones contains none of the first material or none of the second material, wherein the final catalyst zone is the most downstream catalyst zone of the plurality of catalyst zones.

An eighteenth embodiment, which is the method of any one of the first through the seventeenth embodiments, wherein a first catalyst zone of the plurality of catalyst zones comprises a first catalyst material having a first particle size, wherein a second catalyst zone of the plurality of catalyst zones comprises a second catalyst material having a second particle size, wherein the first particle size is larger than the second particle size, and wherein the first catalyst zone is upstream of the second catalyst zone.

A nineteenth embodiment, which is the method of any one of the first through the eighteenth embodiments further comprising passing the hydrocarbon feed stream through a preliminary reactor to form a preliminary reactor effluent.

A twentieth embodiment, which is the method of the nineteenth embodiment, wherein the preliminary reactor contains a sulfur control sorbent alone or in combination with a sulfur converting material, and wherein the method further comprises removing a portion of the sulfur in the hydrocarbon feed stream with the preliminary reactor; and detecting a first sulfur level in the hydrocarbon feed stream upstream of the preliminary reactor; detecting a second sulfur level in the hydrocarbon feed stream downstream of the preliminary reactor; and ceasing the introduction of the feed stream to the first reactor when a reduction in the sulfur level between the first sulfur level and the second sulfur level is less than a threshold.

A twenty-first embodiment, which is the method of any one of the first through the twentieth embodiments, wherein the preliminary reactor contains a third reforming catalyst and wherein the first naphtha reforming catalyst; the second naphtha reforming catalyst and the third reforming catalyst are the same or different, and wherein the method further comprises detecting a decrease in temperature between the hydrocarbon feed stream and the preliminary reactor effluent; and ceasing the introduction of the hydrocarbon feed stream to the preliminary reactor when the decrease in the temperature is less than a threshold.

A twenty-second embodiment, which is the method of the twenty-first embodiment, wherein the decrease in temperature of less than the threshold is due to deactivation of at least a portion of the third reforming catalyst due to the presence of sulfur in the hydrocarbon feed stream.

A twenty-third embodiment, which is the method of any one of the first through the twenty-second embodiments further comprising ceasing passing the first reactor effluent to the second reactor operating under isothermal reactor conditions; rejuvenating the second naphtha reforming catalyst in the second reactor; and returning the first reactor effluent to the second reactor after rejuvenating the second naphtha reforming catalyst.

A twenty-fourth embodiment, which is the method of any one of the first through the twenty-third embodiments, wherein the first reactor comprises a radial flow reactor.

A twenty-fifth embodiment, which is a naphtha reforming reactor system comprising a first reactor comprising a first inlet and a first outlet, wherein the first reactor is configured to operate as an adiabatic reactor, and wherein the first reactor comprises a first naphtha reforming catalyst; and a second reactor comprising a second inlet and a second outlet, wherein the second inlet is in fluid communication with the first outlet of the first reactor, wherein the second reactor is configured to operate as an isothermal reactor, and wherein the second reactor comprises a plurality of tubes disposed within a reactor furnace, a heat source configured to heat the interior of the reactor furnace; and a second naphtha reforming catalyst disposed within the plurality of tubes, wherein the first naphtha reforming catalyst and the second naphtha reforming catalyst are the same or different.

A twenty-sixth embodiment, which is the reactor system of the twenty-fifth embodiment, wherein the plurality of tubes comprises between about 250 to about 5,000 tubes in the furnace.

A twenty-seventh embodiment, which is the reactor system of any one of the twenty-fifth and the twenty-sixth embodiments, wherein the plurality of tubes have a length to diameter ratio between about 25 and about 150.

A twenty-eighth embodiment, which is the reactor system of any one of the twenty-fifth through the twenty-seventh embodiments, wherein the plurality of tubes have an internal diameter between about 0.5 inches (13 mm) and about 4.0 inches (102 mm).

A twenty-ninth embodiment, which is the reactor system of any one of the twenty-fifth through the twenty-eighth embodiments, wherein at least one tube of the plurality of tubes has a plurality of catalyst zones.

A thirtieth embodiment, which is the reactor system of the twenty-ninth embodiment, wherein a first catalyst zone of the plurality of catalyst zones comprises a mixture of a naphtha reforming catalyst particles and an inert material, a less active naphtha reforming catalyst material, or a mixture of both and wherein the first catalyst zone is disposed on an upstream end of the at least one tube within the reactor furnace.

A thirty-first embodiment, which is the reactor system of any one of the twenty-fifth through the thirtieth embodiments, wherein a second catalyst zone of the plurality of catalyst zones comprises only a naphtha reforming catalyst without the inert material, and wherein the second catalyst zone is disposed downstream of the first catalyst zone.

A thirty-second embodiment, which is the reactor system of any one of the twenty-fifth and the thirty-first embodiments, wherein each catalyst zone of the plurality of catalyst zones comprises an increasing amount of the naphtha reforming catalyst particles and a decreasing amount of less active naphtha reforming catalyst material from an upstream to a downstream direction, and wherein a final catalyst zone of the plurality of catalysts zones contains no less active naphtha reforming catalyst material, wherein the final catalyst zone is the most downstream catalyst zone of the plurality of catalyst zones.

A thirty-third embodiment, which is the reactor system of the thirty-second embodiment, wherein the final catalyst zone of the plurality of catalysts zones comprises a mixture of a naphtha reforming catalyst and an isomerization catalyst, wherein the final catalyst zone is the most downstream catalyst zone of the plurality of catalyst zones.

A thirty-fourth embodiment, which is the reactor system of any one of the twenty-fifth through the thirty-third embodiments, wherein a first catalyst zone of the plurality of catalyst zones comprises a first catalyst material having a first particle size, wherein a second catalyst zone of the plurality of catalyst zones comprises a second catalyst material having a second particle size, wherein the first particle size is larger than the second particle size, and wherein the first catalyst zone is located upstream of the second catalyst zone in the at least one tube.

A thirty-fifth embodiment, which is the reactor system of any one of the twenty-fifth through the thirty-fourth embodiments, wherein at least one tube of the plurality of tubes comprises a graded catalyst bed.

A thirty-sixth embodiment, which is the reactor system of the thirty-fifth embodiment, wherein the graded catalyst bed comprises an increasing amount of the second naphtha reforming catalyst disposed in the at least one tube per unit volume along a length of the at least one tube in a flow direction and wherein the balance of the material per unit volume is an inert material, a less active naphtha reforming catalyst material, or a mixture of both.

A thirty-seventh embodiment, which is the reactor system of any one of the twenty-fifth through the thirty-sixth embodiments, wherein the first reactor comprises a radial flow reactor.

A thirty-eighth embodiment, which is the reactor system of any one of the twenty-fifth through the thirty-seventh embodiments, wherein a ratio of an amount of the first naphtha reforming catalyst in the first reactor to an amount of the second naphtha reforming catalyst in the second reactor is in the range of about 1:2 to about 1:10 by weight of fresh catalyst.

A thirty-ninth embodiment, which is the reactor system of any one of the twenty-fifth through the thirty-eighth embodiments, wherein the plurality of tubes does not contain a metal protective layer comprising stannide.

A fortieth embodiment, which is the reactor system of any one of the twenty-fifth through the thirty-ninth embodiments, wherein an amount of the second naphtha reforming catalyst is configured to be substantially fully utilized when the second naphtha reforming catalyst disposed within the plurality of tubes is operating above an endothermic reaction threshold temperature.

A forty-first embodiment, which is a method comprising introducing a hydrocarbon feed stream to a radial flow reactor operating under adiabatic naphtha reforming conditions, wherein the radial flow reactor comprises a first naphtha reforming catalyst, and wherein the hydrocarbon feed stream comprises a convertible hydrocarbon; converting at least a portion of the convertible hydrocarbon in the hydrocarbon feed stream to an aromatic hydrocarbon in the radial flow reactor to form a first reactor effluent; passing the first reactor effluent from the radial flow reactor to a second reactor operating under isothermal naphtha reforming conditions, wherein the second reactor comprises a plurality of tubes disposed within a reactor furnace, and a second naphtha reforming catalyst disposed within the plurality of tubes, and wherein the plurality of tubes are arranged in parallel between an inlet and an outlet of the reactor furnace; passing the first reactor effluent through the plurality of tubes within the second reactor; converting at least an additional portion of the convertible hydrocarbon in the first reactor effluent to an addition amount of the aromatic hydrocarbon in the second reactor to form a second reactor effluent, wherein the plurality of tubes is heated within the reactor furnace during the converting; and recovering the second reactor effluent from the second reactor.

A forty-second embodiment, which is the method of the forty-first embodiment, wherein an operating temperature in the radial flow reactor does not exceed 1,000° F. (538° C.), and wherein an operating temperature in the second reactor does not exceed 1,000° F. (538° C.).

A forty-third embodiment, which is the method of any one of the forty-first and the forty-second embodiments, wherein the first reactor effluent passes through a plurality of catalyst zones within at least one tube of the plurality of tubes while being heated within the reactor furnace.

A forty-fourth embodiment, which is the method of the forty-third embodiment, wherein the first reactor effluent contacts a mixture of catalyst particles and a first material in a first catalyst zone of the plurality of catalyst zones, wherein the first catalyst zone is the first catalyst zone of the plurality of catalyst zones contacted by the first reactor effluent, wherein the first reactor effluent then contacts a second mixture of catalyst particles and the first material in a second catalyst zone of the plurality of catalyst zones, and wherein a ratio of the volume of catalyst particles to the volume of the first material higher in the second catalyst zone than in the first catalyst zone.

A forty-fifth embodiment, which is the method of any one of the forty-first through the forty-fourth embodiments, wherein a final catalyst zone of the plurality of catalysts zones contains none of the first material, wherein the final catalyst zone is the most downstream catalyst zone of the plurality of catalyst zones.

A forty-sixth embodiment, which is the method of any one of the forty-first through the forty-fifth embodiments, wherein the first material comprises an inert material, a less active naphtha reforming catalyst material, or a mixture thereof.

A forty-seventh embodiment, which is the method of any one of the forty-first through the forty-sixth embodiments, wherein a first catalyst zone of the plurality of catalyst zones comprises a first catalyst material having a first particle size, wherein a second catalyst zone of the plurality of catalyst zones comprises a second catalyst material having a second particle size, wherein the first particle size is larger than the second particle size, and wherein the first catalyst zone is upstream of the second catalyst zone.

A forty-eighth embodiment, which is the method of any one of the forty-first through the forty-seventh embodiments, wherein the catalyst has a crush strength of greater than 4 pounds force (lbf, 17.8 N), as determined in accordance with ASTM method D 6175-98.

A forty-ninth embodiment, which is the method of any one of the forty-first through the forty-eighth embodiments, wherein a pressure drop measured between an inlet of the plurality of tubes and an outlet of the plurality of tubes is from about 1 psia (0.007 MPa) to about 20 psia (0.1 MPa).

A fiftieth embodiment, which is the method of any one of the forty-first through the forty-ninth embodiments, wherein the pressure at an inlet of the plurality of tubes is less than about 100 psig (0.69 MPa).

A fifty-first embodiment, which is the method of any one of the forty-first through the fiftieth embodiments, wherein a final catalyst zone of the plurality of catalysts zones contains no first material, wherein the final catalyst zone comprises a mixture of catalyst particles and an isomerization catalyst, wherein the final catalyst zone is the most downstream catalyst zone of the plurality of catalyst zones.

While the present disclosure has been illustrated and described in terms of particular apparatus and methods of use, it is apparent that equivalent techniques, components, and constituents may be substituted for those shown, and other changes can be made within the scope of the present disclosure as defined by the appended claims.

The particular embodiments disclosed herein are illustrative only, as the disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

We claim:

1. A method comprising:
   introducing a hydrocarbon feed stream to a first reactor operating under adiabatic naphtha reforming conditions, wherein the first reactor comprises a first naphtha reforming catalyst, and wherein the hydrocarbon feed stream comprises a convertible hydrocarbon;
   converting at least a portion of the convertible hydrocarbon in the hydrocarbon feed stream to an aromatic hydrocarbon in the first reactor to form a first reactor effluent;
   passing the first reactor effluent from the first reactor to a second reactor operating under isothermal naphtha reforming conditions, wherein the second reactor comprises a second naphtha reforming catalyst, and wherein the first naphtha reforming catalyst and the second naphtha reforming catalyst are the same or different;
   converting at least an additional portion of the convertible hydrocarbon in the first reactor effluent to an additional amount of the aromatic hydrocarbon in the second reactor to form a second reactor effluent; and
   recovering the second reactor effluent from the second reactor, wherein an amount of the first naphtha reforming catalyst in the first reactor is less than an amount of the second naphtha reforming catalyst in the second reactor.

2. The method of claim 1, wherein the second reactor comprises a plurality of tubes with particles of the second naphtha reforming catalyst disposed therein, wherein the plurality of tubes is disposed within a reactor furnace, and wherein the method further comprises: heating the first reactor effluent within the reactor furnace.

3. The method of claim 2, wherein at least one tube of the plurality of tubes contains a plurality of catalyst zones.

4. The method of claim 3, wherein the first reactor effluent contacts a mixture of catalyst particles and a first material in a first catalyst zone of the plurality of catalyst zones to produce a first catalyst zone effluent, wherein the first catalyst zone is the first catalyst zone of the plurality of catalyst zones contacted by the first reactor effluent; wherein the first material comprises an inert material, a less active naphtha reforming catalyst material, or a mixture of both; wherein the first catalyst zone effluent contacts a second catalyst zone of the plurality of catalyst zones to produce a second catalyst zone effluent, wherein the second catalyst zone contains a second mixture of catalyst particles and a second material, wherein the weight ratio of the amount of catalyst particles to the second material is higher in the second catalyst zone than the weight ratio of the amount of the catalyst particles to the first material in the first catalyst zone, wherein the first catalyst zone is upstream of the second catalyst zone, and wherein the weight ratio is based on the weight of the catalyst when loaded; and wherein the second material comprises an inert material, a less active naphtha reforming catalyst material, or a mixture of both.

5. The method of claim 4, wherein the second catalyst zone effluent contacts the remaining catalyst zones of the plurality of catalyst zones, wherein each catalyst zone of the plurality of catalyst zones comprises an increasing amount of catalyst particles from an upstream to a downstream direction, and wherein a final catalyst zone of the plurality of catalysts zones contains none of the first material or none of the second material, wherein the final catalyst zone is the most downstream catalyst zone of the plurality of catalyst zones.

6. The method of claim 3, wherein a first catalyst zone of the plurality of catalyst zones comprises a first catalyst material having a first particle size, wherein a second catalyst zone of the plurality of catalyst zones comprises a second catalyst material having a second particle size, wherein the first particle size is larger than the second particle size, and wherein the first catalyst zone is upstream of the second catalyst zone.

7. A naphtha reforming reactor system comprising:
   a first reactor comprising a first inlet and a first outlet, wherein the first reactor is configured to operate as an adiabatic reactor, and wherein the first reactor comprises a first naphtha reforming catalyst; and a second reactor comprising a second inlet and a second outlet, wherein the second inlet is in fluid communication with the first outlet of the first reactor, wherein the second reactor is configured to operate as an isothermal reactor, and wherein the second reactor comprises:

a plurality of tubes disposed within a reactor furnace, a heat source configured to heat the interior of the reactor furnace; and a second naphtha reforming catalyst disposed within the plurality of tubes, wherein the first naphtha reforming catalyst and the second naphtha reforming catalyst are the same or different, wherein at least one tube of the plurality of tubes has a plurality of catalyst zones.

8. The naphtha reforming reactor system of claim 7, wherein the plurality of tubes comprises between about 250 to about 5,000 tubes in the furnace.

9. The naphtha reforming reactor system of claim 7, wherein the plurality of tubes have a length to diameter ratio between about 25 and about 150; and wherein the plurality of tubes have an internal diameter between about 0.5 inches (13 mm) and about 4.0 inches (102 mm).

10. The naphtha reforming reactor system of claim 7, wherein a first catalyst zone of the plurality of catalyst zones comprises a mixture of a naphtha reforming catalyst particles and an inert material, a less active naphtha reforming catalyst material, or a mixture of both and wherein the first catalyst zone is disposed on an upstream end of the at least one tube within the reactor furnace.

11. The naphtha reforming reactor system of claim 10, wherein a second catalyst zone of the plurality of catalyst zones comprises only a naphtha reforming catalyst without the inert material, and wherein the second catalyst zone is disposed downstream of the first catalyst zone.

12. The naphtha reforming reactor system of claim 10, wherein each catalyst zone of the plurality of catalyst zones comprises an increasing amount of the naphtha reforming catalyst particles and a decreasing amount of less active naphtha reforming catalyst material from an upstream to a downstream direction, and wherein a final catalyst zone of the plurality of catalysts zones contains no less active naphtha reforming catalyst material, wherein the final catalyst zone is the most downstream catalyst zone of the plurality of catalyst zones.

13. The naphtha reforming reactor system of claim 12, wherein the final catalyst zone of the plurality of catalysts zones comprises a mixture of a naphtha reforming catalyst and an isomerization catalyst, wherein the final catalyst zone is the most downstream catalyst zone of the plurality of catalyst zones.

14. The naphtha reforming reactor system of claim 7, wherein a first catalyst zone of the plurality of catalyst zones comprises a first catalyst material having a first particle size, wherein a second catalyst zone of the plurality of catalyst zones comprises a second catalyst material having a second particle size, wherein the first particle size is larger than the second particle size, and wherein the first catalyst zone is located upstream of the second catalyst zone in the at least one tube.

15. A naphtha reforming reactor system comprising:

a first reactor comprising a first inlet and a first outlet, wherein the first reactor is configured to operate as an adiabatic reactor, and wherein the first reactor comprises a first naphtha reforming catalyst; and a second reactor comprising a second inlet and a second outlet, wherein the second inlet is in fluid communication with the first outlet of the first reactor, wherein the second reactor is configured to operate as an isothermal reactor, and wherein the second reactor comprises:

a plurality of tubes disposed within a reactor furnace, a heat source configured to heat the interior of the reactor furnace; and a second naphtha reforming catalyst disposed within the plurality of tubes, wherein the first naphtha reforming catalyst and the second naphtha reforming catalyst are the same or different, wherein at least one tube of the plurality of tubes comprises a graded catalyst bed; and wherein the graded catalyst bed comprises an increasing amount of the second naphtha reforming catalyst disposed in the at least one tube per unit volume along a length of the at least one tube in a flow direction and wherein the balance of the material per unit volume is an insert material, a less active naphtha reforming catalyst material, or mixture of both.

16. A naphtha reforming reactor system comprising:

a first reactor comprising a first inlet and a first outlet, and wherein the first reactor is configured to operate as an adiabatic reactor, and wherein the first reactor comprises a first naphtha reforming catalyst; and a second reactor comprising a second inlet and a second outlet, wherein the second inlet is in fluid communication with the first outlet of the first reactor, wherein the second reactor is configured to operate as an isothermal reactor, and wherein the second reactor comprises:

a plurality of tubes disposed within a reactor furnace, a heat source configure to heat the interior of the reactor furnace; and a second naphtha reforming catalyst disposed within the plurality of tubes, wherein the first naphtha reforming catalyst and the second naphtha reforming catalyst are the same or different, and wherein a ratio of an amount of the first naphtha reforming catalyst in the first reactor to an amount of the second naphtha reforming catalyst in the second reactor is in the range of about 1:2 to about 1:10 by weight of fresh catalyst.

17. A naphtha reforming reactor system comprising:

a first reactor comprising a first inlet and a first outlet, wherein the first reactor is configured to operate as an adiabatic reactor, and wherein the first reactor comprises a first naphtha reforming catalyst; and a second reactor comprising a second inlet and a second outlet, wherein the second inlet is in fluid communication with the first outlet of the first reactor, wherein the second reactor is configured to operate as an isothermal reactor, and wherein the second reactor comprises:

a plurality of tubes disposed within a reactor furnace, a heat source configured to heat the interior of the reactor furnace; and a second naphtha reforming catalyst disposed within the plurality of tubes, wherein the first naphtha reforming catalyst and the second naphtha reforming catalyst are the same or different, and wherein an amount of the second naphtha reforming catalyst is configured to be substantially fully utilized when the second naphtha reforming catalyst disposed within the plurality of tubes is operating above an endothermic reaction threshold temperature.

18. A method comprising:

introducing a hydrocarbon feed stream to a radial flow reactor operating under adiabatic naphtha reforming conditions, wherein the radial flow reactor comprises a first naphtha reforming catalyst, and wherein the hydrocarbon feed stream comprises a convertible hydrocarbon;

converting at least a portion of the convertible hydrocarbon in the hydrocarbon feed stream to an aromatic hydrocarbon in the radial flow reactor to form a first reactor effluent;

passing the first reactor effluent from the radial flow reactor to a second reactor operating under isothermal naphtha reforming conditions, wherein the second reactor comprises a plurality of tubes disposed within a reactor furnace, and a second naphtha reforming catalyst disposed within the plurality of tubes, and wherein the plurality of tubes are arranged in parallel between an inlet and an outlet of the reactor furnace;

passing the first reactor effluent through the plurality of tubes within the second reactor;

converting at least an additional portion of the convertible hydrocarbon in the first reactor effluent to an addition amount of the aromatic hydrocarbon in the second reactor to form a second reactor effluent, wherein the plurality of tubes is heated within the reactor furnace during the converting; and recovering the second reactor effluent form the second reactor.

19. The method of claim 18, wherein the first reactor effluent passes through a plurality of catalyst zones within at least one tube of the plurality of tubes while being heated within the reactor furnace.

20. The method of claim 19, wherein the first reactor effluent contacts a mixture of catalyst particles and a first material in a first catalyst zone of the plurality of catalyst zones, wherein the first catalyst zone is the first catalyst zone of the plurality of catalyst zones contacted by the first reactor effluent, wherein the first reactor effluent then contacts a second mixture of catalyst particles and the first material in a second catalyst zone of the plurality of catalyst zones, and wherein a ratio of the volume of catalyst particles to the volume of the first material higher in the second catalyst zone than in the first catalyst zone; and wherein a final catalyst zone of the plurality of catalysts zones contains none of the first material, wherein the final catalyst zone is the most downstream catalyst zone of the plurality of catalyst zones.

21. The method of claim 18, wherein the catalyst has a crush strength of greater than 4 pounds force (lbf, 17.8 N), as determined in accordance with ASTM method D 6175-98.

22. The method of claim 18, wherein a pressure drop measured between an inlet of the plurality of tubes and an outlet of the plurality of tubes is from about 1 psia (0.007 MPa) to about 20 psia (0.1 MPa).

23. The method of claim 18, wherein the pressure at an inlet of the plurality of tubes is less than about 100 psig (0.69 MPa).

* * * * *